DATA TRANSMISSION SYSTEM WITH CONTROL CHARACTER INSERTIONS

Filed May 31, 1963 15 Sheets-Sheet 1

INVENTOR:
FLOYD B. ROBBINS,
BY David Blumenfeld
HIS ATTORNEY.

INVENTOR:
FLOYD B. ROBBINS,

BY I. David Blumenfeld
HIS ATTORNEY.

INVENTOR:
FLOYD B. ROBBINS,
BY David Blumenfeld
HIS ATTORNEY.

DATA TRANSMISSION SYSTEM WITH CONTROL CHARACTER INSERTIONS

Filed May 31, 1963 15 Sheets-Sheet 5

INVENTOR:
FLOYD B. ROBBINS,
BY I. David Blumenfeld
HIS ATTORNEY.

INVENTOR:
FLOYD B. ROBBINS,
BY J. David Blumenfeld
HIS ATTORNEY.

INVENTOR:
FLOYD B. ROBBINS,
BY I. David Blumenfeld
HIS ATTORNEY.

INVENTOR
FLOYD B. ROBBINS,
BY I. David Blumenfeld
HIS ATTORNEY.

INVENTOR:
FLOYD B. ROBBINS,
BY [signature]
HIS ATTORNEY.

INVENTOR:
FLOYD B. ROBBINS,
BY [signature]
HIS ATTORNEY.

INVENTOR:
FLOYD B. ROBBINS,

BY David Blumenfeld
HIS ATTORNEY.

INVENTOR:
FLOYD B. ROBBINS,
BY David Blumenfeld
HIS ATTORNEY.

DATA TRANSMISSION SYSTEM WITH CONTROL CHARACTER INSERTIONS

Filed May 31, 1963 15 Sheets-Sheet 13

INVENTOR:
FLOYD B. ROBBINS,
BY David Blumenfeld
HIS ATTORNEY.

Feb. 28, 1967 F. B. ROBBINS 3,307,152

DATA TRANSMISSION SYSTEM WITH CONTROL CHARACTER INSERTIONS

Filed May 31, 1963 15 Sheets-Sheet 14

INVENTOR:
FLOYD B. ROBBINS,
BY [signature]
HIS ATTORNEY.

CLOCK PULSES

TRIGGERING PULSES

DATA FROM DEMODULATOR

OUTPUT FROM PULSED INTEGRATOR

OUTPUT FROM DATA FLIP-FLOP

INVENTOR:
FLOYD B. ROBBINS,
BY David Blumenfeld
HIS ATTORNEY.

United States Patent Office 3,307,152

Patented Feb. 28, 1967

3,307,152
DATA TRANSMISSION SYSTEM WITH CONTROL CHARACTER INSERTIONS

Floyd Bridgers Robbins, Lynchburg, Va., assignor to General Electric Company, a corporation of New York

Filed May 31, 1963, Ser. No. 284,635
17 Claims. (Cl. 340—172.5)

This invention relates to a system for processing digital data and preparing it for transmission. More particularly, it relates to a system for accepting digital data from a magnetic tape at one location, preparing the data for transmission over a communication medium to a computer at a remote location, and simultaneously transmitting data from a tape at the remote location and preparing it for transmission to a computer at the original location.

As data processing and computation needs become more complex, a need exists for interconnecting one or more small remote satellite computer locations with a large central data processing center via some transmission medium. The exchange of information between two or more computers thus makes it possible to increase the efficiency of the over-all data processing because of the ability to impose an increased load on a large central processor without the centralization of input and output data. At the satellite computer location the data processing capabilities of the large central processor are immediately available without duplicating the large, complex, and costly central processor which can be used only on a part time basis. Furthermore, by means of the communication link, the load between two large remotely located data processors may be equalized to provide more efficient operation during peak loads.

To achieve this highly desirable results equipment must be provided which converts the data at one of the locations to a form suitable for transmission over a communication channel. This equipment must provide a practical and economical means of matching a data processing center to a wideband transmission medium.

It is one of the primary objects of this invention, therefore, to provide apparatus for transmitting data between geographically remote locations and to prepare the data to be transmitted for transmission over a broad wideband transmission medium.

Typically, such equipment must accept data from a magnetic tape at one location in parallel bit form, convert the data from parallel to serial form, ready it for transmission over the communication medium to the remote location where the data is extracted, reconverted to parallel form, and supplied to a computer at the remote location. In addition to preparing and converting data to be transmitted, it is vital, if communication between the remote location is to be established efficiently and accurately, that control information be conveyed between the computers and the tapes. That is, the computer is to obtain information from the magnetic tape at the one location, the computer must send a number of command signals to the tape to be executed by the tape in order to satisfy the demands of the computer. For example, the computer must tell the tape when to start moving the direction the tape is to move (whether forward or backward) and to rewind whenever the tape has reached its physical end.

Conversely, the Tape Transport and the associated drive mechanism must transmit tape status information to the computer so that the computer has information on the condition of the tape, i.e., whether it is in the ready state (prepared to advance or reverse) or conversely, whether for some reason it is not in the ready condition. Furthermore, the Tape Transport Drive mechanism must inform the computer whether it is at the beginning of the tape, the end of the tape, or at any particular location on the tape such as the end of a particular record on the magnetic tape. These Command and Status Signals must be transmitted in both directions in order to permit efficient operation at remote geographical areas.

Hitherto, it has been customary to transmit the data and the control signals separately over the transmission medium. This, of course, requires additional equipment, more bandwidth on the communication medium, and introduces a synchronization problem. In general, complex and costly equipment is required. Hence, it is highly desirable to provide a system in which both data and the control signals, whether command or status, are transmitted in a single stream over the communication medium by interlacing or time multiplexing the control information with the data.

It is, therefore, a further object of this invention to provide an apparatus for processing information for transmission between two geographically remote data processing locations wherein the control signals and data are transmitted over the same medium.

In addition, such prior art systems required a master clock pulse generator to achieve synchronous operation during intervals when no data was being transmitted. That is, if for various reasons no data is available for transmission, clock or timing pulses from the master clock generator had to be inserted in the data stream in order to maintain synchronous operation. By inserting the control signal in the signal stream and transmitting it over the same medium as the data, no master clock or timing pulses need be inserted in the signal stream since the control characters, whether Command or Status, are automatically inserted into the transmitted signal stream when there are no data characters available to be transmitted.

Yet, another object of this invention is to provide an apparatus for transmitting information between remotely located data processing stations wherein synchronous operation is maintained by interlacing control characters during the intervals when no data characters are available for processing and transmission.

When data is not being transmitted and control characters are automatically inserted into the signal stream it is desirable to establish priority between the type of control characters that may be transmitted. Thus, if the Computer at one location is ready to send a Command Signal to the Tape Transport at the remote location, that signal is given priority over a Status Signal from the Tape Transport at that location to the Computer at the remote location. In this way, the Computer time, which is by far the most expensive element in the Data Processing System, is always given precedence since the moment the Computer indicates it is ready to receive and process data by generating a Command Signal, this signal is given precedence over any tape status signals. The only time the Command Signal is not accepted is if the Tape Transport is transmitting data, and the other Computer is receiving data and processing it. In this manner, the most efficient utilization of the Computer time may be realized even though the data to be processed by the Computer is coming from a remote geographical location.

It is, therefore, still another object of this invention to provide a system for transmitting both data and control characters between remote locations wherein priority between data and control signals and between various types of control signals is established.

The system is further characterized by the fact that it is designed to protect the two geographically remote Data Processing Systems against erroneous operation by providing a degree of redundancy whenever control signals of any type are transmitted. That is, since all of the information, whether data characters or control, is transmitted over a wideband transmission medium, such as a microwave link, an R.-F. radio link, or a cable, the possibility of fades or some loss of information due to the characteristics of the transmission medium is always present. The data characters, or any sequence of them, carry information internally in the form of parity characters which will indicate the loss of one or more characters, thus causing the Computer to order the tape to reverse and repeat the record. That is, any collection of characters, in the form of a record contained on the magnetic tape, contains horizontal and vertical parity characters which indicate to the Computer some error in transmission if a number of the data characters are lost. The control signals, however, do not contain any such internal information; and, hence, some means must be provided to guard against erroneous operation due to loss of such control signals. By providing a degree of redundancy is an appealing solution in that neither a Command or a Status Signal will be effective to produce any action unless the particular character representative of the particular Command or Status, is repeated successively four times. If there is some fading, loss of character, or the generation of a spurious character due to noise, thus interrupting the sequence for consecutive characters, the circuit operates to reset itself and prevent operation until four consecutive control characters of the same type are received.

It is, therefore, yet another object of this invention to provide a system for transmitting information between two remote data processing centers wherein the transmission of control characters in the signal stream is ineffective to produce any action unless the particular control character is received consecutively a given number of times.

Other objects and advantages of the invention will be appreciated as the description thereof proceeds.

In accordance with one of its aspects, the system, for processing and transmitting data between two remotely located Data Processing Centers X and Y, contemplates taking data characters from a magnetic tape at Location X in the form of parallel bits and converting the same to a serial bit stream in a Serial Encoder. In the absence of data characters from the magnetic tape, a control circuit inserts control characters, either Command or Status, into the serial stream in response to an indication from the Serial Encoder that no data characters are being received from the magnetic tape. The synchronous stream, now containing both data and control characters, is modulated onto a suitable carrier and transmitted over a communication medium such as a microwave link, an R.-F. transmission system or a cable to Location Y. The modulated carrier, containing the bit stream received at Location Y, is then demodulated. The demodulated bit stream is applied to a Serial Decoder wherein the characters are identified to determine whether they are data or control characters. The data characters are gated to the Computer at Location Y. If control characters are received, they are further identified as to type. A Status Character, representing the condition of these magnetic Tape Transports at Location X, is applied to the Computer at Location Y. Command Characters, on the other hand, from the Computer at Location X, are applied to a Tape Transport at Location Y causing it to execute the commands from the Computer at the Location X. Simultaneously, Data or Command or Status Characters from the Location Y are transmitted over an identical system to the Location X. In this manner, a continuous, synchronous stream of data and control characters is simultaneously transmitted in both directions between these remotely located Data Processing Centers.

The novel features, which are believed to be characteristic of this invention, are set forth in particularity in the appended claims. The invention itself, however, both as it its organization and method of operation, together with further objects and advantages thereof, may best be understood by reference to the following description taken in connection with the accompanying drawings in which:

FIG. 7 is a schematic, in Block Diagram Form, of the modulator which receives the serial bit stream and modulates it on a carrier for transmission over the communication medium.

Figure 1:
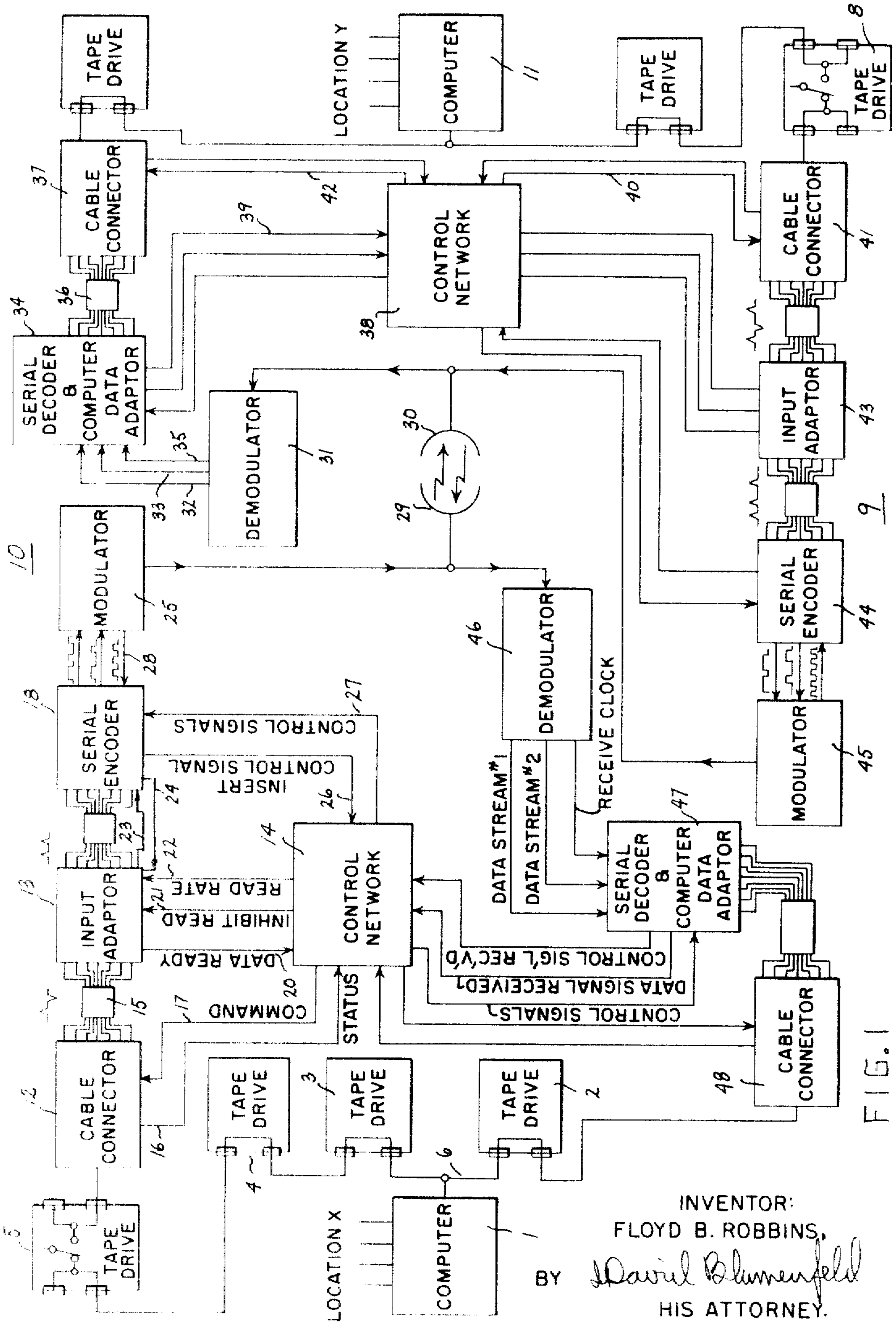
FIG. 1 is a Block Diagram of the over-all system showing the major components thereof.

Before proceeding with the detailed description of the system, its elements and components, it would be useful to provide a glossary of terms which are used in this application, and the meaning of these terms as they are used in this application.

GLOSSARY

ADDRESS—A label, name, or number identifying a location or a device where information is stored. Thus, a Tape Transport, containing a magnetic tape having data stored therein, may be identified by such an address.

AND GATE—A pulse circuit or network with two or more input wires and one output wire, which has the property that a pulse is produced on output wires *if, and only if,* all of the input wires receive pulses. The circuit may be further identified as to polarity. For example, a plus (+) AND GATE would be one that produces a negative output if and only if positive pulses are received simultaneously on all of the input wires. Conversely, a negative (−) AND GATE produces a positive (+) output if and only if negative pulses are simultaneously received on all the input wires.

BINARY—A sequence of symbols consisting of ONES (1's) and ZEROS (0's) (the digits of the binary notation which represents a letter, digit, or other character).

BIT—A binary digit; the smallest unit of information; a single pulse in a group of pulses.

CHARACTER—A representation of any single symbol (number, letter, punctuation symbol, etc.) in a pattern of ONES (1's) and ZEROES (0's) representing a pattern of positive and negative states and pulses.

CLAMPING CIRCUIT—A circuit which maintains steadily either one or two amplitude extremes of a wave form.

CLOCK FREQUENCY—The frequency of periodic pulses which schedules the operation of any part of the system.

COMMAND—A pulse signal or set of signals initiating one step in the performance of the equipment.

COUNTER—A mechanism which totals digital numbers and which can be reset to ZERO (0).

FLIP FLOP—An electronic circuit having two stable states such that as each successive pulse is received, the voltage at the output changes, if it is low—to high, and if it is high—to low.

ONE SHOT—An electronic circuit having only one stable state. The receipt of an input pulse reverses the stable state so that the voltage on the output line changes. However, a fixed period of time, after receipt of the input pulse, the circuit reverts to its original state, and the output voltage returns to its original value.

OR GATE—A circuit which has two or more input lines and one output line, and which has the property that whenever a pulse is present on any of the input lines, a pulse is provided on the output line. The gate may be further identified by polarity. Thus, a minus (−) OR GATE has the property that whenever a negative pulse is present on any of the input lines a positive pulse is provided on the output line; and, conversely, a plus (+) OR GATE is one which has the property that whenever a positive (+) pulse is present on any of the input lines, a negative (−) pulse is provided on the output line.

PARITY CHECK—Use of a digit or character (called the parity digit or character) carried along as a check and which indicates whether the total number of ONES (1's) in the character or the total number of characters is odd or even.

REWIND—To return a magnetic tape to its beginning.

SHIFT REGISTER—A circuit for storing a character in which the individual bits of the character are stored in parallel and then read out in serial form.

The following convention is also used in connection with bistable devices, such as Flip Flops to describe their output voltages for various states of the device. Since the device, such as a Flip Flop, has two stable states, and may have two individual outputs, the condition of these outputs for the various stable states must be defined. Thus, the Flip Flop has two output terminals which are customarily denominated as the ONE TERMINAL and the ZERO TERMINAL. The two stable states of a Flip Flop represent, respectively, the logical ONE and ZERO states. The following tabulation shows the outputs at the ONE and ZERO TERMINAL for the logical states.

| LOGIC | ONE TERMINAL | ZERO TERMINAL |
|---|---|---|
| ONE (1) | 0 Volts | +V (usually +6 Volts). |
| ZERO | +V (usually −6) | 0 Volts. |

Similarly, the terms SET and RESET, when used in connection with a bistable device such as a Flip Flop, are used generally to indicate the Flip Flop is SET to the LOGICAL ONE state and RESET to the LOGICAL ZERO state. The output voltages vary as follows:

| ACTION | ONE TERMINAL | ZERO TERMINAL |
|---|---|---|
| SET | 0 Volts | +V (usually +6 Volts). |
| RESET | +V (usually −6 V) | 0 Volts. |

One further convention is utilized for sake of simplicity of notation. The converse or negative of a condition, event, or item is identified by placing a bar ——— over the name or identity of the condition, event, or item. Thus, for example, the status NOT READY may be noted as $\overline{\text{READY}}$. Similarly, if a clock pulse train is denominated as CLOCK, then a 180° out of phase pulse train is the NOT CLOCK train, or $\overline{\text{CLOCK}}$.

FIG. 1 illustrates, in Block Diagram Form, the major functional components of a system for providing full duplex transmission of data and control characters between a Data Processing Location X and a Remote Data Processing Location Y. The Data Processing Center X may include a Computer 1 and a plurality of Tape Transports 2, 3, 4, 5, etc., coupled to the Computer through a Cable 6. The Computer sends commands to each of the Tape Transport Drives causing them to perform certain operations consistent with the program of the Computer. The Computer may take information from any one of the tape drives in order to carry out any of the computational processes or, conversely, it may store information on the indivdiual tapes of the Tape Transport after having processed the same. Thus, the Computer, through unique select and address signals, may choose any of the Tape Transport located at its own physical location. Computer 1 may also be connected through the Cable 6 and the Data Transmission System to Tape Transport 8 located at the Remote Data Processing Center Y. The Tape Transport located at Y transmits the data from Y to X through a data transmission path shown generally at 9. Simultaneously, data from one of the Tape Transports at Location X, such as Tape Transport 5, is transmitted over another data transmission channel shown generally at 10 to a Computer 11 located at Y. Computer 1 simultaneously transmits Command Signals for Tape Transport 8 through the Transmission Path 10 by interlacing the same in the data character stream from the Tape Transport 5. Similarly, Status Characters from Tape Transport 8 and Command Characters from Computer 11 are transmitted from Y to X over Transmission Channel 9 by being interlaced with the Data Characters transmitted from Tape Transport 8. In this fashion, a continuous stream of Data, Command, and Status Characters are transmitted in both directions between Data Processing Center X and Data Processing Center Y.

Channel 10 transmits Data and Control Characters from Location X to the Computer at Location Y. The Data Characters from the tape and Status Characters from the tape drive mechanism are connected through the Cable Connector 12 to an Input Adapter 13 and to Control Network 14. The Data Characters are taken from the tape, not shown, by suitable magnetic reading heads and are coupled to the Input Adapter 13 through a Seven Strand Cable 15. Customarily, one Data Character consists of seven individual bits located on seven independent parallel tracks on the magnetic tape. These seven bits usually consist of six informational bits and one parity check bit. These seven bits appear as seven parallel input pulses and are usually in bipolar form as shown by the wave form adjacent to Cable 15. That is, in a typical system of binary code notation, each Binary ONE (1) is represented by a voltage pulse and the Binary ZEROES (0's) by a zero voltage level. Status Signals, which are obtained from the Tape Drive Transport, are transmitted over Lead 16 to Control Circuit 14 to be converted to suitable binary coded form for subsequent interlacing with the data character stream. These Status Characters represent, as the name indicates, the condition of the Tape Transport. These status conditions are:

READY—indicating that the tape and Tape Transport are ready for activation upon suitable command from the Remote Computer to advance or reverse the tape;

READY AT LOAD POINT—indicating that the tape is at its very physical beginning which is customarily denominated at the load point;

NOT READY ($\overline{\text{READY}}$)—indicating that for some reason the tape is not ready;

Similarly, command pulses from Remote Computer 11 are transmitted from Control Circuit 14 to the tape drive mechanism through Cable Connector 12 and over Command Lead 17. These command pulses actuate the tape drive causing the same to perform the desired actions such as:

GO FORWARD
GO REVERSE
REWIND

The Input Adapter 13 rectifies and shapes the bipolar pulses to convert them to unipolar pulses, corrects for character skew and bit scatter introduced by the Tape Transport, and holds the character for synchronous introduction into Serial Encoder 18. Input Adapter 13 also adds an eighth (8th) bit to the Data Character which performs an identification function. This permits subsequent identification of a character bit so that the Serial Decoder at the Y Location may distinguish between Data and Control Characters. Input Adapter 13 provides a data receive signal to Control Network 14 over Lead 20 which indicates that Data Characters are being received from Tape Transport 5 so that the Control Network may sense the end of any given record (constituting a group of characters).

Input Adapter 13 also receives an Inhibit Read Signal from the Control Network over Line 21 and a Read Rate Signal over Line 22. The Inhibit Read Signal is generated in response to certain status signals from the Tape Transport 5. It inhibits Input Adapter 13 and prevents transfer of Data Characters to the Serial Encoder when the tape is at LOAD POINT, and for a fixed interval thereafter, and when the tape is at end of record, and for a fixed interval thereafter. The Inhibit Read Signal is required to prevent the Input Adapter from being actuated during intervals between records on the tape and during the interval between LOAD POINT, which is the physical beginning of the tape, and the first record on the tape. If this were not done, spurious Data Characters might be generated because random electrical pulses might be produced by the Read Heads during the intervals between records and between the beginning of the tape and first record.

The Read Rate Signal controls the rate at which Data Characters are transferred out of Input Adapter 13 and is a function of the density at which the data is stored on the magnetic tape and the speed at which the magnetic tape is driven.

Whenever a Data Character is received by Input Adapter 13, a signal, indicating that fact, is transmitted to Serial Decoder 18 over Line 23. The Serial Encoder, in turn, transmits a suitable enabling signal back to the Input Adapter over Line 24 which causes the transfer of the Data Character from the Input Adapter to the Serial Encoder. The Serial Encoder accepts the eight bit Data Character, converts it from parallel to serial form, and transmits it, as two simultaneous data bit streams of four bits each, to Modulator 25. Serial Encoder 18 also contains circuitry for sensing the absence of a Data Character in the Input Adapter and for generating a signal which is transmitted over Lead 26 to Control Network 14 calling for the insertion of a Control Character. The Control Character is generated in a Control Character Encoder, forming part of Control Network 14, and is applied to the Serial Encoder over Lead 27. The bit stream from the Serial Encoder is read out of the Encoder at a clock frequency rate by means of the clock pulses supplied from Modulator 25 over Lead 28.

The data streams are impressed on Modulator 25 where they are modulated onto a carrier to produce a double sideband, carrier suppressed signal which is radiated into free space by means of the Antennas 29 for transmission to the Remote Location Y. The Modulated Carrier, which also includes a low level tone signal at the clock pulse frequency, may obviously be transmitted over a medium other than a microwave link such as shown in FIG. 1. Any sort of R.-F. transmitter, cable transmission channel, etc., may obviously be used to propagate the Modulated Carrier from Location X to Location Y.

At Location Y, the radiated carrier signal is intercepted by Antenna 30 and impressed on a Demodulator 31 where the Data and Control Character Bit Stream, including the clock frequency tone signal, is retrieved, and the two bit streams transmitted over Leads 32 and 33 to a Serial Decoder 34. The clock pulses are similarly transmitted to the Serial Decoder over Lead 35. Serial Decoder 34 reverses the function of the Serial Encoder. The incoming data and status bits in serial form are converted to parallel bits and connected through a Cable Connector 36 and the Computer Cable 37 to Computer 11. If Data Characters are received, an inhibiting signal is transmitted to Control Network 38 over Lead 39 to prevent further Command Characters from Computer 11 from being transmitted to Data Processing Location X.

If Control Characters are being received, the Control Characters are gated to a Control Identification and Control Counter Circuit which identifies the type of Control Character and counts their number to determine whether four consecutive Control Characters of the same type have been received. If so, these Control Characters are applied through the Control Signal Adapter and Line 40 to Cable Connector 41 and thence to Tape Transport 8 at Location Y, causing the Tape Transport to execute the actions called for the Computer 1 at Location X. If, on the other hand, they are Status Characters from the Tape Transport 5 at Location X, the Status Characters are transmitted from the Control Network 38 over Lead 42 to Cable Connector 37 and thence to Computer 11 to inform the Computer of the status of the Tape Transport at Location X. Transmission Channel 10 thus functions to transmit data from a Tape Transport at Location X to a Computer at Location Y; commands from the Computer at Location X to a transport at Location Y; and Status Characters from the Tape Transport at Location X to the Computer at Location Y.

Channel 9 is identical in construction with Channel 10 and includes an Input Adapter 43, a Serial Encoder 44, a Modulator 45, a Demodulator 46, a Serial Decoder and Computer Data Adapter 47, and a Cable Connector 48. Channel 9 thus transmits data from Tape Transport 8 at Location Y to Computer 1 at Location X; transmits commands from Computer 11 at Y to the Tape Drive 5 at X; and Status Characters from Tape Transport 8 to Computer 1. By means of these two channels, complete duplex operation is achieved so that two geographically Remote Data Processing Centers at X and Y interact to perform their functions most efficiently.

A typical operational sequence between two remotely located Data Processing Systems, such as X and Y, may be described in simplified form in the following manner:

Assume that Location X is the central processor and that Computer 1 located there is a very large unit while the Computer 1 located at Y is a small peripheral computer; further, let it be assumed that the user at the Location Y has data punched into cards and desires a print-out of the processed results—the operational sequence would then be as follows:

(1) The cards are read into Computer 11 at Location Y via any suitable card reading equipment which forms part of the Computer complex.

(2) Computer 11 at Location Y processes the data and writes the information on a magnetic Tape Unit 8 for transmission to the Central Processor X and the Computer 1 located there.

(3) The operator at Location Y switches the tape unit either manually or by means of selecting an address on the Computer to Channel 9 and places the tape in a READY status.

(4) Channel 9 transmits Status Characters from the Tape Transport 8 over Channel 9.

As these Status Characters are received at Location X, an indicating light, or similar device, is energized to indicate that the Tape Transport at the Location Y is READY. The operator at Location X actuates an address selector to the address number of the Tape Transport 8 at Location Y.

(5) The Computer 1 at Location X, having received the Status Characters from Tape Transport 8, indicating the Tape Transport is READY to transmit data, transmits a Command Signal over Channel 10 to Location Y which Command Signal is transferred to the Tape Transport Drive 8 commanding the Transport to perform some action such as GO FORWARD, for example. Tape Transport 8 transmits the Data Characters contained on its tape record by record over Transmission Channel 9 to Computer 1.

(6) The Computer reads the information record by record and may either process it as received or cause it to be written on a second Tape Transport Unit for later processing. If the Computer, for example, processes the information, as it is received, it writes out the response on the Tape Transport 5 located at X.

(7) The operator, at Location Y, then sets the address selector to the address number for the Tape Transport 5 at the Location X and initiates the program at which time the now processed data recorded on Tape 5 is transmitted over Channel 10 back to the Computer 34 at Location Y. It may be seen, therefore, that by means of this Data Transmission Channel, data may be easily transmitted in both directions for various reasons and to perform various operations.

*Input adapter*

Figure 2:
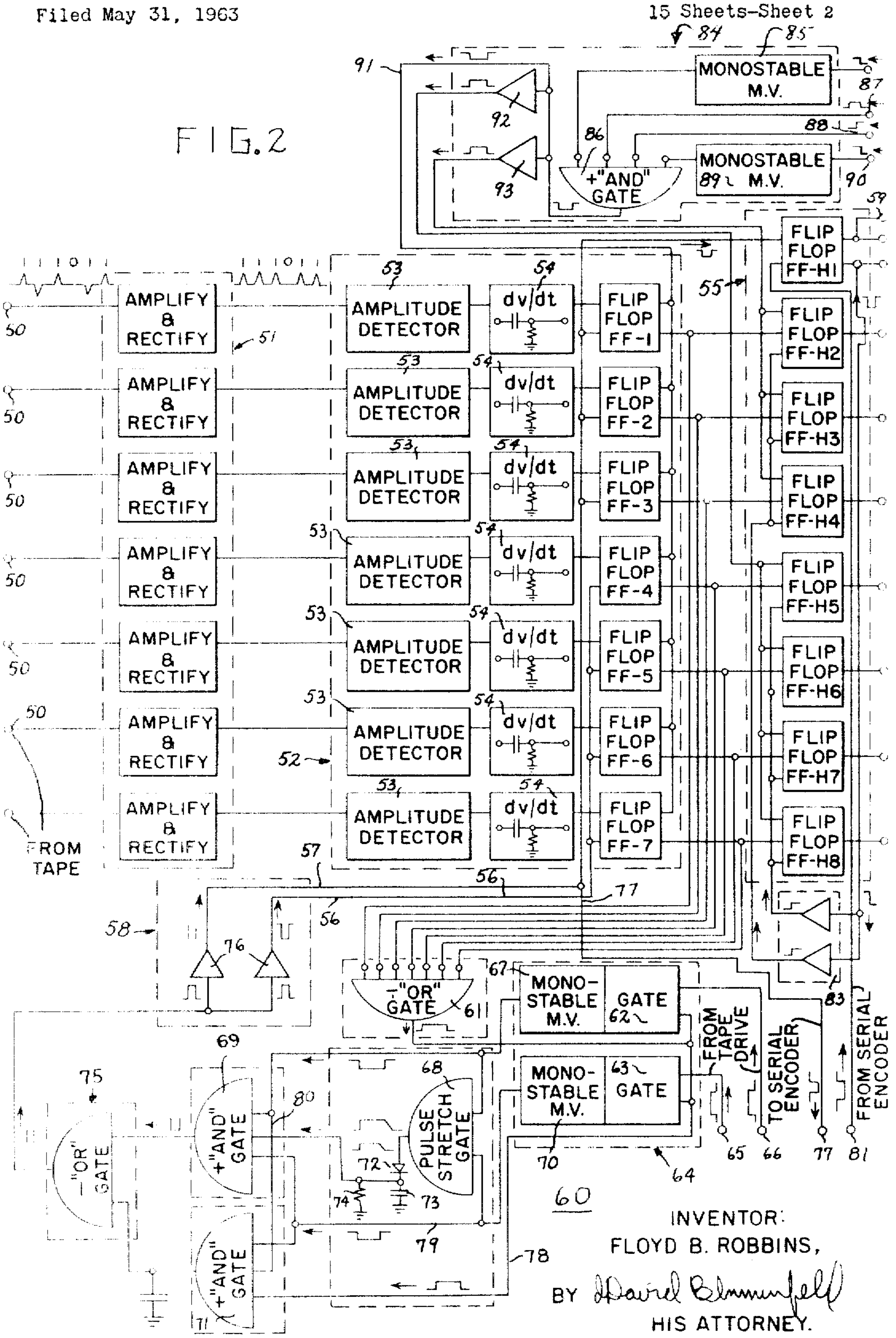
FIG. 2 is a schematic, in Block Diagram Form, of the Input Adapter forming part of the system in which the data characters from the Tape Transport are received and processed.

Input Adapters 13 and 43, which are illustrated in FIG. 2, sense the data bits, rectify and shape the bipolar Binary ONE (1) pulses, correct for character skew and bit scatter, and hold the character for synchronous introduction to the Serial Encoder. Successive data bits from the Tape Transport and Cable Connector are in the form of bipolar pulses, with the anternate positive and negative going pulses representing successive Binary ONES (1's) from any given tape track and the absence of a pulse or zero voltage level representing a Binary ZERO (0). The seven Input Terminals 50 receive the seven parallel bits forming the Data Character from the individual tracks of the magnetic tape. These individual bits in pulse form are applied to a pulse shaping Network 51 which includes amplifying, rectifying and pulse inverting Circuits 52. These circuits amplify the signals and rectify and convert the negative going pulses to produce unipolar positive (+) pulses which are more readily processed.

The positive output pulses, representing the individual Binary ONE (1) bits are applied to a Read Transistor illustrated generally at 52. The Read Translator analyzes the received pulse amplitude and peak timing. Each of the pulses is applied to a threshold such as the Ampltiude Detectors 53 to determine whether the pulse is of sufficient amplitude to be considered a Binary ONE (1). The need for a threshold device of this type is to prevent an erroneous Binary ONE (1) indication due to low level noise or other extraneous pulses. The pulses are then differentiated in Differentiating Networks 54 and used to trigger Flip Flops FF–1—FF–7. The states of the individual Flip Flops represent the particular combination of Binary ONES (1's) and Binary ZEROES (0's) characteristic of the Data Character.

Differentiating Networks 54 are provided so that the Flip Flops are triggered at the same time if the pulses arrive at the same time. Thus, the pulse amplitudes, assuming they exceed the threshold level of Amplitude Detectors 53, do not affect the triggering of the Flip Flop. The time at which two pulses will reach the threshold level depends on the slope of the pulse edge which, in turn, depends on the amplitude of time pulse. Therefore, it is possible that a very large amplitude pulse, arriving at the same time as a low level pulse, which just exceeds the threshold, will reach the threshold level earlier than the low level pulse causing one Flip Flop to be triggered ahead of the other. By differentiating these pulses, voltage cross-over of the differentiated pulse is a function only of the arrival time of the pulses and not of their ampltiude. All of the Flip Flops are, therefore, triggered simultaneously if all of the pulses applied to the input of the Read Translator arrive at the same time.

The Data Characters set in Flip Flops FF–1—FF–7 are transferred to a Holding Register 55 by a negative reset pulse which is periodically applied to the input of the Flip Flops over Reset Lines 56 and 57. The reset or transfer pulses are supplied from the Reset Driver shown generally at 58. Holding Register 55 includes eight Flip Flops FF–H1—FF–H8. Flip Flops FF–H2—FF–H8 are triggered by the outputs of the Read Translator Flip Flops 58. The eighth Flip Flop FF–H1 adds an identifying bit to the seven bits of the Data Character. One of the inputs of Flip Flop FF–H1 is connected to Reset Line 56, and a one bit is set into Flip Flop FF–H1 whenever a Data Character is stored in Holding Register 55. This one bit identifies the character as a Data Character in distinction to a Control Character (Command or Status) which may later be inserted into the bit stream in the Serial Encoder. Thus, the Serial Decoder, at the remote location, can distinguish between a Data Character, the first bit of which is always a Binary ONE (1), and a Control Character, the first bit of which is always a Binary ZERO (0). Output Terminals of Flip Flops FF–H1—FF–H8 are connected to the Serial Encoder. Output Terminal 59 of Flip Flop FF–H1 is connected to the Tape Control Adapter (shown in FIG. 5) for the purpose to be described later in connection with that circuit.

The rate at which the Read Translator Flip Flops are reset to transfer Data Characters to the Holding Register is controlled by Deskew Control Network shown generally at 60. The purpose of this network is to transfer the Data Characters from the Retranslator to the Holding Register at a predetermined rate depending on the density of the Data Characters stored on the magnetic tape and the speed at which the magnetic tape is moved through the Tape Transport. By virtue of this arrangement any errors introduced due to bit scatter or tape skew are eliminated, and overlap between bits from different Data Characters is prevented.

The data from the Read Translator is read out and transferred to the Holding Register at a fixed rate even though the individual bits of a Data Character may be scattered on the tape. The seven bits, making up the Data Character, are stored on the magnetic tape on seven independent tracks which are spatially oriented so that the seven bits are read out simultaneously by the magnetic Reading Heads and arrive simultaneously at the input of the Read Translator. However, the Tape Transports may introduce time lags between bits of the same character. For example, if the tape is skewed relative to the Tape Reading Heads, or if in the recording process one or more bits of the Data Character are not spatially aligned with the remaining bits (bit scatter), a time lag exists between bits of the same character. If the time lag between bits due to bit scatter or tape skew is within a permissible range, the Data Character may be read out and further processed without introducing any possible ambiguities. If the bit scatter exceeds the permissible range, a bit from one character may overlap the bit of the succeeding character. In such a case, it is preferable to read out an incomplete character rather than permit this overlap. The Data Character must, therefore, be read out of the Read Translator a fixed period of time after the arrival of the first bit of the character.

The Deskew Control Network, indicated generally at 60, generates the reset pulse which transfers the characters from Read Translator 52 to Holding Register 55, a fixed period of time after the arrival of the first bit of the character in the Read Translator. This period of time is varied as a function of the tape storage density. The outputs from Flip Flops FF–1—FF–7 of Read Translator 52 are applied to a negative (−) OR GATE 61. OR GATE 61 produces a positive (+) output pulse to start the deskew timing upon the appearance of the first bit of the Data Character. The positive pulse from OR GATE 61 is applied to Gates 62 and 63 forming part of Reset Timing Circuit 64. Positive enabling pulses are applied to Gates 62 and 63 from the Tape Transport over Lines 65 and 66. Only one of the gates is enabled at any given time with the selection depending on the Data Character density on the magnetic tape. If the character density is low, Gate 62 is enabled; and if the character density is high, Gate 63 is enabled.

If the Data Character density is low and Gate 62 is enabled, the appearance of the enabling pulse and the positive pulse from OR GATE 61 produces an output pulse from Gate 62 which triggers a monostable of One Shot Multivibrator 67. One Shot 67 generates a negative timing pulse of fixed duration (29 seconds) which is connected both to Pulse Stretching Gate 68 and positive (+) AND GATE 69. If the Data Character density on the tape is high, on the other hand, Gate 63 is enabled and triggers a corresponding monostable or One Shot Multivibrator 70 which generates a negative (−) pulse of much shorter duration (10 seconds) than the one from One Shot 67. The pulse from One Shot 70 is also connected to Pulse Stretching Gate 68 and to positive (+) AND GATES 69 and 71. The duration of the output pulses from One Shots 67 and 70 determines the Data Characters transfer rate from Read Translator 52 since the reset pulse for transferring the data is generated upon termination of the timing pulses from One Shots 67 and 70.

The Pulse Stretching Gate produces a positive going pulse at its output upon the appearance of the leading edge of the negative input pulse from either One Shot 67 or One Shot 70. That is, the Pulse Stretching Gate 68 is a minus (−) OR GATE which produces a positive output pulse upon the appearance of a negative inpulse at either of its input lines. Pulse Stretching Gate 68 differs from a normal OR GATE in that it contains a Diode 72 and a Capacitance Resistance Network 73 and 74 which deteriorates the trailing edge of the positive output pulse produced thereby. When the leading edge of the negative input pulse is applied to Gate 68, the output of the Gate goes positive. This positive pulse is applied to a Diode 72. The Diode is connected in series with Capacitor 73 and so poled that the Capacitor is charged to the amplitude of the positive output pulse from the Gate. Capacitor 73 is shunted by Resistance 74 which provides a discharge path for the Capacitor. When the negative pulse applied to the Pulse Stretching Gate terminates, the Output Gate 68 goes negative, and Diode 72 ceases to conduct. Capacitor 73 must thereby discharge through Resistance 74. The time constant of Capacitor 73 and Resistance 74 is so chosen that the voltage across Capacitor 73 discharges at such a rate that for two (2) microseconds after the termination of the negative pulse from the One Shots 67 and 70 the voltage remains positive. Thus, for two microseconds after termination of this negative pulse, AND GATE 69 has positive input voltages both from the One Shots 67 and 70 and from the Pulse Stretching Gate 68. Therefore, Gate 69 generates a negative output pulse after two (2) microseconds, the voltage on Capacitor 73 has decayed sufficiently so that it is no longer sufficiently positive to maintain Gate 69 conducting thereby, terminating the negative pulse from this Gate after two (2) microseconds. The negative pulse from Gate 69 is applied to a negative (−) OR GATE 75 which produces a positive output pulse at its output lead whenever negative pulse is applied to either of its input leads.

The positive output pulse from OR GATE 75 is applied to Read Translator Reset Driver 58 to produce the negative reset pulses for Flip Flops FF–1—FF–7. Reset Driver 58 consists of two inverting Amplifiers 76 which invert the positive pulses from OR GATE 75 to produce negative reset pulses which are applied to the inputs of the Flip Flops over Lines 56 and 57. It can be seen that the two (2) microsecond reset pulse from minus (−) OR GATE 75 occurs a fixed period of time after the first bit of the Data Character is set into the Flip Flops FF–1—FF–7, with the time period being dependent on whether the Data Character density is high or low. That is, typically the duration of the output pulse from One Shot 67 is twenty-nine (29) microseconds whereas the duration of the output pulse from One Shot 70 is ten (10) microseconds. With a low Data Character density, the Data Character is transferred to the Holding Register thirty-one (31) microseconds after the appearance of the first bit of the character, whereas with a high Data Character density, the Data Character is transferred to the Holding Register twelve (12) microseconds after the arrival of the first bit of the character.

Plus (+) AND GATE 71, the output of which is also connected to OR GATE 75, clears OR GATE 75 in the event that the Read Translator Flip Flops are accidentally set before One Shots 67 and 70 have recovered from the previous character. Thus, if the output pulse from minus (−) OR GATE 61 receives another pulse from Flip Flops FF–1—FF–7 before One Shots have recovered sufficiently to be triggered again, the positive pulse from OR GATE 61 and the positive output voltages from Flip Flops 67 and 70, in their normal state, are applied to AND GATE 71 over Leads 78, 79, and 80. A negative pulse is thus produced at the output of AND GATE 71, which actuates OR GATE 75, to generate a positive pulse to reset Driver 58 to reset all the Flip Flops in the Read Translator.

Figure 3:
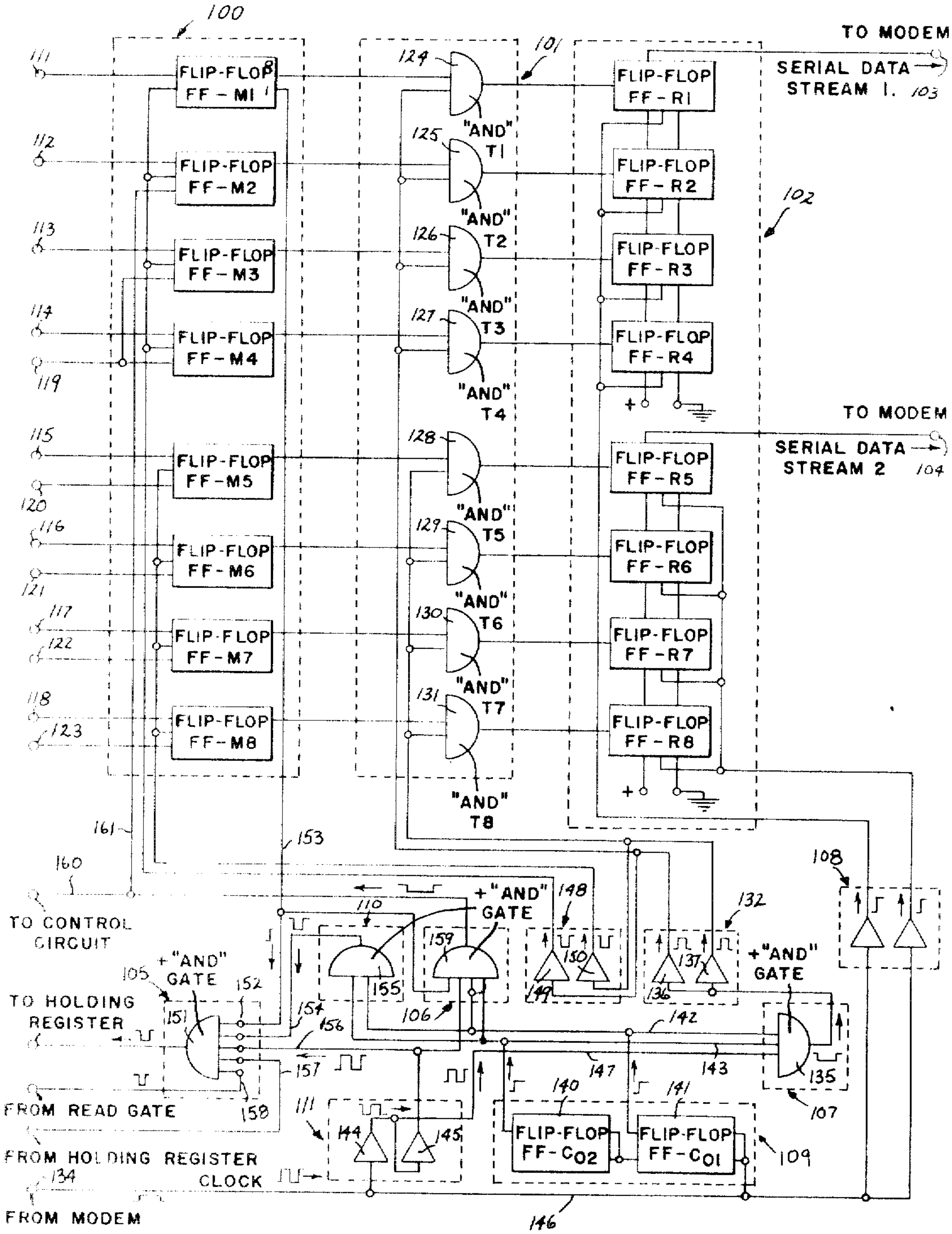
FIG. 3 is a schematic, in Block Diagram Form, of the Serial Encoder wherein the parallel character bits are transposed to serial form, and control characters are interlaced with the data characters to provide synchronous operation.

The Reset Pulses from Reset Drivers 58 are also coupled over Line 77 to the Serial Encoder where they are utilized to determine when the Holding Register to Serial Encoder Shift Pulse, appearing on Line 81, is generated. Since the transfer of Data Characters from the Holding Register to the Serial Encoder should not take place during the time that Data Characters are transferred from the Read Adapter to the Holding Register, the Reset Pulses supplied to the Serial Encoder are used to inhibit the circuit which generates the Holding Register to Serial Encoder Shift Pulse which will be described presently in connection with the Serial Encoder illustrated in FIG. 3. The Shift Pulse is thus generated only if there is no Reset Pulse present and applied to Holding Register Flip Flop FF–H1 to reset this Flip Flop and transfer the binary bit stored there to the Serial Encoder. When Flip Flop FF–H1 is reset by the Shift Pulse, a Reset Pulse for Flip Flops FF–H2—FF–H8 is generated at Output Terminal 59 and transmitted over Line 82 and Inverters 83 to reset Flip Flops FF–H2—FF–H8.

The transfer of Data Characters between Read Translator 52 and Holding Register 55 is also controlled by a Data In Enabling Circuit shown generally at 84. This circuit, under certain conditions, inhibits both the Read Translator Flip Flops and the Holding Register Flip Flops. The Data In Enabling Circuit 84 is provided to make sure that the Read Translator and Holding Register cannot accept any electrical pulses from the tape when the tape is either at LOAD POINT (LP), moving between LOAD POINT and the first record, or moving between records. That is, if the tape is at LOAD POINT (which is the physical beginning of the tape), and the Computer at the remote location orders the tape to move forward to the first record, there is an interval on the tape between the LOAD POINT and the first record where no Data Characters are recorded. However, one can never be certain that there are not randomly magnetized areas on the tape which the Read Heads will read as character bits. Obviously, it is highly desirable to disable the Input Adapter during this interval so that no such spurious signals are read into the Input Adapter and transmitter erroneously as Data Characters. Similarly, between records on the magnetic tape (where records constitute any finite number of Data Characters which are stored together), there is also an interval in which no Data Characters are recorded. If the tape stops at the end of a record and is subsequently ordered by the Computer to GO FORWARD, it is also desirable to prevent the Input Adapter from receiving any signals until the tape has reached the beginning of the new record lest any spurious signals from the Read Head be transmitted as Data Characters. The Data In Enabling Circuit performs this function and inhibits the Input Adapter and Holding Register when the tape is moving between LOAD POINT and the first record and between records.

The Data In Enabling Circuit 84 consists of a One Shot 85 which receives a negative pulse from the Tape Drive Actuating Circuit of the Tape Control Adapter (FIG. 5) whenever a GO Signal has been received from the Remote Computer. The negative pulse triggers One Shot 85 to produce a negative pulse of a fixed duration. This negative pulse, which is preferably 3.5 milliseconds long, is applied to plus (+) AND GATE 86. This inhibits AND GATE 86 for the duration of the pulse and also inhibits the Read Translator and the Holding Register. The duration of this negative pulse is so chosen that the tape moves from the space between records to the first character of the succeeding record during this interval. At the end of 3.5 milliseconds the output of the One Shot goes positive again enabling AND GATE 86.

The other inputs to AND GATE 86 are (1) a positive pulse at terminal 87 from the Tape Transport whenever the tape leaves the LOAD POINT on order of the Computer; (2) a positive pulse from Terminal 88 as long as the Computer sends GO Commands to the Tape Transport; and (3) a positive pulse from One Shot 89, a fixed interval (14.5 milliseconds) after the tape leaves the LOAD POINT on a GO Command from the Computer. As long as the tape is at LOAD POINT, the output of One Shot 89 is positive. However, AND GATE 86 is disabled because the input to Terminal 87 is negative whenever the tape is at LOAD POINT. As soon as the tape leaves the LOAD POINT, the input at Terminal 87 goes positive. The input to One Shot 89 at Terminal 90 goes negative. This negative edge triggers One Shot 89 and produces a 14.5 millisecond negative output pulse which inhibits AND GATE 86 until the tape has moved from the LOAD POINT to the first record. At the end of 14.5 milliseconds the One Shot returns to its original state, and its output goes positive. All of the inputs to AND GATE 86 are now positive, a negative pulse is produced to enable the Read Translator and the Holding Register.

The negative output pulse from AND GATE 86 is applied over Lead 91 to Flip Flops FF-1—FF-7 enabling them to receive Data Characters from the tape. The negative pulse from AND GATE 86 is also inverted by Inverting Amplifiers 92 and 93 and the positive pulses applied to Hold Register Flip Flops FF-H1—FF-H4, and FF-H5—FF-8, respectively.

The operation of Data In Enabling Circuit 82 may be more easily grasped by considering the following sequence of operation:

If the tape is at LOAD POINT (the physical beginning of the tape), and the Tape Transport receives a GO FORWARD Command from the Remote Computer, One Shot 85 receives a negative input pulse that triggers it and produces a negative output pulse of 3.5 milliseconds duration. Simultaneously, Terminal 88 receives a positive pulse in response to a GO Command from the Remote Computer. As soon as the tape leaves LOAD POINT, Terminal 87 goes positive. The input to One Shot 89, however, goes negative whenever the tape has moved off the LOAD POINT. This triggers Flip Flop 90 and produces a 14.5 milliseconds negative pulse. At the end of 3.5 milliseconds, One Shot 85 returns to its original state, terminating the negative pulse. One Shot 89, however, continues in its triggered state for another 11 milliseconds so that AND GATE 86 is not enabled until the end of the 14.5 millisecond pulse at which time the tape has reached the first record after LOAD POINT.

In the event that the tape was not at LOAD POINT, but has stopped between records, the input to One Shot 89 has remained negative without any further negative going triggering edges so that its output stays positive. Similarly, the Input Terminal 87 is positive as long as the tape is not at LOAD POINT. The input to Terminal 88 goes negative whenever the Computer orders the Tape Transport to GO FORWARD. However, One Shot 85 is triggered by the negative pulse generated in Tape Control Adapter when a GO Command is received from the Remote Computer and produces a negative pulse at its output which inhibits AND GATE 86 for the duration of the negative pulse. It will be recollected that the purpose of this 3.5 millisecond delay is to permit the tape to move from the physical space between records on the tape to the beginning of the succeeding record without permitting the Read Heads to introduce any spurious signals into the Input Adapter while this portion of tape between records is traversed. At the end of the 3.5 millisecond interval, One Shot 85 returns to its original state, and its output goes positive. As soon as One Shot 85 goes positive, all the inputs to AND GATE 86 are positive, producing a negative output pulse from this Gate which is applied to Lead 91 and Inverters 92 and 93 to enable the Read Translator and Holding Register Flip Flops. The Input Adapters are now ready to receive Data Characters from the tape.

To sum up, it may be seen that the Input Adapter receives parallel data bits from the Tape Transport as bipolar pulses, converts these to unipolar pulses, and shifts these to Holding Register 55 at a predetermined rate depending on the Data Character density on the tape. The receipt and shifting of Data Characters from the tape is controlled by the Data In Enabling Circuit so that the Input Adapter receives data only if the tape is not at LOAD POINT, and has not been at LOAD POINT for at least 14.5 milliseconds (i.e., has moved from LOAD POINT to the first record, the tape is not between records and has not been for 3.5 milliseconds (i.e., has moved to the next record); thus, the Data In Enabling Circuit insures that the Tape Input Adapter is enabled and ready to receive electrical signals only if the tape and its associated Reading Heads are in such condition that Data Characters, and not spurious electrical signals, are received.

*The serial encoder*

The Serial Encoder receives data from the Tape Input Adapter whenever a Data Character is stored in the Holding Register by generating a Shift Pulse which resets the Holding Register Flip Flops. The Serial Encoder converts the parallel Data Character Bits to serial form in a suitable Shift Register. If no Data Character is available in the Holding Register of the Input Adapter, the Serial Encoder generates a Control Character Pulse which is transmitted to the Control Circuit calling for the insertion of a Control Character, either Command or Status, into the bit stream. The Control Characters are interlaced with the Data Characters to produce a synchronous serial bit stream of interlaced Data and Control Characters.

It will be appreciated that the Control Characters are inserted not only at the end of a record when the tape is stopped, but may also be interlaced between Data Characters from any given record. Since the Data Character density may vary, in any event, may be less than the block rate at which any characters are read out, Control Characters are inserted to maintain synchronous operation.

The Serial Encoder includes a Mixing Register 100 coupled both to the Holding Register of the Input Adapter and to the Control Circuit so that either the Data Character from the Input Adapter or the Control Character from the Control Circuit may be inserted into the Serial Register. A Gating Circuit 101 is connected between the Mixing Register 100 and a Shift Register 102 which accepts the eight parallel bits of the character and converts them to two serial bit streams of four bits each at Output Terminals 103 and 104. The Serial Encoder also includes a Shift Pulse Gate 105 for generating the Shift Pulse which transfers the Data Characters from the Holding Register to the Mixing Register, and a Mixing Register to Shift Register Transfer Gate 101 for transferring the characters, whether Data or Control, from the Mixing Register to the Serial Shift Register. In addition, a Shift Register Reset Driving Circuit 108 is provided which applies clock pulses to the Shift Register to read out the bits in serial form. A Counter 109, a Gate 110, and a Clock Pulse Inverter 111 are provided to control Shift Pulse Gate 105 and to assure that the transfer of Data Characters from the Holding Register of the Input Adapter to the Mixing Register of Serial Encoder takes place under the proper conditions.

Mixing Register 100 consists of eight Flip Flops FF–M1—FF–M8 in which the Control and Data Character Bits are stored. These Flip Flops are connected to the Output Terminals of the Holding Register Flip Flops FF–H1—FF–H8 through Input Terminals 111–118 and to the Control Circuit through Input Terminals 119 and 123.

The Data Bits stored in Flip Flops FF–M1—FF–M8 are, for the sake of ease of identification and simplicity of explanation, individually identified as the "D," "C," "B," "A," "8," "4," "2," and "1" Bits respectively. This also identifies the magnetic tape track from which the bit is taken for all but the "A" Bit, which, it will be recalled, was added as a Data Character identifying bit in the Input Adapter. Subsequent references to specific individual bits of a character will be in terms of this scheme for bit identification.

Flip Flops FF–M1—FF–M8 are each connected to one of a plurality of plus (+) AND GATES 124–131 which form Transfer Gate 101. The remaining input to these AND GATES is from Transfer Gate 107 and Transfer Gate Driving Circuit 132. AND GATES 124–131 are connected individually to the eight Flip Flops FF–R1—FF–R9 of Shift Register 102. The Character Bits are applied in parallel to the Shift Register Flip Flops and are read out as two four (4) bit serial data streams by the clock pulses from Shift Register Reset Driving Gate 108.

The Data or Control Characters are transferred from Mixing Register 100 to Shift Register 102 by periodically enabling AND GATE 101. The enabling pulses for the AND GATE are generated by the Mixing to Serial Register Transfer Gate 107. Gate 107 and its associated Transfer Gate Driving Circuit 132 generate the desired enabling pulses during the second half of every third clock pulse received at the clock pulse Input Terminal 134. The clock pulses at Terminal 134 are generated in the transmitter portion of the system, to be described presently, and provide the internal timing which establishes the sequence in which the bits are transferred from Shift Register 102 to the Modulator.

Gating Circuit 107 includes a plus (+) AND GATE 135 which produces a negative output pulse whenever the three inputs to the Gate are positive. The negative pulses from AND GATE 135 are inverted by Inverting Amplifiers 136 and 137 to provide the positive enabling pulses that are applied over Leads 138 and 139 to the inputs of AND GATES 124–136. AND GATE 135 is controlled from Scale of Four Counter 109 and from Clock Pulse Inverter Circuit 111 so that all of the inputs are positive during the second half of every third clock pulse. Counter 109 consists of two Flip Flops 140 and 141 connected in a well known scale of four counting arrangement. Output Leads 142 and 143 from Flip Flops 140 and 141 are positive during the third of every four clock pulses from Clock Pulse Input Terminal 134 and are connected to Gate 135. Thus, during every third clock pulse, two of the Gate Inputs are positive. The third input to AND GATE 135 from the Clock Pulse Inverter is positive only during the second half of the third clock pulse.

Clock Pulse Inverter 111 consists of two Inverter Amplifiers 144 and 145 connected in series and fed from Clock Pulse Input Terminal 134 over Line 146. During the positive first half of any input clock pulse at Terminal 134, the output of Inverter 144 is negative pulse whereas during the negative second half of the input clock pulse the output of Inverter 144 is positive. The output of Inverter 144 is connected to Gate 135 over Lead 147 and also to the input of the second Inverter 145. Thus, it can be seen that the output pulse, appearing on Lead 147, is positive only during the second half of each clock pulse; and, as a result, all of the inputs to Gate 135 are positive only during the second half of every third clock pulse, thus insuring that the characters in the Mixing Register are transferred to the Serial Shift Register 102 only during the second half of every third clock pulse. The inverted clock pulses, appearing at the output of Inverter 144, are reinverted by Inverter 145 so that the output at the terminal of Inverter 144 is in phase with the clock pulses appearing at Clock Pulse Input Terminal 134, and these clock pulses are utilized in Circuits 105, 106, and 110 in a manner presently to be described.

The enabling pulses for Transfer Gate 101 are also utilized to reset Mixing Register 100 to prepare it to receive the next character, whether Data or Control. To this end, the positive enabling pulses appearing at the output of Reset Driver 132 are also applied to a second Reset Driver Circuit 148 which includes a pair of Inverting Amplifiers 149 and 150. These Inverting Amplifiers invert the positive enabling pulses from Reset Driver 132 to produce negative reest pulses which are applied to the reset lines of Flip Flops FF–M1—FF–M8 of the Mixing Register. The negative reset pulses reset all of these Flip Flops to their logical ZERO (0) states so that the Flip Flops are ready to receive the next character.

Whenever a Data Character has been transferred from Mixing Register 100 to Shift Register 102, a new Data Character must be transferred from the Holding Register of the Input Adapter. To this end, a negative Shift Pulse must be generated and transmitted to the Holding Register to reset all of the Flip Flops therein and thereby transfer the bits to the Mixing Register over the Terminals 111–118. Shift Pulse Transfer Gate 105 performs this function and generates a negative Shift Pulse if certain predetermined conditions are met.

It will be obvious, from the previous discussion, that the Shift Pulse to the Holding Register should be generated only in the event that a Data Character is available there. Furthermore, it is also clear that this transfer of the Data Character must not occur before the previous characters set in the Mixing Register have been transferred to the Serializing Shift Register. Furthermore, since the transfer of the character from the Mixing Register to the Serial Register takes place during the third pulse count, it would be highly undesirable to generate the Holding Mixing Register Transfer Pulse during this interval lest the incoming character is simultaneously transferred to the Serial Register with the character previously stored in the Mixing Register. Also, during the interval that a Data Character is being transferred from the Read Translator to the Holding Register it is also undesirable to transfer information from the Holding Register to the Mixing Register since the possibility exists of the character being transferred from the Read Translator to the Holding Register might simultaneously be transferred directly through to the Mixing Register.

Transfer Gate 105 consists of a plus (+) AND GATE 151 having five inputs and one output. The inputs to AND GATE are all positive only under certain restricted conditions so that the Shift Pulse is generated only if these conditions are met. These conditions are (1) that there is Data Character available for transfer in the Holding Register of the Input Adapter; (2) Mixing Register 100 is empty, i.e., the previous character has already been transferred to the Serial Shift Register; (3) the clock pulse count is not at three during which the Transfer Gate Enabling Pulse and Mixing Register Reset Pulse is generated; (4) it is the first half of the clock period; and (5) a Data Character is not being transferred from the Read Translator 54 to Holding Register 55 of the Input Adapter.

The manner in which these conditions are met, so that the negative shift pulse is generated only at the proper time and under the proper conditions, is as follows:

Input Terminal 152 of AND GATE is connected over Lead 153 to Binary ONE (1) Output Terminal of Flip Flop FF–M1. As is well known, a Flip Flop may have outputs from either one or both of the devices making up the Flip Flop. If outputs are taken from both of the devices, these outputs change in opposite directions as the Flip Flop shifts between its two stable states with succeeding input pulses. Thus, for one stable state, one output will be high and the other low. As the Flip Flop shifts to its other stable state, one output goes from high to low and the other from low to high and so forth. These two outputs are customarily referred to at logical ONE (1) Output Terminal and the logical ZERO (0) Output Terminal. The manner in which the outputs vary, as the Flip Flops are set to the Binary ONE (1) and Binary ZERO (0), is shown in the following table:

| | ONE (1) TERMINAL | ZERO (0) TERMINAL |
|---|---|---|
| Binary ONE (1) Bit Set in Flip Flop. | 0 Volts | +V. |
| Binary ZERO (0) Bit Set in Flip Flop. | +V | 0 Volts. |

Thus, Flip Flop FF–M1, which contains the Character Data Identification Bit, has a low or zero voltage level at the ONE (1) Output Terminal as long as a ONE (1) Bit is set in this Flip Flop, which ONE Bit, indicates that a Data Character has been set in the Mixing Register. Hence, the input at Terminal 152 of AND GATE 151 is low, and the AND GATE is inhibited from generating the Shift Pulse as long as a Data Character is set in FF–M1.

Input Terminal 154 is connected to a Count of Three Pulse Generating Circuit 110 which generates a negative inhibiting pulse whenever the Clock Pulse Count is at three. It consists of a plus (+) AND GATE 155 which is connected over Leads 142 and 143 to the Scale of Four Counter 109. Whenever Counter 109 registers a Count of Three (the count during which characters are transferred from Mixing Register 100 to Shift Register 102) the inputs to AND GATE 155 are positive, thereby producing a negative output pulse which inhibits AND GATE 151 and prevents it from generating the Shift Pulse during the third clock pulse.

Input Terminal 156 of the Gate is connected to the output of Clock Pulse Inverter 145. The output of Inverter 145 is of the same polarity as the clock pulses at Clock Pulse Terminal 134 and is, therefore, positive during the first half of each clock pulse, since the incoming clock pulses have been inverted twice by Inverters 144 and 145. Thus, the input to AND GATE Terminal 156 is positive during the first half of each clock pulse thus inhibiting the Gate during the second half of each of the clock pulses.

Input Terminal 157 is connected to Output Terminal 59 of the Flip Flop FF–H1 of Holding Register 55 (FIG. 2). The output of Flip Flop FF–H1 is from the ZERO (0) Terminal so the voltage at this terminal is positive whenever a ONE (1) is set into this Flip Flop, which indicates the presence of a Data Character, since, as pointed out previously, Flip Flop FF–H1 contains an identifying Data Character Bit which has been added to the seven bit character in the Input Adapter. Thus, whenever FF–H1 is set with a ONE Bit indicating the presence of a Data Character, a positive pulse is applied to Input Terminal 157, and the Shift Pulse Gate is capable of generating the Shift Pulse if all the other conditions are met.

The remaining Input Terminal 158 is connected directly to Output Terminal 77 and thence to Lead 57 of the Read Translator Reset Driver 58 of FIG. 2. Whenever a transfer pulse is generated by Deskew Control Network 60 of FIG. 2 to transfer the Data Character from Read Translator 52 to Holding Register 55, a negative output pulse is applied to Input Terminal 158, thereby inhibiting the AND GATE from generating a Shift Pulse which would transfer a Data Character between the Holding Register and the Mixing Register. This insures against an inadvertent transfer of a Data Character from the Read Translator directly to the Mixing Register without storage in the Holding Register.

If, after shifting the character in Mixing Register 100 to the Serial Shift Register 102, there is no further Data Character in Holding Register 55 for transfer to Mixing Register 100, a signal must be generated and transmitted to the Control Circuit so that a Control Character may be inserted into Mixing Register 100 for transfer to the Shift Register and for synchronous insertion into the bit stream. The Control Character Gate 106 generates a pulse which calls for the insertion of a Control Character from the Control Circuit into Mixing Register 100. Load Control Character Gate 106 consists of a plus (+) AND GATE 159 which generates the Control Character Pulse if (1) the Clock Pulse Count is equal to three; (2) the Clock Pulse is during its first half; and (3) Mixing Register is not set, i.e., there is no character in the Register. To this end, two of the inputs to AND GATE 159 are connected to Leads 142 and 143 of Counter 109. As pointed out previously, the outputs appearing at the Leads 142 and 143 are positive during the entire third clock pulse. The output from Inverter 145 of Clock Pulse Inverter 111 is also applied to the input of plus AND GATE 154 so that the input to the AND GATE is positive only during the first half of each clock pulse since the output of Inverter 145 is in phase with the clock pulses due to the double inversion of the clock pulse in Inverters 144 and 145. The remaining input of AND GATE 159 is connected through Leads 153 and 160 to the ONE Terminal of Mixing Register Flip Flop FF–H1. As pointed out previously, the ONE Output Terminal of this Flip Flop is at a zero voltage level whenever a ONE is set in the Flip Flop indicating that the Mixing Register contains a Data Character. When the Flip Flop is reset, to empty the Mixing Register and transfer the character to the Serial Shift Register, the voltage at Output Terminal ONE rises to a positive value. AND GATE 159 is now capable of generating the Control Character Pulse if all of the conditions are proper.

In operation, assume, for example, that a Data Character is present in Mixing Register 100. During the first and second clock pulses, the outputs from Computer 109 are negative, and Gate 159 is inhibited. During the first half of the third clock pulse, the Counter Outputs on Leads 142 and 143 and the output from Inverter 145 goes positive. However, with a Data Character set in Mixing Register 100, a ONE is set in Flip Flop FF–M1, and the ZERO Output Terminal is at ZERO volts. Hence, AND GATE 159 is inhibited, and no Control Character Command Pulse is generated since it will be recollected that the characters stored in Mixing Register 100 are not transferred from the Mixing Register to the Serial Register until the second half of the third clock pulse. Thus, AND GATE 159 is positively inhibited from producing a Control Character Command Pulse when there is a Data Character stored in Mixing Register 10.

After shifting the Data Character from the Mixing Register, during the second half of the third clock pulse, all of the Flip Flops in Mixing Register 100 have been reset to their ZERO states by the Reset Pulse from Reset Driver 148. The voltage at the ONE Output Terminal of Flip Flop FF–M1 rises to a positive value, putting Load Control Character AND GATE 159 in condition to produce the Load Control Character. If no Data Character is now present in Holding Register 55, no Shift Pulse is generated by AND GATE 151, and Mixing Register 109 remains empty. It is, therefore, necessary to insert a Control Character into the Mixing Register for insertion into the bit stream so that synchronous operation of the stream is maintained. During the first half of the following third clock pulse, the Outputs 142 and 143 of Computer 109 again go positive, as does the output of Inverter 145. Since Flip Flop FF–M1 of Mixing Register 100 has not been set ONE state by a Data Character Identifying Bit, the ONE Output Terminal is still positive. All of the inputs to AND GATE 159 are now positive, and a negative output pulse is generated and transmitted over Lead 160 to the Control Network.

The negative Control Character Pulse on Lead 150 is also applied over Lead 161 to Flip Flop FF–M2 of Mixing Register 100 to set this Flip Flop to a ONE state. This is for identification in that the second or "C" Bit, as represented by Flip Flop FF–M2, is always a ONE for a Control Character, and the first or "D" Bit, a ZERO. This may be compared to the Data Character where the first or "D" Bit, as represented by Flip Flop FF–M1, is always a ONE, and the second or "C" Bit, a ZERO. The Control Character Command Pulse, which is generated during the first half of the succeeding third clock pulse, results in the introduction of a Control Character into the Mixing Register which Control Character is immediately transferred to the Serial Register during the second half of the succeeding third clock pulse.

The Control Characters are set into the Mixing Register over Terminals 119–123, Terminal 119 being connected to both Flip Flops FF–M3 and FF–M4, and the remaining terminals are connected individually to Flip Flops FF–M5—FF–M8. Flip Flops FF–M3 and FF–M4 are both connected to Terminal 119 since the bits introduced into these Flip Flops will identify the nature of the Control Character introduced, i.e., whether Command or Status. That is, if a Command Character is to be inserted in the Mixing Register, the polarity of the signal introduced at Terminal 119 is such as to set both of these Flip Flops to the ZERO state, and if a Status Character is to be introduced into Mixing Register 100, Flip Flops FF–M3 and FF–M4 are set to the ONE state. Thus, the third and fourth, or "A" and "B" Bits, are ONES or ZEROES, depending on the type of Control Character. The remaining Flip Flops FF–M5—FF–M8, combinations of ONES and ZEROES set therein, with the combinations defining the type of Status or Command Signal Character which is to be transmitted.

*The control circuit*

Figure 4:
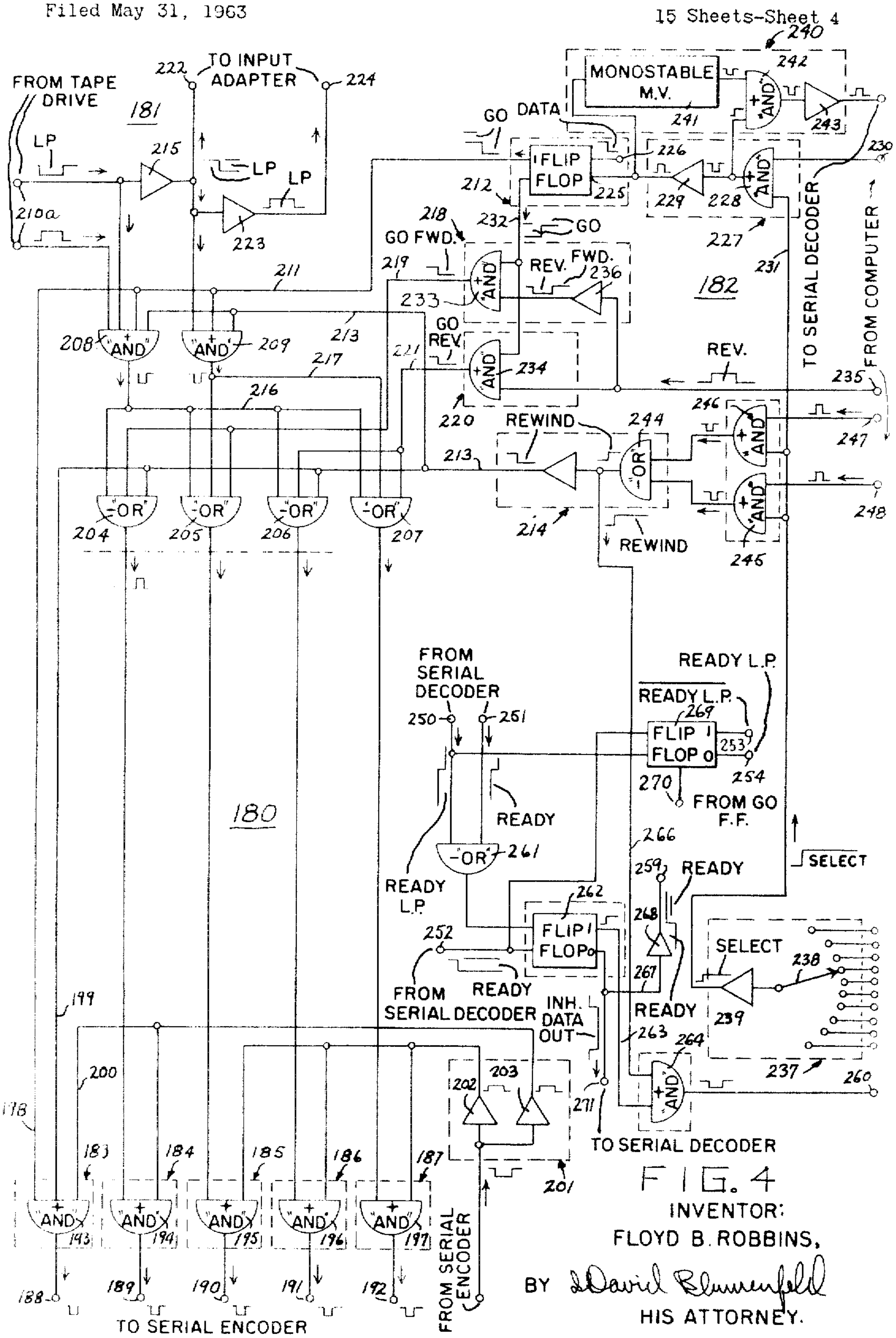
FIG. 4 is a schematic, in Block Diagram Form, of the Control Character Encoder and Computer Control Adapter forming part of the control network wherein Command and Status Signals from the Local Computer and tape drive are received and are converted into proper form for interlacing into the serial bit stream.
Figure 5:
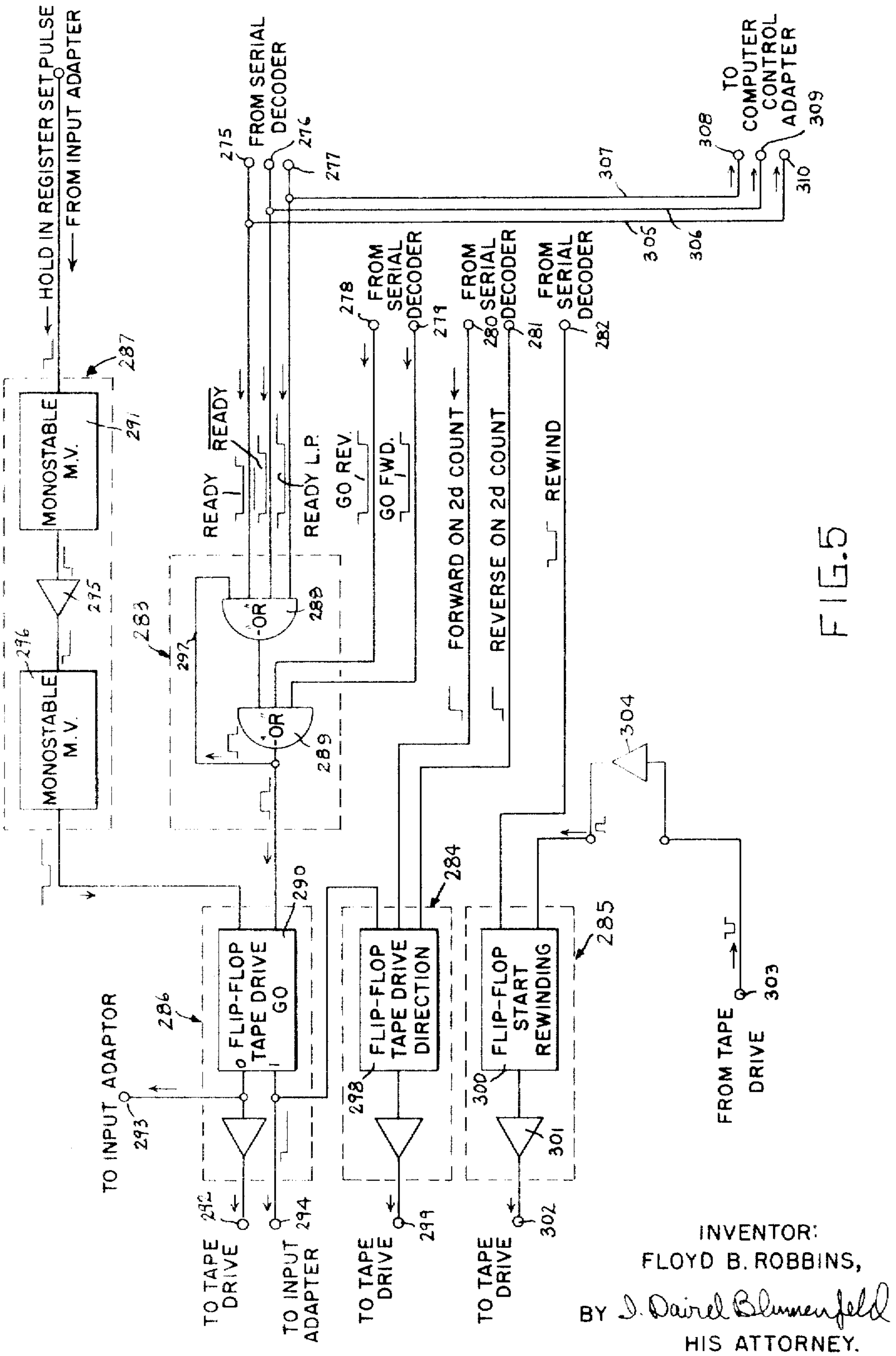
FIG. 5 is a schematic, in Block Diagram Form, of the Tape Control Adapter wherein Command Characters from the Remote Computer are utilized to generate signals which cause the Tape Transport to execute the commands.

The Control Circuit 14, illustrated generally in FIGS. 4 and 5, performs a plurality of functions in the over-all system. The Control Circuit generates Control Characters for insertion into the serial bit stream whenever no data characters are available for transmission. The Control Circuit accepts commond signals from the local Computer for generating the command character to be transmitted to the Remote Tape Transport. The Control Circuit also receives status signals from the Remote Tape Transport, after decoding in the Serial Decoder, and transmits the status signals to the Computer for processing. In addition, it receives the commands after decoding from the Remote Computer and raises the voltages necessary for the local Tape Transport to execute the commands. The Control Circuit consists broadly of a Computer Control Adapter, a Control Character Encoder, and a Tape Control Adapter.

The Tape Control Adapter continually generates status characters indicating the status or condition of the local Tape Transport. If the Tape Transport is in a READY status, a tape READY signal is coupled to the Control Character Encoder for conversion to the proper coded form and for transmission to the Remote Computer. Similarly, if the Tape Transport is not ready to execute Computer Command, a NOT READY ($\overline{\text{READY}}$) character is generated in the Encoder for transmission to the Remote Computer. The Control Character Encoder also receives signals from the Local Computer, converts them to the proper binary coded form and supplies them to the Serial Encoder for transmission to the remote data processing location. The Control Character Encoder is so constructed that commands from the Local Computer to the remote Data Tape Transport is given priority over status signals from the Local Tape Transport to the Remote Computer.

*The control character encoder*

The Control Character Encoder is shown generally at 180 of FIG. 4. The Encoder consists of a plurality of plus (+) and minus (−) OR GATES which generate the proper codes for the various control characters such as READY, NOT READY ($\overline{\text{READY}}$), LOAD POINT (L.P.), GO FORWARD, GO REVERSE, AND REWIND; with the first three being status characters and the latter three command characters. The Control Character Encoder receives input signals representative of the status of local Tape Transport from the Tape Control Adapter, a portion of which is shown at 181 and inputs representative of command signals from the Local Computer from the Computer Adapter shown generally at 182. Control Character Encoder 180 includes a plurality of Control Character Output Gates 183–187 which produce pulses to set Flip Flops FF–M3 of Mixing Register 100 of the Serial Encoder with the proper combination of Binary ONES and ZEROES. Control Character Output Gates include plus (+) AND GATES 193–197 having output terminals 188–192 which are connected to Terminals 119–123 of Mixing Register to set the Flip Flops FF–M2—FF–M8.

AND GATE 193, which sets "A" and "B" Flip Flops FF–M3 and FF–M4 has three inputs, 198–200. Two of these, 198 and 199, are from Computer Control Adapter 182 and the other, 200, from Command Control Character Inverter 291 which receives the Command Control Character from the Serial Encoder. If the Computer Control Adapter receives a command signal from the Computer, Inputs 198 and 199 are negative, AND Gate 193 is inhibited. The output of the gates is, therefore, positive; and Flip Flops FF–M3—FF–M4 remain reset in the ZERO state indicating that a command character is inserted in the register. If, on the other hand, the Computer Control Adapter does not receive a command signal from the Computer, Inputs 198 and 199 are positive. If a Command Control Character from the Serial Encoder is present, the output of Control Character Inverter is positive and Input 200 is also positive causing AND GATE 193 to generate a negative pulse setting Flip Flops FF–M3 and FF–M4 to the Binary ONE state and identifying the character as a status character. Control Character Inverter 201 includes Inverters 202 and 203 which convert the negative Control Character Pulse generated in the Serial Encoder to a positive enabling pulse, which is applied to all of the Control Character Gates 193–197 to insure that these Gates generate Output Pulses only if a Control Character is being called for by the Serial Encoder.

Each of the plus (+) AND GATES 194–197 has an input from one of four individual minus (−) OR GATES 204–207. The OR GATES are controlled in response to Command Signals from Computer Control Adapter 182 and from two Status Signal Control Gates 208 and 209. AND GATE 208 is the READY Code Gate, and will generate a negative output pulse if the Local Tape Transport is READY, and the Local Computer is not sending a command. One input to AND GATE 208 is from a Tape Ready Input Terminal **210*a* which goes positive when the Local Tape Transport is ready to execute Computer Commands. A second input is from LOAD POINT, Indicating Terminal 210, which is at Zero volts when the tape is at LOAD POINT, and rises to a positive value when the tape has left the LOAD POINT, i.e. ($\overline{LP}$). The third input to the Gate is over Lead 211 from Computer Go Flip Flop 212 of Tape Control Adapter 182. Flip Flop 212 has a low or zero level output whenever the Flip Flop is set by the Computer Command Signal, and a high or positive level whenever the Flip Flop is not set by a command. The fourth input to the Gate is over Lead 213 from the Rewind Gate 214. When the Computer generates a REWIND Signal, the output of Gate 214 is at a low or zero level and at a high or positive level when the Computer is not generating a REWIND Signal. It can be seen, therefore, that AND GATE 208 produces a negative output pulse whenever the Local Tape Transport is in READY state, but is not at its LOAD POINT, and the Computer is not transmitting some command such as GO FORWARD, GO REVERSE, or REWIND. It will be immediately appreciated that by connecting several of the inputs of AND GATE 208 to the Computer Control Adapter, an automatic priority for Command Signals over Status Signals is established since a Command Signal produces a low or zero level output from the Computer Control Adapter, thereby inhibiting AND GATE 208** and preventing the encoding and transmitting of a Status Character.

Status Control AND GATE 209 produces negative output pulses whenever the Tape Transport is READY at LOAD POINT, in distinction to being ready at some other portion of the tape. One of the inputs to AND GATE 209 is from LOAD POINT Input Terminal 210 through an Inverter 215. The signal at Input Terminal 210 is at low or zero level when the tape is at LOAD POINT and a high or positive level when not at LOAD POINT ($\overline{LP}$), whereas the Inverter Output is positive when the tape is at LOAD POINT and zero when it has moved from the LOAD POINT. Thus, it can be seen that with the tape at LOAD POINT one input to AND GATE 209 is positive. The other two inputs of the Gate are connected to Computer Go Flip Flop 212 over Line 211 and to Rewind Gate 214 over Line 213. AND GATE 209 thus produces a negative output pulse only if the Tape Transport is at LOAD POINT, and the Computer has not generated a command which has been received by the Computer Control Adapter. Again, it may be seen that the logic is such that a Command Signal is always given preference over a Status Signal since the presence of any Command Signal from the Computer to the Computer Control Adapter produces a low or zero level voltage on one of the inputs of AND gate 209 thereby inhibiting it.

The output of AND GATE 208 provides an input over Lead 216 to each of the minus (−) OR GATES 204–207. It will be immediately apparent that whenever the Tape Transport is READY and there are no Command Signals from the Computer, a positive output pulse appears at each of OR GATES 204–207 which, in turn, produces negative output pulses from each of the AND GATES 189–192, setting Binary ONES in each of Flip Flops FF–M5—FF–M8. The Binary Code for the 8, 4, 2, and 1 Bits of the Character for a READY Character is, therefore, 1 1 1 1. Similarly, AND GATE 193 will set the "A" and "B" Bits of the Character to ONES by setting Flip Flops FF–M3—FF–M4 to the ONE state, indicating that a Status Signal is present. FF–M2 of the Mixing Register has been set to ONE by the Load Control Character to indicate that a Control Character is present, whereas FF–M1 has been set to ZERO in the absence of a Data Control Character. Thus, it can be seen that the Identifying Code for a READY Signal is 0 1 1 1 1 1 1 1. It will also be apparent that if the Tape is either NOT READY ($\overline{READY}$), or at LOAD POINT, Gate 208 produces no negative output pulse and none of the OR GATES 204–207 are energized in the absence of a Command Signal. AND GATES 194–197 are not gated on, and Flip Flops FF–M5—FF–M8 remain reset in their ZERO states, and the 8, 4, 2, and 1 Bits are all ZEROES. Since D, C, B, and A Bits are preset as identifying bits (FF–M1 reset to ZERO, FF–M2 set to ONE by the Control Character Command Pulse and FF–M3 and FF–M4 set to ONE by AND GATE 193), the identifying code for a NOT READY ($\overline{READY}$) Character is 0 1 1 1 0 0 0 0.

The output of AND GATE 209 provides an input over Lead 217 to OR GATES 205 and 207, thus providing a positive output pulse for gating AND GATES 195 and 197 and setting a ONE in Flip Flops FF–M6 and FF–M8 when the tape is READY and READY AT LOAD POINT, and no Command Signals are present. The last four bits (8, 4, 2, 1 Bits) are, therefore, 0 1 0 1, and the entire code is 0 1 1 1 0 1 0 1.

OR GATE 204, in addition to having an input from AND GATE 208 also has an input from GO FORWARD Gate 218 over Lead 219 and from the Rewind Gate 214 over Lead 213. Thus, OR GATE 204 will set the eight bit to ONE by setting Flip Flop FF–M5 whenever the tape is READY or the Computer sends a GO FORWARD or REWIND Command. OR GATE 205, in addition to the input from AND GATES 208 and 209, has an input from GO FORWARD Gate 218 over Lead 219 and will set the four bit of the Character to ONE by setting a Binary ONE in Flip Flop FF–M6 whenever the tape is READY or READY AT LOAD POINT, or the Computer has sent out a GO FORWARD Command. OR GATE 206, in addition to an input from AND GATE 208, has an input from Rewind Gate 214 over Lead 213 and from GO REVERSE Gate 220 over Lead 221. OR GATE 206 has an input from AND GATE 206 over Lead 216 and from the GO REVERSE and REWIND Gates 220 and 214 over Leads 221 and 213 and will set the two bit of the Character to ONE by setting Flip Flop FF–M7 whenever the tape is READY or the Computer sends either a GO REVERSE or REWIND Command. OR GATE 207 has inputs from AND GATES 208 and 209 and from GO REVERSE Gate 220 and will set the ONE Bit of the Character to ONE by setting FF–M8 whenever the tape is READY or READY AT LOAD POINT or the Computer sends a GO REVERSE Command. The various control codes, which are thus generated by Control Character Encoder 182, are set forth in the following tabulation wherein the various Control Characters are shown along with the individual codes as set into Flip Flops FF–M1—FF–M8 in Mixing Register 100 of the Serial Encoder:

The Select AND GO GATE includes a plus (+) AND GATE 228 and an Inverter 229. One input to the AND GATE is from Computer Terminal 230 which goes positive when the Computer generates a GO Signal. The other terminal of AND GATE 228 is connected over Line 231 to a Select Control Panel 237. Select Control Panel 232 includes a Multiposition Switch 235 having a Movable Wiper 238 connected to the input of an Inverter 239. The Movable Wiper is connected to one of the plurality of contacts of the Multiposition Switch, each of which is connected over a separate cable line, each of which represents a different Tape Transport Address. Thus, whenever the Computer sends out the Address Signal characteristic of the particular Tape Transport, a negative voltage is applied to the input of Inverter 235. The

| | BITS | | | | | | | |
|---|---|---|---|---|---|---|---|---|
| | D | C | B | A | 8 | 4 | 2 | 1 |
| Control Character | (FF–M1) | (FF–M2) | (FF–M3) | (FF–M4) | (FF–M5) | (FF–M6) | (FF–M7) | (FF–M8) |
| READY | 0 | 1 | 1 | 1 | 1 | 1 | 1 | 1 |
| $\overline{\text{READY}}$ | 0 | 1 | 1 | 1 | 0 | 0 | 0 | 0 |
| READY LP | 0 | 1 | 1 | 1 | 0 | 1 | 0 | 1 |
| GO FORWARD | 0 | 1 | 0 | 0 | 1 | 1 | 0 | 0 |
| GO REVERSE | 0 | 1 | 0 | 0 | 0 | 0 | 1 | 1 |
| REWIND | 0 | 1 | 0 | 0 | 1 | 0 | 1 | 0 |

It should again be restated that the Control Character Encoder shown in FIG. 4 controls only Flip Flops FF–M3—FF–M8 through AND GATES 189–192. The state of the Flip Flops FF–M1 and FF–M2 are controlled directly within the Serial Encoder and are set to identify the type of character, whether Data or Control. The manner in which this is achieved has been discussed with reference to the discussion of the Serial Encoder and Input Tape Adapter, and no further discussion at this point is necessary.

The Status Signals from the Status Signal Input Terminals 210 and 210a are also applied to the Read Inhibit Circuit 84 of the Input Adapter illustrated in FIG. 2. The READY AT LOAD POINT Signals at Input Terminal 210 are inverted by Inverter 215 and applied to an Output Terminal 222 which is connected to One Shot 89 of the Read Inhibit Circuit 91. The LOAD POINT Signal at the output of Inverter 215 is applied to a second Inverter 223 which produces a positive signal at the Output Terminal 224 whenever the Tape Drive is not at the LOAD POINT. This positive signal, indicating that the tape is not at LOAD POINT, is applied to Input Terminal 87 and AND GATE 86 of Inhibit Read Gate 84.

The Computer Control Adapter, as described previously, receives Command Signals from the Local Computer, applies them to the Control Character Encoder to generate the proper Control Character Code for transmission to the Remote Data Processing Center. The Computer Control Adapter also receives Status Characters from the Remote Tape Transport after decoding in the Serial Decoder and supplies them to the Computer. That portion of the Computer Control Adapter, which accepts Command Signals from the Local Computer for transmission to the Control Character Encoder and beyond, consists essentially of the Computer GO Flip Flop 212, the GO FORWARD Gate 218, REWIND Gate 214, and the GO REVERSE Gate 220. GO Flip Flop 212, which has two Input Terminals, 225 and 226, is connected to Select AND GO GATE 227 which sets the Flip Flop to the GO state whenever the Computer generates a positive GO Signal, and the Computer has also selected the proper address of the system in order to transmit to the Remote Tape Transport. Terminal 226 is connected to the Serial Decoder and receives a negative pulse when data is received from the Remote Tape. This negative pulse resets the Flip Flop and terminates the GO Command Signals.

inverter produces a positive enabling voltage which is applied over Line 231 to AND GATE 228, as well as other circuits of the Computer Control Adapter, and functions.

If the particular Remote Tape Transport has been selected and the Computer produces a Go Signal at Input Terminal 230, AND GATE 228 is enabled and produces a negative pulse at its output which is applied to Inverter 229 and thence to the input of Flip Flop 212. The positive pulse from Inverter 229 sets Flip Flop 212 producing low or zero voltage level at its ONE Output Terminal. The output from the ZERO (0) Output Terminal of GO Flip Flop 212, which is at a high or positive level when the Flip Flop is set, is applied over Line 232 as an enabling signal to the GO FORWARD and GO REVERSE AND GATES 218 and 220. Whenever GO Flip Flop 212 is set, the ZERO Terminal has a positive voltage at its output which enables the plus (+) AND GATES 233 and 234 of the GO FORWARD and GO REVERSE Gates respectively. Gates 233 and 234 produce a negative output pulse if a proper directional command pulse is received from the Computer. That is, once the GO Flip Flop is actuated, indicating that the Computer wishes to transmit a Command to the Tape Transport, the Computer sends out a further Command Signal indicating the direction in which it wants the tape to move, whether FORWARD or REVERSE. AND GATES 233 and 234 are selectively actuated, depending on the nature of this directional Command Signal.

A directional Command Signal is received from the Computer at Input Terminal 235 and is connected directly to AND GATE 234, and also, after inversion by Inverter 236, to AND GATE 233. The Computer generates a GO REVERSE Signal by raising a positive pulse at Input Terminal 235 which, assuming GO Flip Flop 212 is set, produces a negative pulse at its output. The positive pulse does not affect AND GATE 233 since this pulse is inverted and produces a ZERO (0) voltage level at one of the inputs of AND GATE 233. If, however, the Computer generates a GO FORWARD Command, the voltage at Terminal 235 drops to low or zero level, thereby disabling AND GATE 234 since both inputs to the AND GATE are no longer positive. However, a positive voltage appears at the output of Inverter 236 which enables AND GATE 233 if the GO Flip Flop is set. A negative output pulse is produced and is transmitted to the Control Character Encoder to generate a Command Code indicating that the Remote Transport is to go in the forward direction.

The GO Signal at Input Terminal 230, which triggers GO Flip Flop 212, is also utilized to generate an inhibit signal in resynchronizing Inhibit Network 240. This inhibit signal is transmitted to the Serial Decoder to prevent resynchronizing the synchronizing Input Counter of the Serial Decoder for a fixed period of time (3.5 milliseconds) after the Computer drops the GO Signal. This inhibit function is necessary because combinations of partial Data Characters and the horizontal Parity Characters may have the same bit configuration as the legitimate resynchronizing Status Characters so that erroneous resynchronization and character framing may result. This will be discussed in greater detail in connection with the Serial Decoder illustrated in FIGS. 14 and 15. At this point, it will suffice to say that resynchronization must be inhibited while the Computer is generating a GO Signal and 3.5 milliseconds after the Computer GO Signal drops. Inhibit Network 240 includes a One Shot 241 which is connected to the output of Inverter 229. A positive voltage or positive going pulse edge at the output is ineffective to trigger the One Shot of Inverter 240. However, when the positive GO Signal at Terminal 230 terminates, the output of AND GATE 228 goes positive, and the output of Inverter 229 goes negative. This negative going edge triggers One Shot 241 producing a negative output pulse of fixed duration (3.5 milliseconds). The output from One Shot 241 is one of the inputs to plus (+) AND GATE 242. As long as One Shot 241 produces a negative output, AND GATE 242 is inhibited, and its output remains positive. The other input to AND GATE 242 is from the output of AND GATE 228 which has gone positive at the instant that the GO Signal at Input Terminal 230 went to zero. 3.5 milliseconds after the GO Signal at Input Terminal has dropped, One Shot 241 returns to its original stable state, and both inputs of AND GATE go positive, thereby producing a negative pulse at its output which is inverted by Inverter 243. The output from the Inverter is, therefore, negative and inhibits the Serial Decoder resynchronization until AND GATE 242 is gated. The output is negative as long as the GO line is positive and for 3.5 milliseconds after the GO lines goes to zero. This additional 3.5 milliseconds whill, therefore, prevent the Counter in the Serial Decoder from resynchronizing until the proper Status Character is received.

Rewind Network 214 includes a minus (−) OR GATE 244 which produces a positive pulse at its output whenever either a REWIND or a REWIND AND UNLOAD Signal is received from the Computer; the input to OR GATE 244 from a pair of plus (+) AND GATES 246 and 245, the inputs of which are, respectively, from REWIND and REWIND AND UNLOAD Terminals 247 and 248 of the Computer and from the Select Enabling Line 231.

Computer Control Adapter 182 also includes circuitry which receives Status Characters from the Remote Tape Transport and directs these to the Computer. Thus, READY, READY AT LOAD POINT, and NOT READY ($\overline{\text{READY}}$) Status Signals from the Remote Tape Transport are received after decoding in the Serial Decoder at Terminals 250, 251, and 252. These signals are supplied to the Computer with the proper polarity at Output Terminals 258, 259, and 260. In addition, the Computer receives a signal over Terminal 260 whenever the Remote Tape Transport has started rewinding in response to a Command from the Computer to do so. The READY and READY AT LOAD POINT Signals at Terminals 250 and 251 are applied to minus (−) OR GATE 261 which produces a positive output upon the appearance of either signal. The negative pulse is applied to the set terminal of a Remote Ready Flip Flop 262. The state of this Flip Flop indicates the condition of the Remote Tape Transport, and its output signals may be utilized both to supply the Computer with a READY Signal and to indicate whether REWIND has started after such a command has been transmitted from the Computer. The Output 263 from ONE Terminal of the Flip Flop is connected as one input of Rewind Plus (+) AND GATE 264 which also has an input from the AND GATE of Rewind Gate 214 over Lead 266. If the Computer has transmitted a REWIND Command to the Remote Tape Drive, the signal on Lead 266 is positive; and if the Remote Transport has executed the command and started to rewind, the Transport transmits NOT READY ($\overline{\text{READY}}$) Status Characters. A NOT READY ($\overline{\text{READY}}$) Signal appears at Terminal 252, resetting Flip Flop 262 and the Output 263 from the ONE Terminal of the Flip Flop goes positive. AND GATE 264 is, therefore, enabled since both of its inputs are now positive and produces a negative output pulse which is applied to the Computer over Terminal 260, indicating that the REWIND process has begun. The Computer of the operator may then select another Tape Transport Address, thereby disconnecting the Remote Tape Transport and its associated Data Transmission System from the Computer. It will be appreciated that since Computer time is the most expensive feature in a Data Processing Center, the Computer can be performing other functions during the time that any given Remote Data Transport, which has been supplying it with data, is rewinding its tape.

In the event that the Remote Tape Transport is READY or READY AT LOAD POINT, a negative pulse appears at one of Input Terminals 250 or 251 to OR GATE 261. The positive output pulse from this Gate sets Flip Flop 262 so that the output at Lead 263 goes negative, disabling AND GATE 264. The Zero Output of Flip Flop 262 is applied through an Inverter 268 Output Terminal 259 which is connected to the Computer. A negative voltage at Output Terminal 259 indicates that the Remote Tape Transport is either READY or READY AT LOAD POINT, and the Computer may transmit the desired commands to the Remote Tape Transport. The READY AT LOAD POINT Signal at Terminal 250 is supplied to Flip Flop 269 to set this Flip Flop. Another input from Terminal 252 resets the Flip Flop. If a READY AT LOAD POINT Signal appears at Input Terminal 250, Flip Flop 269 is set, and the ZERO Output Terminal 254 of the Flip Flop is positive, indicating that the Remote Tape Transport is at LOAD POINT. The ONE Terminal 253, on the other hand, is at zero volts. If a NOT READY SIGNAL appears at Terminal 252, Flip Flop 269 is reset and ZERO Output 254 goes to zero volts and ONE Output 253 goes positive, indicating that the Remote Tape Transport is not at LOAD POINT and that no Command Signals should be transmitted. Similarly, if the Computer generates a GO Command, a Reset Pulse is applied to Flip Flop 269 over Terminal 270.

The output from Flip Flop 262 on Lead 267 is applied not only to the Computer Output Terminal 259 to indicate whether a READY or NOT READY condition exists at the Remote Tape Transport, but also to Output Terminal 271 as an inhibiting signal for the Serial Decoder to prevent any data in the Serial Decoder from being read into the Computer so that spurious signals are not read into the Computer.

*The tape control adapter*

The Tape Control Adapter, which is shown in FIG. 5, receives commands from the Remote Computer after decoding in the Serial Decoder and generates the appropriate voltages to cause the Tape Unit to execute the commands. A plurality of Command and Status Signals are received from the Serial Decoder over Input Terminals 275–282. These signals applied to the Tape Start Flip Flop 283, which actuates the Tape Drive Circuits, the Tape Direction Control Circuit 284, which determines whether the tape goes forward or reverse, and the Tape Rewind Control Circuit 285. The output of Tape Start Flip Flop 283 actuates Tape Go Control Circuit 286 to energize the Tape Drive. Tape Start Flip Flop 283 is triggered by either a GO FORWARD or GO REVERSE Command Signal at Input Terminals 278 or 279 to produce a positive output pulse which actuates Tape Control Circuit 286. The Tape Direction Control Circuit is energized by directional control signals, either FORWARD or REVERSE from Input Terminals 280 or 281, and Tape Rewind Control Circuit 285 is actuated from a REWIND Signal at Input Terminal 284. Tape Go Control Circuit 286 is periodically de-energized by End of Record Detector 287 which produces a Reset Pulse at the end of each record thereby stopping the Tape Transport until the next Command Signal from the Remote Computer is received.

The Tape Start Flip Flop 283 consists of two minus (—) OR GATES 288 and 289 with their inputs and outputs interconnected to form a Flip Flop of bi-stable device. OR GATE 289 has inputs from Terminals 278 and 279 and also from the output of OR GATE 288. The appearance of any negative Command Signal, either GO FORWARD or GO REVERSE, at Input Terminals 278 and 279 produces a positive output pulse from OR GATE 289 which is applied to Flip Flop 290 of Tape Go Control Circuit 286. The positive pulse from OR GATE 289 sets Flip Flop 290, and the positive output from its ZERO Terminal is inverted in Terminal 291 and applied as an actuating signal to the Tape Drive over Output Terminal 292. The positive pulse from the ZERO Terminal of the Flip Flop is also applied to Terminal 293 which is connected to Terminal 87 and AND GATE 86 of the Input Adapter Inhibit Read Circuit shown in FIG. 2. The output from the ONE Terminal of Flip Flop 290 is of opposite polarity and is connected through Output Terminal 294 to One Shot 85, the Inhibit Read Circuit. As pointed out previously, the Inhibit Read Circuit prevents data from being read into the Input Adapter for 3.5 milliseconds after the Tape Drive starts in order to move the tape from the space between records to the first character of the next record. This eliminates the possibility of generating spurious data characters.

Flip Flop 290 is reset by End of Record Detector 287 which produces a reset pulse at the end of every record stored on a tape. The End of Record Detector includes a resettable One Shot 291 which is triggered by a negative trigger pulses from Output Terminal 59 of Flip Flop FF–H1 of Input Adapter Holding Register 55. Since Flip Flop FF–H1 produces negative pulse each time a data character is shifted into the Holding Register these trigger pulses occur at the rate at which data characters are received from the tape.

Once triggered One Shot 291 would normally remain in this state for 3.5 milliseconds and then return to its original state. As long as data characters are being received, however, the R–C time circuit of the One Shot is recharged by each pulse, and the One Shot is reset and remains set as long as the negative input pulses continue. However, if there are no negative trigger pulses for 3.5 milliseconds, indicating that there are no more data characters, the One Shot runs down and returns to its original state and generates a positive going pulse. The time period of the One Shot Multivibrator is so set (3.5 milliseconds) so that there is a fair degree of certainty that the tape is at end of record and not that just a few characters have been lost. The positive pulse from One Shot 291 is inverted in Inverter 295 to trigger a further One Shot 296. One Shot 296 produces a negative pulse of fixed duration, the positive trailing edge of which resets Tape Drive Flip Flop 290. The delay in de-energizing the Tape Drive introduced by One Shots 291 and 296 delays the de-energization of the Tape Drive and permits the tape to move to the midpoint of the inter-record space. This has a dual purpose in that it is desired both to drive the tape for a sufficient period of time after the end of record so that the horizontal parity bit, which occurs sometime after the end of every record, is read out, and also to drive the tape to position it precisely at midpoint of the inter-record space since it will be remembered that upon the receipt of the next GO signal the Input Adapter is inhibited for a fixed period of time (3.5 milliseconds) so that the tape reaches the beginning of the next record. This, of course, requires that the tape be positioned fairly precisely in the space between the records so that the Input Adapter is enabled at the time that the tape reaches the beginning of the next record.

Tape Start Flip Flop 283 is so designed that once triggered by a Command Signal, such as GO REVERSE or GO FORWARD, so that the Tape Drive is actuated, it cannot be reset unless a status character is received from the Remote Tape Transport indicating that the Remote Computer has received the data characters being transmitted. As soon as OR GATE 289 has been triggered by either the GO FORWARD or GO REVERSE signals its output goes positive. The output of OR GATE 289 is fed back over Line 297 to the input of OR GATE 288. This positive signal applied to the input of OR GATE 288 insures that the output of OR GATE 288 remains negative until a negative status signal appears at one of the Terminals 275–277. This maintains OR GATE 289 actuated and its output positive so that the receipt of a GO REVERSE or GO FORWARD Command Signal after Tape Go Circuit Flip Flop 290 has been reset by the End of Record Detector does set Flip Flop 290 again.

The reason for this particular circuit arrangement may be more easily understood by considering the following: The data and control characters are transmitted between the two geographically remote locations over a radio, microwave, or other communication link, so that a small but finite transmission time delay is present. Due to this transmission time delay, there is a possibility that if a very short record (of one or two data characters) is being read, the End of Record Detector may have stopped Tape Drive Flip Flop 290 before the remote Computer has received the data characters. As a result, the Computer is still sending GO signals which might erroneously start to advance the tape to the next record. For example, assume a GO command is received from the Computer which starts the Tape Drive. The tape start sand begins to read the record which contains only one or two data characters. These characters are converted to Serial Form and transmitted to the Remote Computer. After the second data character, the End of Record Detector senses that no more data characters are being received from the tape and stops the Tape Drive by resetting Flip Flop 290. However, because of the time delay inherent in the transmission system the Remote Computer may not have received the data characters by the time the End of Record Detector has stopped the Tape Drive. As a result, it is still transmitting command characters instructing the Tape Transport to GO in a certain direction, for it will be recalled that the Computer Control Adapter the Tape GO Flip Flop 212 of FIG. 5 is not reset until the receipt of the first data character. This is, of course, highly undesirable since the processing of any further data by the Computer may not be desired, depending on the Computer program, until the first set of data from the preceding record is received. Flip Flop 283 eliminates this possibility since the output of OR GATE 289, once it is gated by a Command Signal, remains positive until a negative status signal is received at any of Terminals 275–277. Only then will the output of OR GATE 288 go positive, removing the ZERO or negative input to OR GATE 289 so that OR GATE 289 is again to be ready to be triggered by the next Command Signal.

If such a resetting status signal is received at Terminals 275–277 to reset Flip Flop 283, there is certainty that the data from the Tape Transport has been received at the Remote Computer, for it will again be recalled that the priority system in the Control Character Encoder and Computer Control Adapter provides that GO Flip Flop 212 is reset (terminating the generation of status characters) when a data character is received. Hence if a status character is received, it is complete assurance that the GO Flip Flop 212 of the Computer Control Adapter has been reset by the receipt of a data character so that the next subsequent command signal received over Terminals 278 and 279 is acceptable to actuate of the local Tape Transport.

Tape Direction Control Circuit 284 includes a Flip Flop 297 which is controlled by the positive directional command pulses at Input Terminals 280 and 281. The appearance of a positive FORWARD command pulse at Terminal 280 resets Flip Flop 298 and the voltage at its output drops to zero. This voltage drop is inverted by an Inverter and applied to the Output Terminal 299 and the directional control of the Tape Drive. The appearance of a positive REVERSE command at Input Terminal 281 resets the Flip Flop and the voltage at its output rises to a positive value and is inverted. Thus, the output at Terminal 299 is at a zero level for FORWARD and negative for REVERSE with these voltages controlling the Tape Drive so that the direction of movement is correspondingly controlled. Tape Direction Flip Flop 298 is also steered from the ONE Output of the Tape Drive Go Flip Flop 290 through a lead connected to the ONE Output Terminal of Flip Flop 290. If Flip Flop 290 is set, indicating that the tape is in motion, Flip Flop 297 cannot be set or reset to change direction from FORWARD to REVERSE or from REVERSE to FORWARD. This is to prevent damage to the Tape Drive by trying to revsere its direction while it is in motion.

The direction the tape is driven is always set before hte Tape Drive itself is actuated; consequently, the directional command signals at Terminals 280 and 281 are always generated before the GO signals applied to Tape Go Control Circuit 286. It will be recalled that from the earlier discussion, the system is characterized by the fact that the Serial Decoder, presently to be described, produces a control signal only if the given control character, whether status or command, has been received four times in succession. This, of course, provides an opportunity for inserting the directional command signal to Tape Direction Control Circuit 284 before Tape Go Control Circuit is actuated. That is, the FORWARD or REVERSE signals applied at Terminals 280 or 281 are generated in the Serial Decoder after the receipt of the second consecutive directional command character, whereas the GO FORWARD or GO REVERSE signals at Terminals 278 and 279 are generated only after the fourth consecutive character of that type has been received. The Tape Direction Flip Flop 297 is thus always set prior to the appearance of the GO REVERSE or GO FORWARD signals which actuate the Tape Drive. The tape, therefore, is always preset to move in the proper direction.

Tape Rewind Control Circuit 285 includes a Rewind Flip Flop 300 which is set by a negative rewind pulse from Input Terminal 282. When Flip Flop 300 is set its output goes to zero, and the output of Inverter 301 and the signal at Output Terminal 302 go positive. The positive signal actuates the Tape Drive to start REWIND. As soon as the tape starts rewinding, a negative pulse from the Tape Drive is applied through Input Terminal 303 and Inverter 304 to reset Flip Flop 300. Rewind Flip Flop 300 is reset in this manner to prepare it for another REWIND command.

The status signals from the Serial Decoder which appear at Input Terminals 275–277 to reset Tape Start Flip Flop 283, are also applied over leads 305–307 to Output Terminals 308–310 which are connected to Terminals 250–252 of the Computer Control Adapter of FIG. 4. These status signals from the Remote Tape Transport are processed in the Computer Control Adapter and supplied to the Computer.

*The serial decoder*

The Serial Decoder performs a number of functions which are the reverse of those performed by the Serial Encoder. The characters are converted from serial to parallel bit; and the received character is sensed and identified to determine whether it is a Control or Data Character. Data Character Bits are synchronized and gated out to the Computer while Control Characters are identified as to type, Command or Status, and as to their specific nature, i.e., READY, $\overline{\text{READY}}$, GO FORWARD, etc. The Control Characters are also counted to determine whether the same Control Character has been received four consecutive times. If so, a corresponding Output Signal is generated and applied either to the Tape Control Adapter to produce the voltages which cause the Tape Transport to execute the commands or to the Computer Control Adapter to inform the Computer of the status of the Remote Tape Transport.

Figure 6:
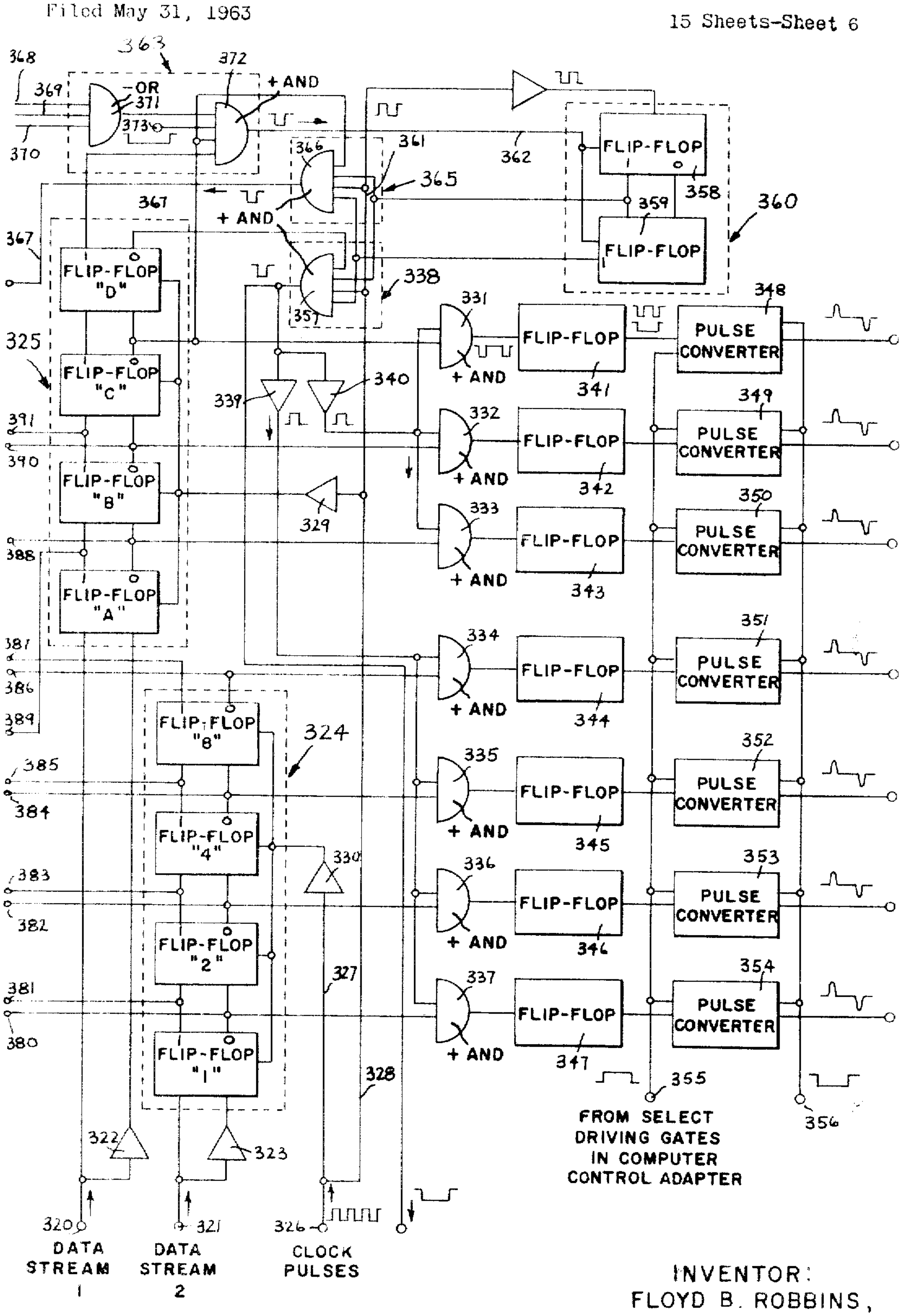
FIGS. 6 and 7 are schematics, in Block Diagram Form, of the Serial Decoder in which the received data train is converted to parallel form for transmission to the Computer.
Figure 7:
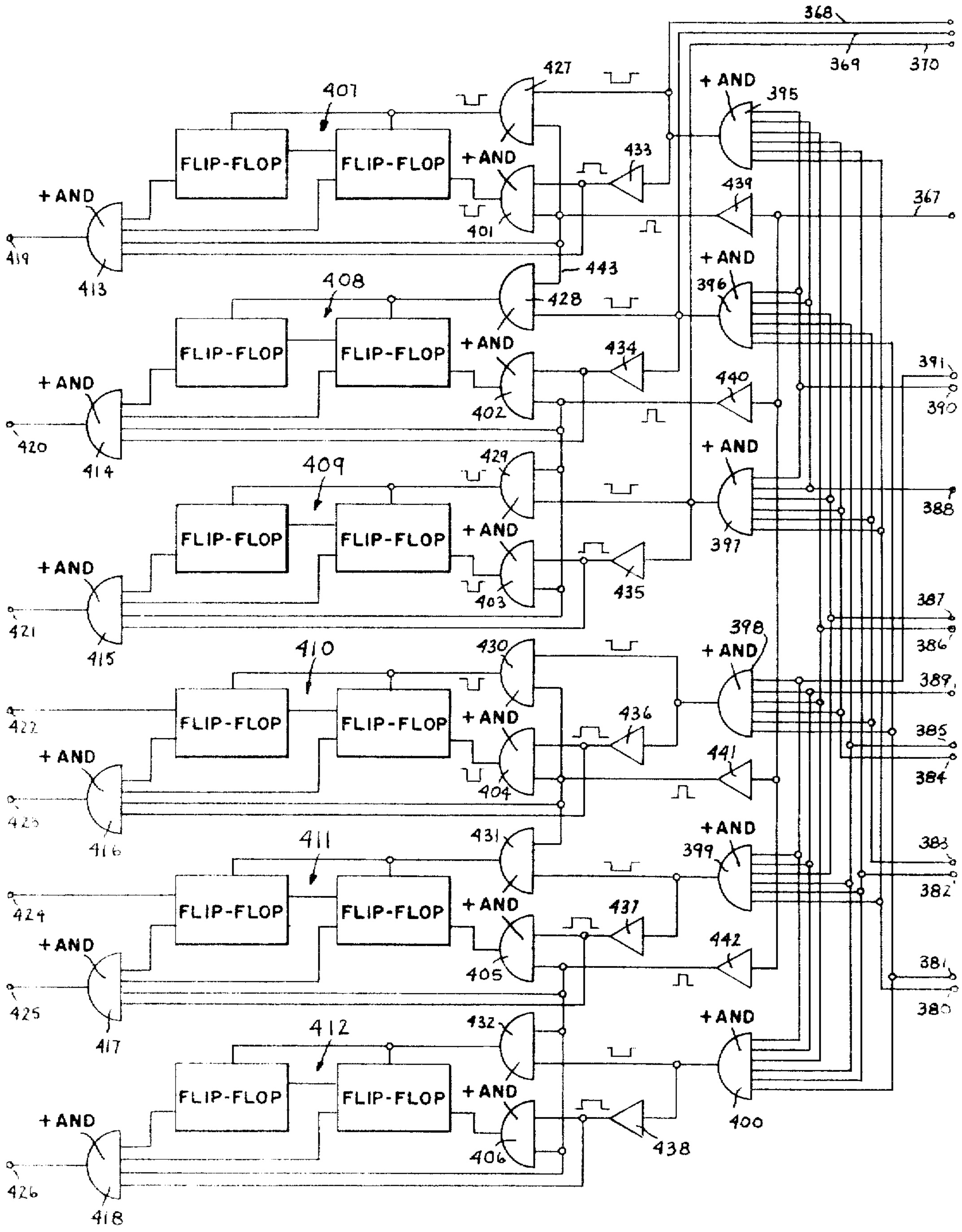

FIG. 6 illustrates one portion of the Serial Decoder. The major functional components shown in FIG. 6 are the Shift Register and Gates for converting Data Characters to parallel form and for transferring the data to the Computer; the Control and Data Character Identification Circuitry; the Counter for framing the bits so that the proper seven character bits are shifted; and synchronizing means for the Counter to insure that the framing of the character bits is correct. FIG. 7, on the other hand, shows the Control Character Decoding Gates by means of which the Control Characters are identified and segregated and the Counters wherein the number of successive occurrences of a given Control Character are counted.

Referring now to FIG. 6, the two serial bit streams from the Demodulator are impressed on Input Terminals 320 and 321, and applied serially after inversion in Inverters 322 and 323 to Shift Registers 324 and 325. Each of the Shift Registers includes four Flip Flops for storing the A–D and 8, 4, 2, and 1 Bits. They are identified as Flip Flops A–D in the case of Shift Register 325 and Flip Flops 8, 4, 2 and 1 in the case of Shift Register 324. The serial bits are clocked into the Flip Flop by the clock pulses at Input Terminal 326 which are applied to the individual Shift Registers over Lines 327 and 328 through Inverters 329 and 330. The Shift Registers are connected to the Computer through plus (+) AND GATES 331–337, Flip Flops 341–347 and Pulse Converters 348–354. The zero outputs of the Shift Register Flip Flops are connected to the Gates 331–347. The remaining input to these AND GATES is generated by Data Character Indentification Gate 338 and supplied in the proper polarity by Data Character Identification Pulse Inverters 339 and 340. Whenever Data Character Identification Gate 338 senses that a Data Character is set in the Shift Registers, it produces a negative pulse at the end of the fourth clock pulse which is inverted to produce a positive gating pulse for AND GATES 331–337, thereby simultaneously transferring the data bits from the Shift Register Flip Flops to Output Flip Flops 341–347. Flip Flops 341–347 are coupled to Pulse Conversion Circuits 348–354. The Pulse Converter Circuits, which may, for example, be over-damped, resonant networks, produce alternate, positive and negative going pulses from the leading and trailing edges of the Flip Flop Outputs. That is, Pulse Converters 348–354 convert the unipolar pulses from the Shift Register and the Output Flip Flop to the bipolar pulses required by the Computer. It will also be noted that Flip Flops 341–347, due to the inherent characteristics of these devices, divide the bits by two and, therefore, produce a single output pulse for each two input bits from AND GATES 321–337. This would indicate that only every other character is transmitted to the Computer. However, it would be noted that the Pulse Converter Networks 348–354 produce an output pulse both for the positive leading and the negative trailing edge of the pulse from the Flip Flops. A postive pulse is thus produced for a positive going leading edge and a negative pulse for each negative going trailing edge. Thus, a pulse is produced at the output of the Converters for each bit input to Flip Flops 341–347 from the Shift Registers.

Pulse Converters 348–354 are inhibited under certain circumstances. Each of the Pulse Converters is connected to an Enabling Line 355 which receives a positive going Select Enabling Pulse from the Select Driving Gates in the Computer Control Adapter to actuate the read-out system only if the Computer has selected the particular Data Transmission System and the Remote Tape Transport. In addition, an inhibit pulse is applied to the Pulse Converters over Inhibit Line 356. This inhibit pulse comes from Output Terminal 252 of the Computer Control Adapter and is generated whenever the Computer has ordered the Remote Tape Transports to REWIND, and the Remote Tape Transport has begun to execute that command.

The Pulse Converters, shown in Block Diagram Form, may take any one of many known forms. Thus, for example, it may consist of a over-damped resonant circuit plus suitable amplifiers and rectifiers. The over-damped resonant circuit is shock excited into oscillation by the leading and trailing edges of the pulses from Output Flip Flops 341–347. However, because the resonant circuit is over-damped, the oscillation dies out after a single half cycle, thus effectively generating a single pulse for each edge. It is obvious that differentiating circuits, for example, may be utilized in place of the over-damped resonant circuit to produce the bipolar pulses from the leading and trailing edges of the Flip Flop Output Pulse. In addition, many other well known circuits for producing these pulses may also be utilized. In addition, suitable amplifying and gating components are included in the Pulse Converter Network, and these amplifiers and gates may be inhibited or enabled by the Control Pulses appearing on lines 355 and 356. It will be appreciated that many devices and arrangements for performing the function of converting the unipolar pulses into bipolar pulses and for gating the network to achieve this result may be utilized without going outside of the scope of this invention.

The parallel to serial conversion of the data bit stream, by simultaneously gating out the bits in all of the flip flops of the Shift Registers 324 and 325, is achieved under control of the Data Character Identification Gate 338 which generates an enabling pulse for AND GATES 331–337. Data Character Identification Gate 338 consists of a plus (+) AND GATE 357, which produces a negative output pulse whenever all of its inputs are positive. These input are all positive if (1) Flip Flop D of Shift Register 325 has a Binary ONE set in it (identifying the character as a Data Character); (2) the count from the Scale of Four Counter 360 is at zero indicating that the next four count is about to be initiated; and (3) the clock pulse is positive (during the first half of the clock period). To this end, the ZERO Terminal of the D Flip Flop is connected to one input of AND GATE 357 so that if a binary ONE is set in the Flip Flop, the ZERO Terminal is positive. The second and third inputs to AND GATE 357 are from the ONE Terminals of Flip Flop 358 and 359 of Counter 360. When the counter has counted through four counts and is back at zero, the Flip Flops are reset to the Binary ZERO state, and the Output Terminals are positive. The fourth input is from Clock Pulse Input Terminal 326 so that this input goes positive only during the positive clock pulse half.

With a Data Character set in the Shift Registers 324 and 325 and the Scale of Four Counter 358 set to the proper count, all of the inputs to AND GATE 338 are positive, producing a negative output pulse which is inverted and utilized to Gate Transfer AND GATES 331–337, transferring the seven Data Character Bits stored in the Flip Flops A–C and 8, 4, 2, and 1 to the Computer. After the next four counts of the Scale of Four Counter, another character has been read into the Shift Register, the Data Character Identification Gate will produce another output pulse to shift the character to the Computer if the new character is a Data Character, as opposed to a Control Character. Thus, it can be seen that the combination of Data Character Identification Gate 338 and the Scale of Four Counter 358 controls the Shift Registers in such a manner as to convert the serial data bit stream to a parallel data bit stream for transmission to the Computer for processing. The manner in which the Scale of Four Counter 558 is synchronized to insure that the bits are transferred to the Computer only if the proper eight bits have been framed will be explained in detail subsequently. Suffice it to say at this time that the Scale of Four Counter 316 is initially synchronized by a Reset Pulse appearing over Reset Line 362 from Counter Synch Pulse Gate 363 which, upon initial operation of the system, establishes the proper synchronization and character framing for the bits. Since the bit stream is synchronous, some means must be found to identify which eight bits represent a character. It will be appreciated that if eight bits are selected at random, they may represent parts of two overlapping, adjacent characters, thereby introducing serious errors into the system.

However, Control Characters set in the Shift Registers must be identified as such and shifted to the Control Character decoding circuitry, FIGURE 7, for further processing. Control Character Identification Gate 365 performs this function. Control Character Identification Gate 365 includes a plus (+) AND GATE 366 which has four inputs, one from Flip Flop C, two from Scale of Four Counter 360, and one from the Clock Pulse Input Terminal 326. The inputs to AND GATE 366 are all positive when ever the Scale of Four Counter 360 is set to the ZERO Count. A Binary ONE is set in Flip Flop C, the Scale of Four Counter 360 and the Clock Pulse Input Terminal 326. The inputs and AND GATES 366 are all positive whenever the Scale of Four Counter 360 is set to the zero count; a Binary ONE is set in Flip Flop C (identifying it as a Control Character); and the clock pulse is positive. It will be recalled from the discussion of the Serial Encoder, illustrated in FIG. 3, that a Control Character is identified by the fact that the first bit, which is set into the Flip Flop D, a Binary ZERO and that the second bit, set into Flip Flop C, is a Binary ONE. This is in distinction to the identification scheme for a Data Character where the first bit (Flip Flop D) is a Binary ONE and the second bit (Flip Flop C), a Binary ZERO. The first input to AND GATE 366 is from the ZERO Terminal of Flip Flop C, which is positive if a Binary ONE is set in the Flip Flop. The second and third inputs are connected to Flip Flops 358 and 359 of Scale of Four Counter 360, and these leads are positive only when the count is zero. The remaining input lead to Clock Pulse Terminal 326 is positive during the first half of each clock pulse. If the character in the Shift Registers is a Control Character, all of the inputs are positive and AND GATE 365 generates a negative pulse over Line 367 which enables the various circuits of FIG. 7 to permit identification and subsequent counting of the Control Characters.

Counter Synchronizing Gate 363 produces a reset synchronizing pulse which is applied over Line 362 to the Flip Flops of the Scale of Four Counter 360. This Reset Pulse, whenever it appears, resets the Flip Flops to their ZERO state indicating that the individual bits in the Shift Registers are properly framed as a character and may be read out either to the Computer or to the Control Identification and Counting Circuitry. The need for such a synchronizing pulse will be apparent if it is considered that the various characters, both Data and Control, are being transmitted in an uninterrupted synchronous stream and clocked continuously into the Shift Registers 324 and 325. At any instant of time, there are always eight bits in the Register. Some means must, therefore, be provided to determine when the bit in Flip Flop D is really the first bit of the Data Character, and the bit in Flip Flop 1 is really the last bit of the desired character so that there is not some overlap between adjacent characters. Otherwise, the bits in the Shift Register, when they are gated out to the Computer or to the Control Character Circuits, may represent some sort of hybrid of bits from two adjacent characters.

To this end, the Counter Synchronizing Gate produces the synchronizing pulse only if a Control Character is set in the Shift Registers, its identification as a Status Character has been received from the Control Character Identification and Counting Circuits of FIG. 7, and the Local Computer GO Line has been down for 3.5 milliseconds. The Status Character Identification Circuitry, as will be explained in detail later, contains Character Identification Decoding Circuits which respond only to particular Status Characters. The Control Character Codes are so arranged that no combination of partial characters can produce a spurious Status Character. Since the Local Computer has been down for 3.5 milliseconds no Data Characters, with random combination of bits, can counterfeit a Status Character. Hence, if a pulse appears at the Inputs 368–370 of the Synch Gate, it is certain that a Status Character from the Remote Tape Transport has been received and that the eight bits in the Register, at that instant, are a genuine Status Character and not a spurious signal representing a hybrid of bits from adjacent characters. The negative pulses on Leads 368–370 indicate a properly framed eight bit character and are applied to the input of a minus (−) OR GATE 371 which produces a positive pulse whenever one of its input leads is negative. The positive pulse is applied as one input to a plus (+) AND GATE 372 which actually generates the negative reset synch pulse. Two additional inputs to AND GATE 372 are connected, respectively, to the ONE and ZERO Terminals of Flip Flops D and C. The ONE and ZERO Terminals of these Flip Flops are positive only when a ONE is set in Flip Fop C and a ZERO set in Flip Flop D, which is the identification code for a Control Character. These inputs are positive only if Flip Flops C and D indicate that a Control Character has been set into the Shift Registers. Three of the inputs to AND GATE 372 are positive if there is a Control Character set into the Shift Registers and if that Control Character is a Status Character. AND GATE 372 does not produce a negative synchronizing pulse unless the negative inhibiting signal at its Input Terminal 373 is removed.

The inhibit signal to AND GATE 372 is generated in synchronize Inhibit Circuit 240 of the Computer Control Adapter (FIG. 4) and is present as long as the Local Computer has raised its GO Line (and transmitted a Command Signal to the Remote Tape Transport) and for a fixed period after the GO Line of the Computer drops, the period being 3.5 milliseconds in this instance. The need for this inhibit signal, during the interval the GO Line is raised and for a fixed period of time afterwards, may be explained as follows:

When the Local Computer has raised its GO Line, thereby commanding the Remote Tape Transport to transmit Data Characters over the transmission medium to the Computer, the Counter has already been synchronized. As the Tape Transport starts transmitting data to the transmitter, the Counter is in synchronism and properly frames the Data Characters and reads them out to the Computer. However, at the end of the record on the tape at the remote location, the End of Record Detector stops the Tape Transport, and Status and Control Signals from the remote location are transmitted over the transmission medium and are clocked into the Shift Registers. The GO Line at the Local Computer drops whenever data is no longer received, and the Counter Synch Gate 363 would tend to resynchronize Counter 360 upon receipt of the first Status Character. However, sometime after the end of a record on the tape, a horizontal Parity Character is transmitted to the Computer. The particular binary coded form of the horizontal Parity Character varies, and it is possible that some of the bits of a Control Character preceding the horizontal Parity Character and some of the bits of the Parity Character of the same of bits of the Parity Character and bits of the succeeding Control Character may establish a combination of ONES and ZEROES which simulates one of the Status Codes. OR GATE 371 would then produce a positive output pulse which would, in turn generate a spurious synch pulse from AND GATE 372 which would reset Counter 360 to zero. Obviously, since this spurious character represents some bits of a Control Character and some bits of the Parity Character, the framing of the characters is completely in error, and the Counter 360 is improperly synchronized. Therefore, in order to prevent the horizontal Parity Character from possibly generating simulated Status Characters, the inhibit signal is maintained for a fixed period of time after the Computer GO Line drops, with the period of time being sufficient so that the Remote Tape Transport has, in all cases, passed the horizontal Parity Character. Therefore, the appearance of a negative input pulse at OR GATE 371 always represents a genuine Status Character and that the character in the Register is properly framed so that Scale of Four Counter 360 may now be reset with complete confidence that the Counter is properly synchronized, and the characters are framed in the desired bit sequence.

The outputs of Shift Register Flip Flops A, B, 8, 4, 2, and 1 are also applied over Output Terminals 380–391 to the Control Character Identification and Counting Circuits of FIG. 7. It will be noted that Output Terminals 380, 382, 384, 386, 388 and 390 are connected to the ZERO Output Terminals of these Flip Flops and that Output Terminals 381, 383, 385, 387, 389 and 391 are connected to the ONE Terminals of the Shift Register Flip Flops. Thus, Output Terminals 380, 382, 384, 386, 388, and 390 will be at a positive voltage level whenever a Binary ONE is set in these Flip Flops and conversely will be at a zero voltage level if a Binary Zero is set in these Flip Flops. Terminals 381, 383, 385, 387, 389 and 391, which are connected to the ONE Output Terminals, will be at a positive voltage level whenever the Flip Flops have a Binary ZERO set therein and will be at a zero voltage level whenever a Binary ONE is set in these Flip Flops. These characteristics of the Flip Flops and the various voltage levels appearing at these Output Terminals will be used in identifying the particular Control Characters set in the Shift Register by means of a series of plus (+) AND GATES which are designed to recognize only the predetermined code for a given Control Character.

FIG. 7 shows the Control Character Identification and Counting Circuitry which forms part of the Serial Decoder. This circuitry, when enabled by Control Character Identification Gate 365 of FIG. 6, identifies the specific Control Character and counts the consecutive number of times it has been received. If any given Control Character has been received four consecutive times, an Output Gate is actuated to produce an Output Signal indicative of the specific Control Character. If, however, the specific Control Character has not been received four consecutive times, the Counter is reset to zero to await the receipt of further Control Characters.

This circuitry includes a plurality of Control Character Decoding Gates 395–400. These Gates are plus (+) AND GATES having one input from each of Shift Register Flip Flops A, B, 8, 4, 2, and 1. Each of these Decoding Gates is designed to recognize one, and only one, of the six Control Characters, READY, NOT READY, ($\overline{\text{READY}}$), READY AT LOAD POINT, (COMMAND), and GO FORWARD, GO REVERSE, and REWIND (STATUS). The inputs to Decoding Gates 395–400 from Shift Register Output Terminals 380–391 are such that all the inputs to the Gates are positive only if the predetermined code identifying the Character is set into the Shift Register.

The output pulses from AND GATES 395–400 are applied through Control Character Count Gates 401–406 to Scale of Four Counters 407–412. These counters count the number of Control Characters received from its associated Control Character Decoding and Count Gates and produce a positive output pulse whenever four consecutive Control Characters have been received. These positive pulses are applied to output plus (+) AND GATES 413–418 and then to Output Terminals 419–426 which are connected to the Tape Control Computer Control Adapters.

Associated with each of the Control Character Count Gates are the Counter Reset Gates 427–432 which reset Scale or Four Counters 407–412 if less than four consecutive Control Characters of the same type are received.

The Control Character Decoding Gates 395–400 are plus (+) AND GATES and are coded, respectively, to recognize the READY, NOT READY ($\overline{\text{READY}}$), READY AT LOAD POINT, GO FORWARD, GO REVERSE, and REWIND Characters. Control Character Decoding Gate 395 has six Input Terminals which are respectively connected to Output Terminals 380, 382, 384, 386, 388 and 390 of the Shift Register Flip Flops 1, 2, 4, 8, A and B respectively. All of these Output Terminals are connected to the ZERO Output Terminals of these individual Flip Flops and, consequently, the inputs to Control Character Decoding Gate are simultaneously positive only if all of these Flip Flops are set to the ONE state since only then are the ZERO outputs of these Flip Flops positive. Thus, Control Character Decoding Gate 395 recognizes the Binary Code 1, 1, 1, 1, 1 1.

Similarly, AND GATE 396 is connected to Output Terminals 381, 383, 385, 387, 388 and 390 which are connected respectively to the ONE Terminals of Flip Flops 1, 2, 4, and 8 and to the ZERO Terminals of Flip Flops A and B. Consequently, all of its inputs are positive only if Flip Flops A and B are set in the ONE state, and the remaining Flip Flops are set in the ZERO state, for only in this instance will the zero outputs of Flip Flops A and B and the one terminals of Flip Flops 8, 4, 2, and 1 be positive. AND GATE 396 identifies the Code 1 1 0 0 0 0.

AND GATE 397 is connected to Shift Register Output Terminals 380, 383, 384, 387, 388, and 390. Of these, 380, 384, 388, and 390 are connected to the ZERO Outputs of Flip Flops 1, 4, A and B, and the remaining ones to the ONE Terminal of Flip Flops 2, and 8. GATE 397 recognizes only the Code 1 0 1 0 1 1, for only then will the Output Terminals of the Flip Flops be positive. AND GATES 398, 399, and 400 are similarly connected to various combinations of ZERO and ONE Output Terminals of the Shift Register Flip Flops so that they recognize specific unique codes. The following tabulation shows how each Gate is connected to the Shift Register Outputs and the Binary Code which must be set in the Flip Flop so that all of the inputs to a particular Gate are positive:

| | Flip Flop B | Flip Flop A | Flip Flop 8 |
|---|---|---|---|
| AND GATE 395: | | | |
| Terminal | ZERO T 390 | ZERO T 388 | ZERO T 386. |
| Logic | 1 | 1 | 1. |
| AND GATE 396: | | | |
| Terminal | ZERO T 390 | ZERO T 388 | ONE T 387. |
| Logic | 1 | 1 | 0. |
| AND GATE 397: | | | |
| Terminal | ZERO T 390 | ZERO T 388 | ONE T 387. |
| Logic | 1 | 1 | 0. |
| AND GATE 398: | | | |
| Terminal | ONE T 391 | ONE T 389 | ZERO T 386. |
| Logic | 0 | 0 | 1. |
| AND GATE 399: | | | |
| Terminal | ONE T 391 | ONE T 389 | ONE T 387. |
| Logic | 0 | 0 | 0. |
| AND GATE 400: | | | |
| Terminal | ONE T 391 | ONE T 389 | ZERO T 386. |
| Logic | 0 | 0 | 1. |

| | Flip Flop 4 | Flip Flop 2 | Flip Flop 1 |
|---|---|---|---|
| AND GATE 395: | | | |
| Terminal | ZERO T 384 | ZERO T 382 | ZERO T 380. |
| Logic | 1 | 1 | 1. |
| AND GATE 396: | | | |
| Terminal | ONE T 385 | ONE T 383 | ONE T 381. |
| Logic | 0 | 0 | 0. |
| AND GATE 397: | | | |
| Terminal | ZERO T 384 | ONE T 383 | ZERO T 380. |
| Logic | 1 | 0 | 1. |
| AND GATE 398: | | | |
| Terminal | ZERO T 384 | ONE T 383 | ONE T 381. |
| Logic | 1 | 0 | 0. |
| AND GATE 399: | | | |
| Terminal | ONE T 385 | ZERO T 382 | ZERO T 380. |
| Logic | 0 | 1 | 1. |
| AND GATE 400: | | | |
| Terminal | ONE T 385 | ZERO T 382 | ONE T 381. |
| Logic | 0 | 1 | 0. |

Comparing this tabulation with the following which identifies the coding arrangement for the various control characters as established by the control character encoder of FIG. 4:

| | Bit D | Bit C | Bit B | Bit A | Bit 8 | Bit 4 | Bit 2 | Bit 1 |
|---|---|---|---|---|---|---|---|---|
| READY | 0 | 1 | 1 | 1 | 1 | 1 | 1 | 1 |
| $\overline{\text{READY}}$ | 0 | 1 | 1 | 1 | 0 | 0 | 0 | 0 |
| READY L.P. | 0 | 1 | 1 | 1 | 0 | 1 | 0 | 1 |
| GO FORWARD | 0 | 1 | 0 | 0 | 1 | 1 | 0 | 0 |
| GO REVERSE | 0 | 1 | 0 | 0 | 0 | 0 | 1 | 1 |
| REWIND | 0 | 1 | 0 | 0 | 1 | 0 | 1 | 0 |

It will be obeserved that AND GATES 395–400 recognize the last six bits of the READY, $\overline{\text{READY}}$, READ AT LOAD POINT, GO FORWARD, GO REVERSE, and REWIND Characters.

The negative output pulses from each of the Decoding Gates 395–400 are applied through Inverters 433–438, as a positive pulse to one of Control Character Count Gates 401–406. The negative output pulses from the Decoding Gates are also applied as one of the inputs to Counter Reset Gates 427–432. The Counter Reset and Control Character Count Gates each receives positive enabling pulses from the Control Character Identification Gate 365 of FIG. 6 from the output of Inverters 439–442. Each of these inverters receives a negative pulse from the Control Character Identification Gate 365 (illustrated in FIG. 13) over Leads 367. Each Control Character Count Gates produces a negative output pulse which is applied to the associated Scale of Four Counter if it receives a positive enabling pulse from its associated Inverter, indicating a Control Character has been recognized from the "D" and "C" Bits stored in Flip Flops "D" and "C" of the Shift Registers, and the particular character has been recognized by the Decoding Gate. The Reset Gate, on the other hand, generates a Reset Pulse for its associated Counter any time an enabling pulse from the Control Character Identification Gate is present, and Decoding AND GATES have not received the Character Code which it responds to and has not, therefore, produced a negative output pulse. For example, assume that the output of Inverter 439 is positive, indicating that Control Character Identification Gate 365 has sensed the presence of a Control Character in the Shift Registers. One input to Counter Reset Gate 427 is thus positive since it is connected to the output of Inverter 433 over Line 443. If Decoding AND GATE 395 receives its unique character code (READY), its output goes negative and inhibits Reset Gate 427; but if it has not received its unique character code, its output remains positive so that the two inputs to Reset Gate 427 are now positive, and it generates a negative output pulse which is applied to the Reset Line of the Flip Flops which form Scale of Four Counter 407. This pulse resets the Flip Flop to zero, thereby inhibiting Output AND GATE 413 until four consecutive READY Characters are received. Similarly, the other Reset Gates 428–432 generate reset pulses for their associated Counters whenever a Control Character, other than the one they respond to, is received.

The inputs to Output AND GATES 413–418 are all positive if, and only if, four consecutive signals of the type which their associated Decoding Gates are designed to recognize have been received so that the two outputs from the Flip Flops of the Counter are simultaneously positive, if the Decoding Gate has just received a suitable code, and if the Control Character Enabling Signal has been received so that the output of the Inverter is positive. If all of these conditions are satisfied, an Output Signal, corresponding to the particular Control Character, is produced.

*The modulator*

Figure 8:
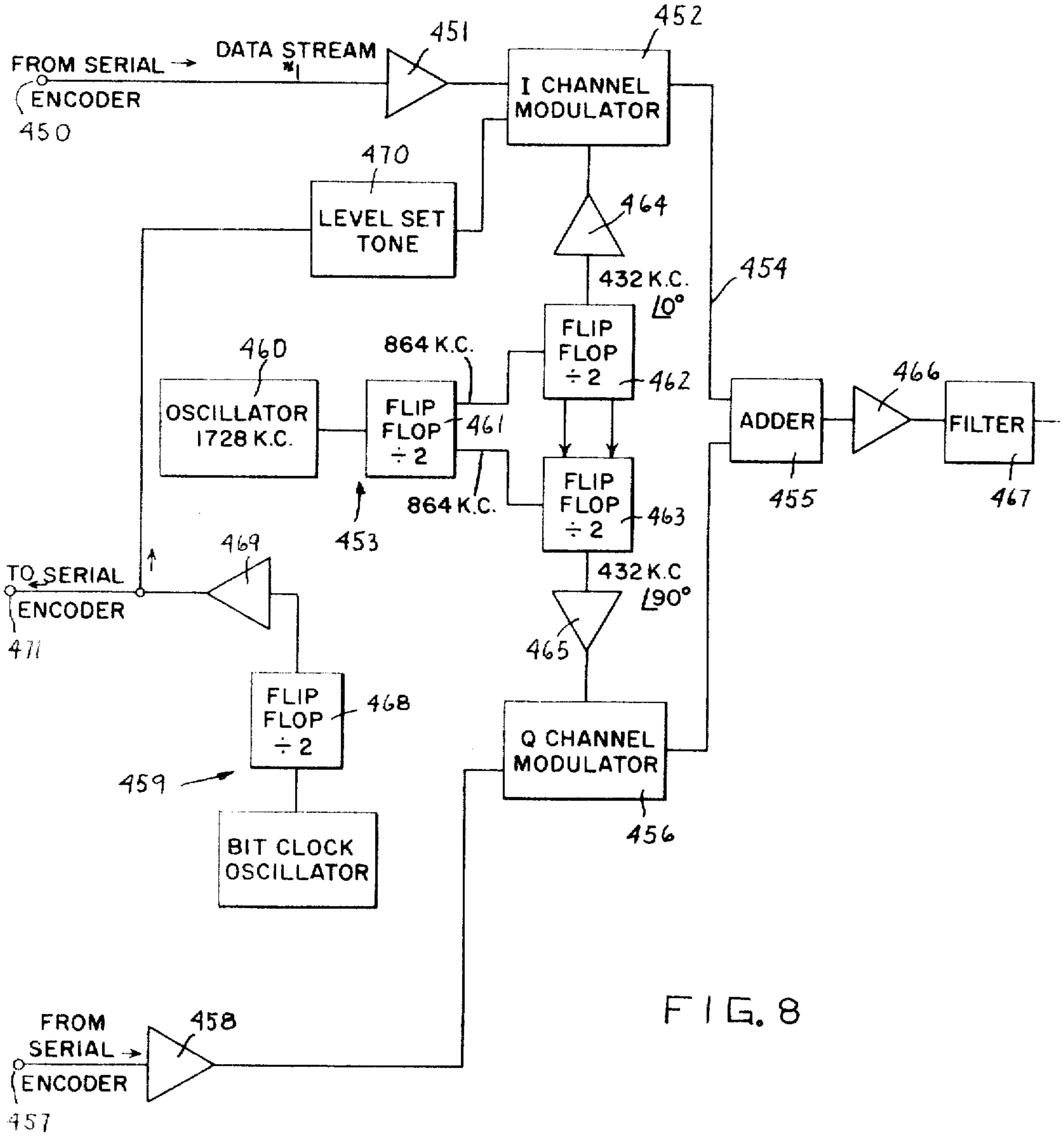

The Modulator, shown in FIG. 8, takes the two serial bit streams from the Serial Encoder and modulates them separately into two carriers for transmission over the communication medium which may be a microwave, R.-F., or cable link, etc. The two synchronized serial bit streams are separately modulated onto two carriers which are of the same frequency but of ninety degree (90°) phase difference. The individual ONE and ZERO bits change the carrier phase by one hundred eighty degrees (180°). That is, the phase of the carrier for a one bit is one hundred eighty degrees (180°) different from the carrier phase for a ZERO bit. The two modulated carriers, which are double sideband, suppressed carrier signals, are added algebraically into one wave form for transmission. The output signal takes one of four possible phase positions, depending on the four possible combinations of ONES and ZEROS, 1 1, 1 0, 0 0, 0 1. The output signal, which is the vector sum of the two modulated carriers, therefore, contains information about two bits, one in each of the two bit streams applied to the Modulator.

Thus, a first bit stream is impressed on Input Terminal 450, amplified in Amplifier 451 and applied to the input of a Balanced Modulator 452 identified by the legend "I" Channel Modulator. A carrier signal from a Local Oscillator indicated generally at 453 is applied to Modulator 452 and is modulated by the individual bits which shift its phase between zero or a one hundred eighty degrees (180°). The output from "I" Channel Modulator 452 is applied over Lead 454 to an Adding Circuit 455. Adding Circuit 455 also receives the output from "Q" Channel Modulator 456 wherein the bits from the second bit stream, impressed on Input Terminal 457 and Amplifier 458, Modulate Quadrature Carrier which is ninety degrees (90°) out of phase with the carrier applied to Modulator 452. Modulator 456 produces a modulated Carrier Signal, the phase of which is shifted between zero and one hundred and eighty degrees (180°) by the individual bits. Both "Q" and "I" Channel Modulators 452 and 456 are Balanced Modulators so that the output is a double sideband, carrier suppressed signal. The "I" Channel Modulator also has a tone or pilot signal impressed thereon from a Bit Clock Oscillator shown generally at 459. These tone or pilot signals, at the clock frequency, are modulated onto the carrier to synchronize the local oscillator at the Receiver, and to provide clock pulses for the Serial Decoder and other equipment at the receiving terminal. The relationship of the tone or pilot signal to the frequency of the two sidebands will be explained in greater detail later. At this point, suffice it to say, that the repetition rate of the tone signals is such that it falls in that portion of the frequency spectrum where the modulated bits have no frequency components.

Local Oscillator 453 consists of a master oscillator 460, such as a crystal controlled oscillator or the like, which generates a 1728 kc. signal. The output of Oscillator 460 is applied to a Scale of Two Flip Flop Frequency Divider 461 which produces two square wave pulse trains of half the frequency, i.e., 864 kc. The two 864 kc. pulse trains are each further divided in the Flip Flop Frequency Dividers 462 and 463 to produce two 432 kc. carrier signals which are 90° out of phase. Flip Flops 462 and 463 are interconnected by means of steering circuits, not shown, which establish the ninety degree (90°) phase relationship between the outputs of the two Flip Flops. Steering Circuits of this character are old and well known, and no further explanation thereof is required. Reference is hereby made to a Handbook of Selected Semiconductor Circuits NOBSR73231 prepared by Transistor Applications, Inc., for Bureau of Ships, Department of Navy, NavShips 93484, dated September 1959. Reference is also made to the textbook, Pulse and Digital Circuits—Millmann E. Taub, published by the McGraw Hill Book Company, etc., New York (1956), and particularly pages 430 through 431 and FIG. 14–2 described therein.

The two 432 kilocycle Carrier Signals are impressed on the respective Modulators 452 and 456 through suitable amplifiers 464 and 465 where they are modulated by the bit streams and combined in Adder 455. The output of Adder 455 is supplied through an Amplifier 466, and a Filter 467 either directly to the transmitting antenna, cable, etc., or alternatively the now modulated signal may be further modulated onto another high frequency microwave carrier.

The Bit Clock Oscillator 459 produces clock pulses which are also modulated on the carrier to transmit a signal which may be used at the receiver to synchronize the local oscillator and which is used as a source of clock pulses in the Serial Decoder and other circuitry. The oscillator consists of a 220 kc. oscillator which is divided in Frequency Divider Flip Flop 468 to produce a 110 kilocycle clock pulse train which is applied through Amplifier 469 and Tone Level Setting Circuit 470 to the Channel Modulator 452. Tone Level Circuit 470 controls the amplitude of the 110 kilocycle Tone Signal which is modulated onto the carrier. The 110 kilocycle clock pulses are also applied over Output Terminal 471 to the Serial Encoder to control the rate at which the bits are clocked out of the Encoder Shift Register to form the two serial bit streams which are applied to the Modulators. Thus, it can be seen that the tone signal, which is modulated onto the carrier, has a pulse rate or repetition frequency equal to the rate at which serial bits are clocked out of the Serial Encoder. Hence, at the receiving end, these tone signals at 110 kilocycles may be utilized as clock pulses in the Serial Decoder and such to perform the various clock pulse functions.

Figure 9:
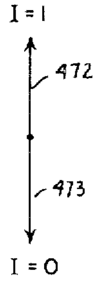
FIGS. 9–13 are diagrams illustrating the manner in which the modulator of FIG. 8 functions.
Figure 10:
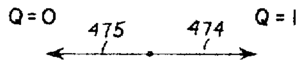
Figure 11:
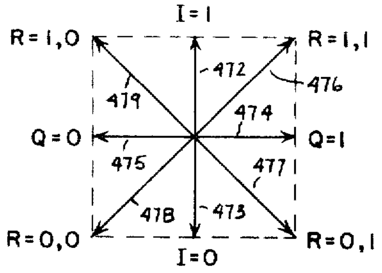

The manner in which the Modulator of FIG. 8 produces the modulated output signal, which is transmitted over the transmission medium, may be most easily understood by a reference to the vector diagrams illustrated in FIGS. 9–11. As adverted to briefly above, the data bit stream applied to the "I" Channel Modulator 452 modulates the carrier by reversing the phase of the carrier by one hundred eighty degrees (180°) for ONE and ZERO Bits. Thus, as shown in FIG. 9, the output of Modulator 452 is represented by vector 472 whenever the bit is a ONE and by the one hundred eighty degree (180°) out of phase Vector 473 when the bit is a ZERO. The phase of these two vectors thus represents the informational content of the transmitted wave. Similarly, the output of "Q" Channel Modulator 456 is represented by Vector 474 of FIG. 10 whenever the bit in the second bit stream is a ONE and by the VECTOR 475 when the bit is a ZERO. The vectors representing the outputs of the two Modulators are in quadrature since the carrier applied to "Q" Channel Modulator 456 is ninety degrees (90°) out of phase with the carrier applied to "I" Channel Modulator 452.

The two outputs are algebraically added in Adder Circuit 455, the output of Adder Circuit 455 can take one of four phase positions, as shown in FIG. 11, depending on the four possible combinations of ONES and ZEROES. If the bits applied to the two Modulators are both ONES, the output of Adder 455 is represented by the Vector 476 which represents their vectorial sum of "I" and "Q" ONE Vectors 472 and 474. Similarly, Vectors 477, 478 and 479 represent the remaining bit combinations, i.e., 0 1; 0 0; and 1 0. Thus, the Modulated Carrier Wave which is transmitted contains information about two individual bits, one from each data stream, and this information may then be extracted by the Demodulating Circuit by sensing and establishing the relationship of the vector with the original carrier signals.

Figure 12:
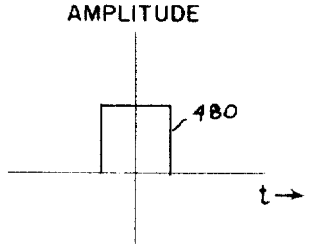
Figure 13:
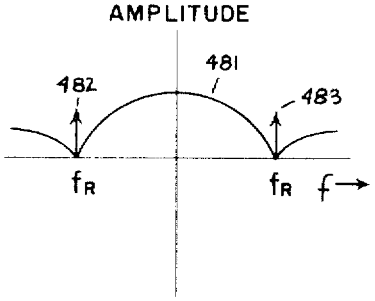

The function of the 110 kilocycle Tone Signal and its position in the frequency spectrum may be most easily understood by reference to FIGS. 12 and 13. Thus, as illustrated in FIG. 12, a random unit pulse such as shown at 480 has an amplitude distribution with time as shown, the pulse representing in this instance a Binary ONE Bit. Such a pulse when subjected to a Fourier analysis has a frequency distribution of the type illustrated in the diagram of FIG. 13 wherein Amplitude A is plotted along the ordinate and Frequency $f$ along the abscissa. Curve 481 indicates that there is a D.C. component in the pulse and varying frequency components out to infinity. However, it will be noted that a frequency $f_r$ the pulse has no frequency component. The frequency $f_r$ is related to the pulse frequency in that it is equal to the repetition rate of the Pulse 480. Hence, by inserting a 110 kc. Tone Signal, i.e. equal to the rate at which the Data Bits 480 are read out, the Tone Signals 482 and 483 are inserted into a frequency slot where the pulse has no frequency components. By then passing the signals through a filter having a bandpass equal to $f_r - f_r^1$ only the modulated pulse signal and the tone signal are transmitted to the receiver.

*The demodulator*

The modulated signal after propagation over the transmission medium is intercepted at the receiver terminal and the information, in the form of the binary ONE and ZERO bits is extracted from the carrier and transmitted to the Serial Decoder for further processing. Essentially, the modulated carrier, which is a double sideband, carrier suppressed signal, is processed in a phase coherent receiver wherein a carrier signal from a local oscillator of the same frequency as the transmitter carrier is reinserted into the double sideband signal ($f_c \pm f_m$) to demodulate the sidebands thereby to retrieve the individual bits. To this end, the received signal is supplied to two balanced modulators along with two 90° out of phase carrier signals from the local oscillator. The carrier from the local oscillator and the received modulated sidebands produce an output from the modulator which represents the individual bits modulated onto the carrier. However, since a carrier is reinserted in order to retrieve the information from the received signal, it is obvious that the carrier signal supplied by the local oscillator at the receiver must be of the same frequency as the transmitter carrier lest errors be introduced in extracting the information. To this end, a phase locking circuit is provided which utilizes the 110 kc. tone signal transmitted along with the sidebands to generate an error signal proportional to any frequency deviation of the carrier from the transmitter carrier. This error signal is utilized to control the local oscillator at the receiver to produce frequency and phase alignment. Unfortunately, however, even though the local oscillator carrier frequency is the same as the transmitter carrier frequency, the local oscillator may lock in either of two stable phase conditions, i.e. zero degrees with respect to the transmitter carrier or 180° out of phase. In the normal voice frequency receiver, this phase ambiguity of the local oscillator, i.e., either zero and 180°, is of no substantial significance since no perceptible effect on the transmitted voice signal is observed. However, in transmitting data in pulse form a 180° phase difference between the reinserted carrier from the local oscillator and the transmitter carrier, produces intolerable errors, since it reverses the binary pulse information. That is, a transmitted ONE bit is retrieved as a ZERO bit, and a transmitted ZERO bit is retrieved as a ONE bit. Consequently further circuitry is provided for sensing and correcting any phase ambiguity so that the local oscillator is phase locked to the transmit carrier a zero degree phase difference exists at all times.

Figure 14:
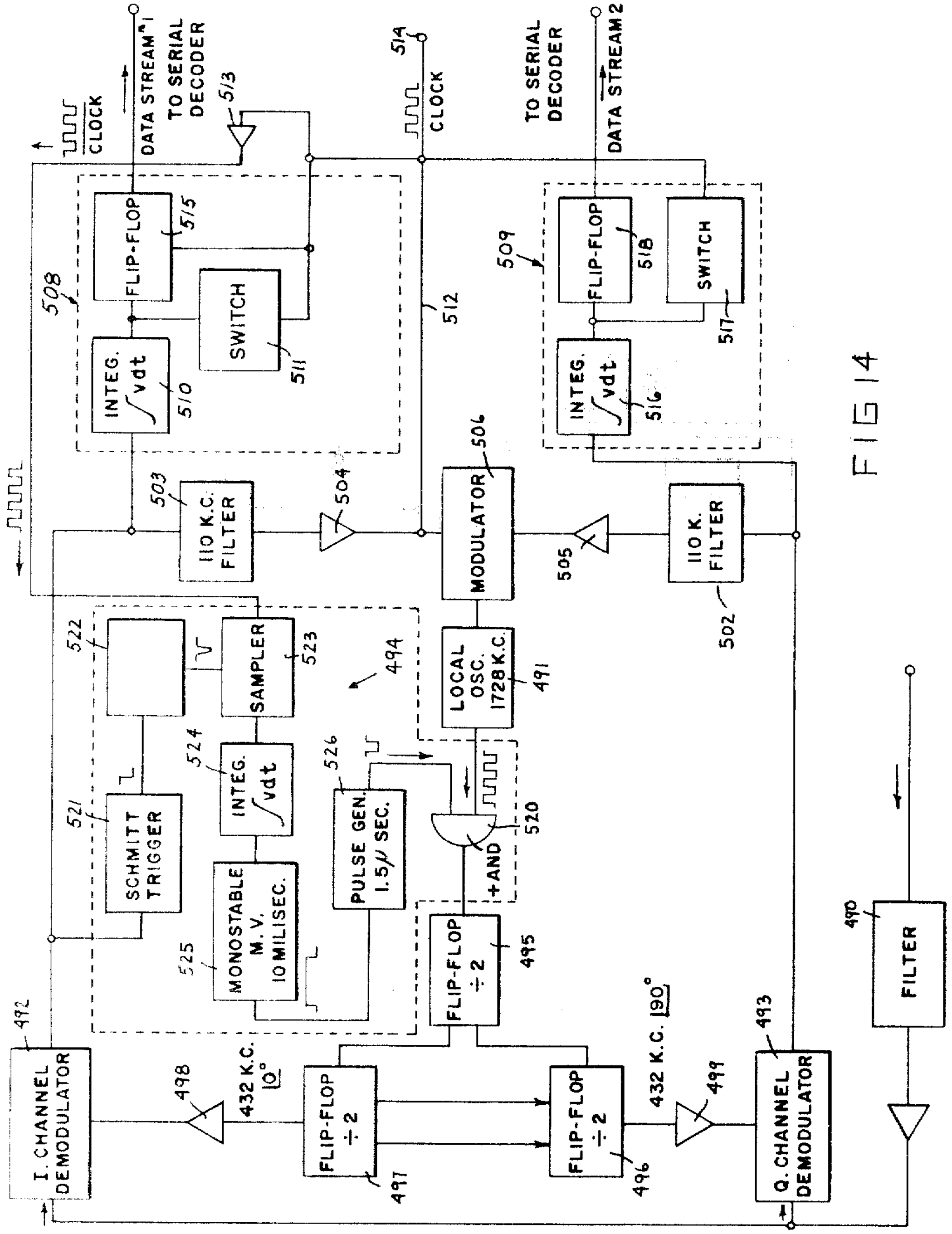
FIG. 14 is a schematic, in Block Diagram Form, of the demodulator which receives the modulated carrier and retrieves the serial bit stream from the carrier for application to the Serial Decoder.

FIGURE 14 shows a block diagram of the Demodulator Circuitry in which the double sideband signal is filtered and amplified in Filter 490 and a suitable amplifier and applied to Balanced Demodulators 492 and 493 which are the "I" Channel and "Q" Channel Demodulators, respectively. A Local Oscillator 491 provides a carrier of the same frequency as the transmit carrier, for the demodulators. The 1728 kc. carrier output from the Local Oscillator is sensed and controlled in a Phase Ambiguity Detector 494, to be described presently and applied to a frequency dividing Flip Flop 495 which divides the oscillator pulse rate to 864 kc. The 864 kc. pulses are applied to two further frequency dividing Flip Flops 496 and 497 to produce two 432 kc. pulse trains which are applied as the reinserted carriers to I and Q Demodulators 492 and 493. The output of Flip Flop 497 is applied to an Amplifier 498 and thence to the "I" Channel Demodulator 492 whereas the output of Flip Flop 496 is applied through Amplifier 499 to Q Channel Demodulator 493. The output from Flip Flop 46 is 90° out of phase with the output from Flip Flop 497 by virtue of the steering interconnection between these Flip Flops, referred to in relation to the Modulator of FIG. 8.

The Binary Bits are recovered at the output Demodulators 492 and 493 which are product demodulators. Whenever the reinserted carrier is in phase with a ONE component of the modulated signal, positive output pulse representing a ONE is produced. If the reinserted carrier is in quadrature with the modulated signal components, no output is produced from the modulator. If the reinserted carrier is 180° out of phase a negative output signal, which represents a ZERO is produced. Referring back to the diagram of FIG. 11, assume vector 472 now represents the reinserted carrier applied to Demodulator 492 and vector 474 represents the reinserted quadrature carrier to Demodulator 493. If the received signal is represented by the vector 476, indicating that a ONE bit from each bit stream was modulated onto the carrier, both the "I" Channel and the "Q" Channel Demodulators produce Binary ONE outputs since the quadrature components of vector 476, along the "I" and "Q" axes, are in phase with the reinserted carriers. If, on the other hand, the phase of the received signal is represented by vector 477, one component lies along the "Q" axis and is in phase with vector 474 and "Q" Demodulator 493 will produce a ONE output. The other component of 477 lies along the "I" axis and the "I" Channel Demodulator 492 produces a ZERO output indicated by a negative signal voltage because the "I" component of vector 477 is 180 degrees out of phase with the Reinserted Carrier 472 so that multiplication of the two signals produces a negative voltage. Similarly, with the other remaining possible positions of the modulated carrier it can be seen that the individual channel demodulators 492 and 493 will extract only the information for one of the serial bit streams thereby reconstituting the original modulating information impressed on the carrier. It will also be immediately clear that if the reinserted carriers 472, 474, 473, and 475 are 180° out of phase with the transmit carrier that binary information is inverted. For example, if the received signal is represented by vector 476 ($Q=1$ and $I=1$) and the reinserted carriers are 180° out of phase, from their correct position, the reinserted carriers are represented by vectors 473 and 475. Thus, the I nor the Q Demodulator will produce a ZERO output, i.e. a negative voltage, and binary ZEROS rather than binary ONES are recovered. Thus, complete inversion of the code is produced with a transmitted ONE recovered as a ZERO and a transmitted ZERO recovered as a ONE.

The demodulated tone signal of Demodulaors is used to sense any frequency and phase deviation between the local oscillator and the transmitted signal and to produce an error signal, which is used to control the Local Oscillator. To this end, the output from "Q" Channel Demodulator is passed through a narrow band 110 kc. tone filter. Similarly, the output of "I" Channel Demodulator 492 is passed through a 110 kc. tone filter 503. The two filters are coupled through Amplifiers 504 and 505 to a Product Demodulator 506. In the event that the local oscillator signal is in phase (or exactly 180° out of phase) with the transmitter carrier, the tone signal will appear at the output of "I" Channel Demodulator 492 but not at the output or "Q" Channel Demodulator 493 (it will be remembered that at the modulator transmitter the tone signal was modulated only onto the "I" Channel Carrier), since the tone signal is in phase with the inserted carrier to the "I" Demodulator and in quadrature with the Quadrature Carrier to "Q" Demodulator. As a result, the Product Demodulator 506 receives a tone signal from the "I" Channel but no tone signal from the "Q" Channel, and its output is, therefore, zero. Local Oscillator 491 maintains its frequency. If the reinserted carrier is not phase synchronized with the carrier at the transmitter, the reinserted carrier at "Q" Channel Demodulator 493 is no longer in quadrature with the tone signal and has a component which is in phase with this carrier. As a result, a tone signal appears at the output of "Q" Demodulator, the amplitude of which is a function of the amount of phase deviation. The tone output from "Q" Channel Demodulator 493 is now applied to Product Modulator 506 along with the tone signal from "I" Channel Demodulator 492, and Modulator 506 produces an error signal, the polarity and amplitude of which is proportional to the direction and magnitude of the phase deviation of the local oscillator. This error signal is applied directly to the local oscillator and varies its frequency until it again locks in with the transmitter carrier so that the reinserted carrier applied to "Q" Channel Demodulator 493 is once more in quadrature with the received signal.

The serial bit streams appearing at the output of Demodulators 492 and 493 are applied to Data Retrieval Circuits 508 and 509 in which the pulse shape of the recovered bit is reconstituted. That is, in the course of the propagation over the transmission medium noise and other factors may have produced serious deterioration in the wave form of pulses. Circuits 508 and 509 include pulse shaping networks to produce the desired output pulse configurations for the bits. Referring now to Data Retrieval Circuit 508, the output signal from "I" Channel Demodulator 492 is applied to an Integrating Network 510 which may typically include a resistance-capacitance (R-C) Network. The Integrator integrates the value of the output signal from the Demodulator and produces a voltage proportional to the average amplitude of the input signal over the bit time. The capacitor forming part of the integrating Network 196 is periodically discharged by Switch Means 511 which is triggered at the clock pulse rate. The clock pulses for triggering Switch 511 are supplied over Lead 512 from the input of Modulator 506. The clock pulses are also applied to an output clock pulse Terminal 514 for transmission to the Serial Decoder and the remaining circuitry. The clock pulses are inverted in Amplifier 513 and applied to the Phase Ambiguity Detector 494. A Flip Flop 515 is connected to Integrator 510 and the switching and discharge of the Integrator triggers Flip Flop 515 to reconstitute the bit stream. Data Retrieval Circuit 509 is similar in construction and also includes an Integrating Network 516 connected to the output of "Q" Channel Demodulator 493. Integrator 515 is controlled by Switch 517 which is triggered at the clock pulse rate by the clock pulses from Lead 512. The output pulses from Integrator 516 trigger Flip Flop 518 thereby reconstituting the bit stream.

The Phase Ambiguity Detector, adverted to briefly above, senses whether the Local Oscillator Output is exactly in phase with the transmitter carrier or is one hundred eighty degrees (180°) out of phase and controls a Local Oscillator plus (+) AND GATE 520 to regulate passage of the pulse train from Local Oscillator 491 to Flip Flop 495. If the Local Oscillator signal is exactly in phase with the transmitted carrier, AND GATE 520 is enabled and the pulses from the Local Oscillator are passed to Flip Flop 495. In the event the Local Oscillator signal is one hundred eighty degrees (180°) out of phase with the transmitter carrier, a control signal of fixed duration is generated which disables AND GATE 520 for a sufficient time to produce a one hundred eighty degree (180°) phase reversal before the local oscillator signals are again permitted to pass through the Gate to the Flip Flop.

Briefly, Phase Ambiguity Detector 494 senses the polarity of the clock pulse each time the output bits from "I" Channel Demodulator 492 have ZERO crossing. Since the character bits are clocked out of the Serial Encoder during the positive clock pulse half (the positive leading edge of the clock pulse resets the Shift Register Flip Flop to shift out the bits), this provides a means to determine whether the local oscillator is in phase or 180° out of phase with the transmitter carrier. If the local oscillator is in phase to permit proper demodulation, the ZERO crossings of the bits will still occur during the positive clock pulse halves. If, on the other hand, it is 180° out of phase, the clock pulses and the ONE and ZERO bits will be inverted, and the ZERO crossings will occur during the negative clock pulse halves. This change in polarity may be used to generate a control voltage which triggers a number of pulse generators to produce the inhibiting signal for AND GATE 520. The Phase Ambiguity Detector includes a Schmitt Trigger 521 connected directly to the output of "I" Channel Demodulator 492. The Schmitt Trigger is a well known device and produces a negative going pulse transition from one or the other each time the output from the "I" Channel Demodulator crosses zero, indicating a change from Binary ONE to ZERO or from Binary ZERO to ONE.

The negative going pulses actuate a Trigger Pulse Generator 522 which produces a short negative triggering pulse in response to each pulse from the Schmitt Trigger. These negative pulses are applied to a Sampler 523 which also receives a pulse train representative of the demodulated clock pulses. The pulse train is at the clock frequency but is the inverted clock pulse train, so that the positive clock pulse half is represented by a negative pulse and the negative clock pulse half is positive pulse. This pulse train is defined by the logical designation of "not clock." The output of Sampler 523 is connected to an Integrating Circuit 524 which includes a storage device such as a capacitor. The Capacitor is charged to a given voltage level as long as the negative going pulses from Trigger Pulse Generator occur in a proper phase relationship to the "not clock" pulses which means that the ZERO crossings of the bits have the proper phase relationship to the clock pulses. That is, if the negative pulse from the Trigger Pulse Generator (the ZERO crossing) occurs during the negative half of the $\overline{\text{clock}}$ pulse (i.e., the positive half of the clock pulse), Integrating Circuit 524 charges to voltage level which inhibits a One Shot 525 and no inhibiting pulse is generated by Pulse Generator 525 for AND GATE 520. If the phase of the negative pulse from the Trigger Pulse Generator and the $\overline{\text{clock}}$ pulse applied to Sampler 523 is incorrect (which means the ZERO crossings are occurring during the negative clock pulse half) the voltage from Integrator 524 steers a trigger from AND GATE 520 into One Shot 525. One Shot 525 produces a ten millisecond positive pulse, the leading edge of which triggers Pulse Generator 526 which generates 1.5 microsecond negative inhibiting pulse. The negative inhibiting pulse is applied to and inhibits AND GATE 520 preventing passage of pulses from Local Oscillator 491 to Flip Flop 495. The timing and duration of the inhibiting pulse is such that the Frequency Dividing Flip Flops 496, 497 are again retriggered with a phase change of 180°, thus locking Local Oscillator 491 in exact phase synchronism with the Transmitter Carrier.

*The phase ambiguity detector*

The Phase Ambiguity Detector senses the bit zero crossings, as the bits change in both directions between ONE and ZERO, and determines whether these occur during the positive clock pulse half to determine whether the phase relationship between the recovered signal and the original carrier is correct. That is, it will be recalled that the bit stream made up of the control and data characters are read out of the Serial Encoder during the positive half of the clock pulse. Consequently, if phase coherence is maintained after transmission, the data character crossing in the recovered data should also occur during the positive half of the clock pulses which have been transmitted along with the data as a tone signal. If, on the other hand, the data crossings in the recovered signal occur during the negative clock pulse half, this is an indication that there has been 180° phase inversion. The phase of the local oscillator must, therefore, be inverted by 180° in order to re-establish the proper phase relationship. By generating a pulse in response to each ZERO crossing of the recovered bits and by comparing the same with the recovered clock pulses, a signal may be generated, the polarity of which indicates whether the ZERO crossings are taking place during the positive or the negative clock pulse halves. This control signal is utilized to trigger a Pulse Generator which inhibits the Local Oscillator Pulse Gate. No pulses are transmitted to the Dividing Flip Flops for a sufficient number of counts to produce a 180° phase reversal of the reinserted carrier applied to the "Q" and "I" Channel Demodulators.

Figure 15:
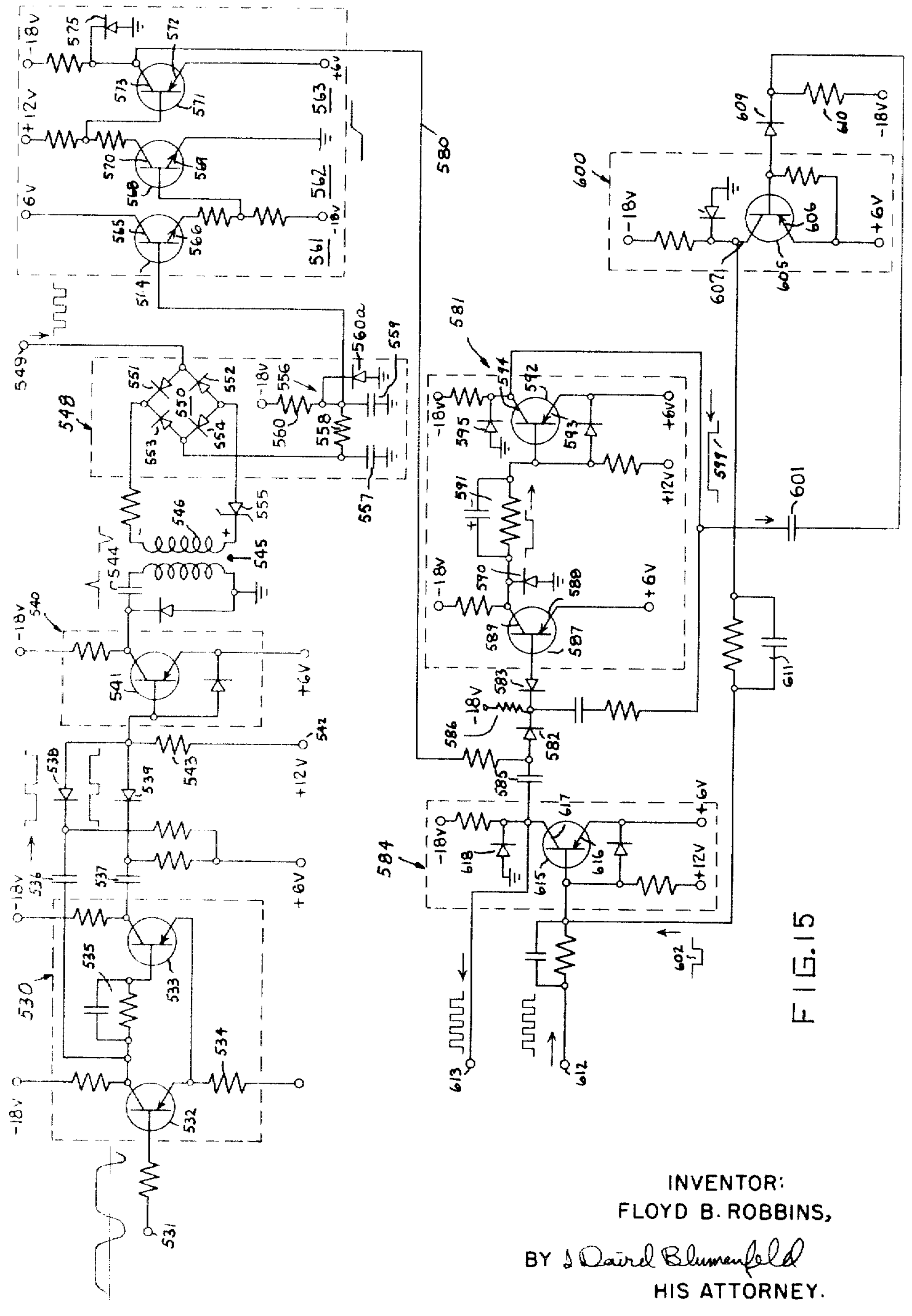
FIG. 15 is a circuit diagram of the Phase Ambiguity Correction Circuit forming a part of the demodulator of FIG. 14.

The Phase Ambiguity Detector Circuitry is illustrated in FIG. 15 and includes a Schmitt Trigger 530, which receives the recovered bit stream from the "I" Channel Demodulator over Input Terminal 531. The Schmitt Trigger includes PNP Transistors 532 and 533 having their emitters connected through a Common Emitter Resistor 534 to a source of positive potential. The base of PNP Transistor 532 is connected to Input Terminal 531. The collector of Transistor 532 is connected to the base of PNP Transistor 533 through an RC Coupling Network 535. Whenever the input signal crosses zero and becomes sufficiently positive to exceed the triggering voltage of the device, the base of Transistor 532 becomes sufficiently positive to drive it to cut off. This produces a voltage drop at the Collector of Transistor 532 which is transmitted to the base of transistor 533 through an RC Coupling Network 535 causing transistor 533 to conduct. Since the emitter of Transistor 533 is also connected to the Common Emitter Resistance 534 the current flowing through the Resistor 534 is increased, reducing the emitter voltage of Transistor 532 toward ground thereby accelerating the rate at which Transistor 532 turns off. As long as the input voltage exceeds the positive triggering voltage of the trigger, Transistor 532 remains in the cut off state, and Transistor 533 conducts.

If the input signal crosses zero so that the voltage at Terminal 531 drops and goes negative, Transistor 532 begins to conduct, as soon as the voltage exceeds the triggering voltage, and the voltage at its collector rises reducing the conductivity of Transistor 533. This reduces the current through Common Emitter Resistor 534, and the Emitter Voltage of Transistor 532 rises causing the transistor to conduct more heavily. This raises the potential at its collector, and the PNP Transistor 533 is rapidly driven into the nonconducting state. The two transistors forming the Schmitt trigger are alternately switched between the conducting and the nonconducting states whenever the recovered signal crosses zero and exceeds the triggering voltage of the device.

The output voltages at the collectors of Transistors 532 and 533 go negative when the transistor is cut off and rise when the transistor is driven into the conducting state. Separate outputs are taken from the collectors of each of the transistors to produce two signals of opposite polarity. These two signals are applied through Coupling Capacitors 536 and 537 to a pair of Diodes 538 and 539. Diodes 538 and 539 are so poled that they pass only negative pulses. As a result, diode 538 passes a negative pulse whenever Transistor 532 is cut off, indicating that the signal at Input Terminal 531 has crossed zero in the positive direction, and Diode 539 passes a negative pulse whenever Transistor 533 is cut off, indicating that the signal at Input Terminal 531 has crossed zero in the negative direction. Since these transistors go into the nonconductive state respectively on the leading and lagging edges of the signal recovered from the "I" Channel Demodulator it can be seen that a negative pulse is produced for each data crossing of the input signal.

The negative pulses are applied to triggering Pulse Generator shown generally at 540 which generates a positive going output pulse of short duration for each of the negative input pulses. Pulse Generator 540 consists of a PNP Transistor 541 which is normally biased to cut off by having its base returned to a positive biasing voltage at Terminal 542 through a Resistance 543. The positive biasing voltage at the base of the transistor is more positive than the positive voltage applied to its emitter; and, hence, the base-emitter junction is reverse biased, and the transistor does not conduct. The appearance of a negative going pulse to the base of Transistor 461 momentarily overcomes the positive bias applied to the base and produces momentary conduction through the transistor thereby producing at its collector a short positive going pulse, which is coupled through a Blocking Capacitor 544 to the primary winding of a Transformer 545. Secondary Winding 456 of the Transformer is connected to a Sampling Circuit 548 where the phase of the zero crossing and inverted clock pulses at Clock Input Terminal 549 are compared to generate a control signal which is representative of the phase relationship of the data crossings and the polarity of the clock pulses.

The positive pulse applied to the primary winding of Transformer 545 is inverted by virtue of transformer action to produce a negative pulse on the Secondary Winding 546 with the polarity indicated by the plus (+) or minus (−) sign. This negative pulse is applied across one diagonal of a Diode Bridge 550 which consists of four Diodes 551–554. A Zener Diode 555 is connected between the lower end of the Transformer Secondary 545 and one terminal of the Bridge 550. The Zener Diode prevents Diode Bridge 550 from conducting in the absence of a negative pulse across secondary Winding 546. Connected across the other diagonal of Diode Bridge 550 is the Clock Pulse Input Terminal 549 and a Storage Network 556 which charges to a polarity and voltage level which is a function of the phase relationship of the signal zero crossings and the clock pules. Storage Network 556 consists of a first Capacitor 557 connected directly to Bridge 550 and an Integrating Network comprising Resistance 558 and Capacitance 559 with the latter charging to the average value of the voltage across Storage Capacitor 557.

The junction of Resistance 558 and Capacitor 559 is connected through Resistance 560 to a source of negative voltage (−18 volts). The junction is also connected through a Diode 560*a* to ground potential. Diode 560*a* acts as a clamping diode and clamps the junction of Resistance 558 Capacitor 559 to ground. Thus, Capacitor 559 can charge up to a positive voltage with respect to ground but cannot charge to a negative level with respect to ground since Diode 560*a* conducts and clamps the junction to the ground potential. If the negative pulses across secondary Winding 546 occur during the time that the inverted clock pulse at Terminal 549 are positive, a conducting path through Diode Bridge 550 is established so that Capacitors 557 and 559 charge to a positive voltage. A positive voltage is an indication that the inserted carrier is 180° out of phase with the original transmitter carrier and that a phase change of the carrier must be established. That is, when the inverted Clock at Terminal 549 is positive, the actual clock is negative which means that the zero crossings are occurring during the negative clock pulse half, and there has been an inversion of clock pulses and the serial bit stream. If, on the other hand, the pulses from the Schmitt Trigger occur when the inverted clock pulses at Terminal 549 are negative, discharging the storage capacitors toward ground or zero volts, this is an indication that the zero crossings are taking place during the positive clock pulse and the reinserted carrier is in phase with the transmitter carrier.

The voltage across Storage Capacitors 555 and 559 is applied to an Amplifying Circuit. The Amplifying Circuit consists of an Emitter Follower 561 and Common Emitter Amplifiers 562 and 563. The voltage from the Storage Circuit is applied to the base of an NPN Transistor 564, connected in an emitter-follower configuration. Transistor 564 includes a Collector 565 connected directly to a source of positive voltage and an Emitter 566 connected through a pair of dropping resistances to the negative terminal of a source of energizing voltage. The output from Emitter Follower 561 is applied to the base of another NPN Transistor 568 connected in a common-emitter configuration. Transistor 568 includes an Emitter 569 connected directly to ground and a Collector 570 connected to a pair of series connected resistances to the positive terminal of a source of energizing voltages. The output of Common Emitter 562 is taken from the collector and applied to the base of a PNP Transistor 571 connected in the Common-Emitter configuration. Transistor 571 includes an emitter 572 connected directly to the positive terminal of a source of energizing voltage and a Collector 578 connected to a dripping Resistance 574 to the negative terminal of the source of energy. Collector 573 of PNP Transistor 571 is clamped to ground by means of the Diode 575, the cathode of which is connected directly to the collector and the anode of which is grounded.

With Transistor 571 in the nonconducting state the cathode of the clamping diode is negative with respect to its anode and the diode conducts heavily. When the diode conducts, its impedance is very low, and the collector is maintained essentially at ground potential. If the transistor becomes conducting, the Collector-Emitter Resistance of the transistor drops to a very low value, and the collector rises essentially to the potential at the positive terminal to which the emitter is connected. Thus, in changing between the nonconducting and conducting states the collector output voltage of PNP Transistor 571 varies between zero and a fixed positive voltage (+6 v.). The collector is connected by Lead 580 to the input of a One Shot 581. Whenever the voltage at the collector of Transistor 571 goes positive, One Shot 581 is triggered to produce an output pulse which is utilized initiating a sequence of actions which disables the AND GATE through which the local oscillator signal is transmitted to the Demodulators.

If the voltage across Storage Capacitors 557 and 559 goes positive, indicating that the zero crossings are occurring during the negative halves of the clock pulses, and hence a 180° phase error, Emitter Follower 561 conducts heavily, and the output from its emitter circuit to Common-Emitter 562 goes more positive. Since Common-Emitter 562 also includes a NPN Transistor the positive base drive voltage causes this transistor to become conductive. The voltage at its collector drops applying a negative going voltage to the base of Common Emitter 563. The PNP Transistor of Common Emitter 563 is driven into conduction by the negative going voltage applied to its base and the collector voltage rises from ground to a positive value. This applies a positive voltage to Diodes 582 and 583 which are connected to the input of One Shot 581. One Shot Multivibrator is triggered by a pulse from AND GATE 584 through Coupling Capacitor 585 and generates a positive ten millisecond output pulse.

If, on the other hand, the pulses from the Schmitt Trigger coincide with the negative halves of the inverted clock pulses at Terminal 549, Capacitors 557 and 559 discharge towards ground potential, and the signal applied to the base electrode of Emitter Follower 561 drops. The output voltage from the emitter resistances drops correspondingly and applies a negative going voltage to the base of Common-Emitter Amplifier 562. Transistor 568 if Amplifier 562 is less conductive, and the voltage at its collector rises. This positive going voltage at the collector of Transistor 568 is applied to the base of PNP Transistor 571, reverse biasing its Emitter-Base Junction and causing it to become nonconducting so that the voltage at its collector goes to ground. Whenever the output of Common Emitter Amplifier 563 is at ground or zero voltage the junction of coupling Capacitor 58 and Diode 582 is at ground potential and positive pulses from the AND GATE 584 cannot pass through Diodes 582 and 583 to trigger One Shot 581.

If the voltage at the collector of Common Emitter Amplifier 571 rises to a positive level, however, the next positive going output pulse from AND GATE 584 momentarily increases conduction of Diode 582. This increases the voltage drop across Resistor 586 connected between a negative biasing source and the junction of Diodes 582 and 583, and the voltage at the junction momentarily goes more positive. This short positive pulse is applied to One Shot 581 and triggers it.

One Shot 581 consists of a PNP Transistor 587 having an emitter 588 connected to a source of positive potential, and a Collector 589 collected through a dropping resistance to a negative terminal of a source of energizing voltage. The Collector 589 is clamped to ground through a Clamping Diode 590 so that the output voltage at the collector is at ground when the transistor is not conducting and is substantially at the positive emitter voltage when the transistor is conducting. The collector of Transistor 587 is connected through an RC Network 591 to the base of a second PNP Transistor 592 which includes an Emitter 593 connected to the positive terminal of a source of energizing voltage and a Collector 594 connected to the negative terminal of the energizing source. Collector 594 of the transistor is again clamped to ground by Clamping Diode 595 so that the voltage at the collector is at ground when the transistor is in a nonconducting state and essentially at the voltage of the positive emitter voltage source when the transistor conducts. The base of Transistor 592 is connected through a dropping Resistance 596 to a source of positive potential which is more positive than the emitter potential. Transistor 592 is thus normally biased to cut off since the base-emitter junction is reverse biased. Transistor 587, on the other hand, is normally conducting since its base is connected through the Input Diode 583, and a Resistance 586 to a negative biasing source. The short positive pulse, which is transmitted when the junction of Coupling Capacitor 585 and Diode 582 goes positive, is applied to the base of Transistor 587 reducing its conductivity so that its collector voltage drops. A negative voltage is applied from Collector 589 to the base of Transistor 592. Transistor 592, therefore, begins conducting, and the voltage at its collector begins to rise. This rising voltage at the collector of Transistor 592 is fed back to the base of Transistor 587 and the Capacitor 598. This further reduces the conductivity of Transistor 587 and the voltage at its collector goes even more positive which causes Transistor 592 to conduct more heavily and its collector voltage rises further. This process continues very rapidly until Transistor 87 is driven to cut off and Transistor 592 becomes fully conductive.

The two transistors remain in this state until the charge on the capacitor of Resistance Capacitance Network 591 has discharged through the shunting resistor, removing the negative voltage from the base of Transistor 592 so that the positive biasing voltage terminates conduction of this transistor. That is, the appearance of the initial triggering which caused Transistor 587 to become nonconducting and its collector voltage to rise to a positive value, produces a current flow through the resistance of RC Network 591. The capacitor of the RC Network, which is connected in shunt with the resistance, therefore, charges up to this voltage with the same polarity. As may be seen by observation, the polarity of the voltage across the capacitor is such as to apply a negative voltage to the base of Transistor 512 which overcomes the effect of the positive biasing voltage and maintains the transistor in a conducting state. However, as the charge on the capacitor begins to leak through its associated resistor, the voltage across the capacitor drops until eventually the negative voltage on the capacitor is insufficient to overcome the effect of the positive biasing voltage, and Transistor 592 is again returned to the nonconducting state. The voltage at its collector, therefore, begins to drop, and this negative going voltage is applied to the base of Transistor 587 until that transistor becomes conducting. The time interval before the One Shot returns to its original state is, of course, determines by the RC time constant of Network 591. In this particular instance, the RC time constant is so chosen that a period of ten milliseconds elapses before the One Shot Multi-Vibrator returns to its original state.

A Positive Pulse 599, which has a ten (10) millisecond duration, is produced at the output of the One Shot. This positive pulse is applied to the input of Pulse Generator 600 through Coupling Capacitor 601. Pulse generator 600 is triggered by the leading edge of Pulse 599, and produces a short negative Pulse 602 which has a duration of approximately 1.5 microseconds, and which is applied to the input of plus (+) AND GATE 584.

Pulse Generator 600 consists of a PNP Transistor 605 having an Emitter 606 connected directly to the positive terminal of a source of energizing voltage and a Collector 607 which is connected through a suitable resistance to the negative terminal of the source of energizing voltage. Collector 607 is clamped to ground by means of a Clamping Diode 608 which, as previously explained, maintains the collector voltage of the transistor at ground potential if the transistor is not conducting and at the positive emitter voltage when the transistor is conducting. Transistor 605 is biased into the conducting state in the absence of a positive pulse from One Shot 581. To this end, the base of the transistor is connected through a Diode 609 and Resistance 610 to a source of negative potential which is sufficiently large to keep the base-emitter diode of the transistor forward biased and the transistor conducting heavily. Under normal circumstances the voltage at Collector 607 is, therefore, positive. The positive-going Leading Edge of Pulse 599 from One Shot 581 reduces conduction of Diode 609, and a positive pulse is applied to the base of Transistor 605. This positive pulse drives the transistor into the nonconducting state, and the voltage at its collector goes from the positive voltage to ground for an interval of approximately 1.5 microseconds. This negative going pulse 602 is applied through an RC Network 611 to the input of AND GATE 584.

The Negative Going Pulse 602 disables AND GATE 584 so that pulses appearing at the AND GATE Input Terminal 612 are not transmitted through the Gate and do not appear at the Output Terminal 613. AND GATE 584 includes a PNP Transistor 615 having an Emitter 616 and a Collector 617. The emitter is connected directly to the positive terminal of a source of energizing voltage, and the collector is connected through a suitable resistance to the negative terminal of the energizing voltage and is clamped to ground by the Clamping Diode 618. The base of Transistor 615 is connected through a Resistance 619 to a source of positive biasing potential which reverse biases the emitter-base junction and maintains the transistor in a nonconductive state in the absence of an input pulse to overcome the effects of this bias.

In the absence of positive output Pulse 599 from One Shot 581 the output of Pulse Generator 600 is positive since Transistor 605 is conducting. This positive voltage is applied to the base of Transistor 615 forming part of AND GATE 584. Transistor 615 is nonconducting and its collector voltage is clamped to ground by Clamping Diode 618. When a positive local oscillator pulse appears at Input 612, it has no effect on Transistor 615 since this transistor is already cut off by the positive voltages being applied from the bias source and from Pulse Generator 600. However, when the local oscillator pulse goes to zero or ground, the base of Transistor 615 suddenly becomes more negative than its emitter and Transistor 615 conducts for the duration of this half of the local oscillator pulse. When Transistor 615 conducts the voltage at its collector rises approximately to the value of the positive voltage at the emitter. A pulse train, therefore, appears at Output Terminal 613 which is 180° out of phase with the input pulse train at Terminal 612. That is, whenever the input pulse is positive the output pulse is at zero, and conversely when the input pulse goes to zero the output goes positive. In any event, as long as there is a positive output from Pulse Generator 600, and the local oscillator is supplying signals to Input Terminal 612, a pulse train is present at the output of AND GATE 584 which is of the same frequency as the local oscillator signal.

If, however, the output from Sampling Circuit 548 has gone positive, indicating that the local oscillator has locked in 180° out of phase with the transmitter carrier the output of Common Emitter Amplifier 563 goes positive, and the next positive pulse produced at Collector 617 of AND GATE Transistor 615 triggers One Shot 581.

The leading edge of the positive pulse from One Shot 581 triggers the Pulse Generator 600 and produces a 1.5 microsecond negative pulse 602 which is applied to the base of AND GATE Transistor 615 disabling the GATE. That is, as soon as Transistor 605 of Pulse Generator 600 stops conducting the voltage at its collector drops from the positive value to ground by virtue of the action of the Clamping Diode 608. This clamps the base of Transistor 615 to ground potential for the duration of the pulse. Transistor 615 conducts heavily, and the voltage at its collector remains at a positive value. As long as the base of Transistor 615 is clamped to ground, a positive pulse at Terminal 612 cannot raise the potential of the base to drive the transistor into the nonconducting state, and when the incoming pulse goes zero this has no effect since the transistor is already conducting. Consequently, the voltage at the collector of Transistor 615 rises to a positive value and remains at a positive value until the termination of the Negative Pulse 602. During this interval, no pulses from the local oscillator are present at Output Terminal 613. As was pointed out previously, Pulse 602 has a duration of approximately 1.5 microseconds. It will be recalled that the repetition frequency of the local oscillator was approximately 1,723 kc. so that the period T of the pulses from the local oscillators is approximately .58 microsecond. Hence, the negative Pulse 602 from the Pulse Generator 600 disables AND GATE 584 for a sufficient length of time to prevent two local oscillator leading pulse edges from passing through the gate. This, as will be seen, presently, produces the desired 180° phase reversal.

Figures 16, 17, 18, 19, 20, 21, 22, 23, 24, 25:
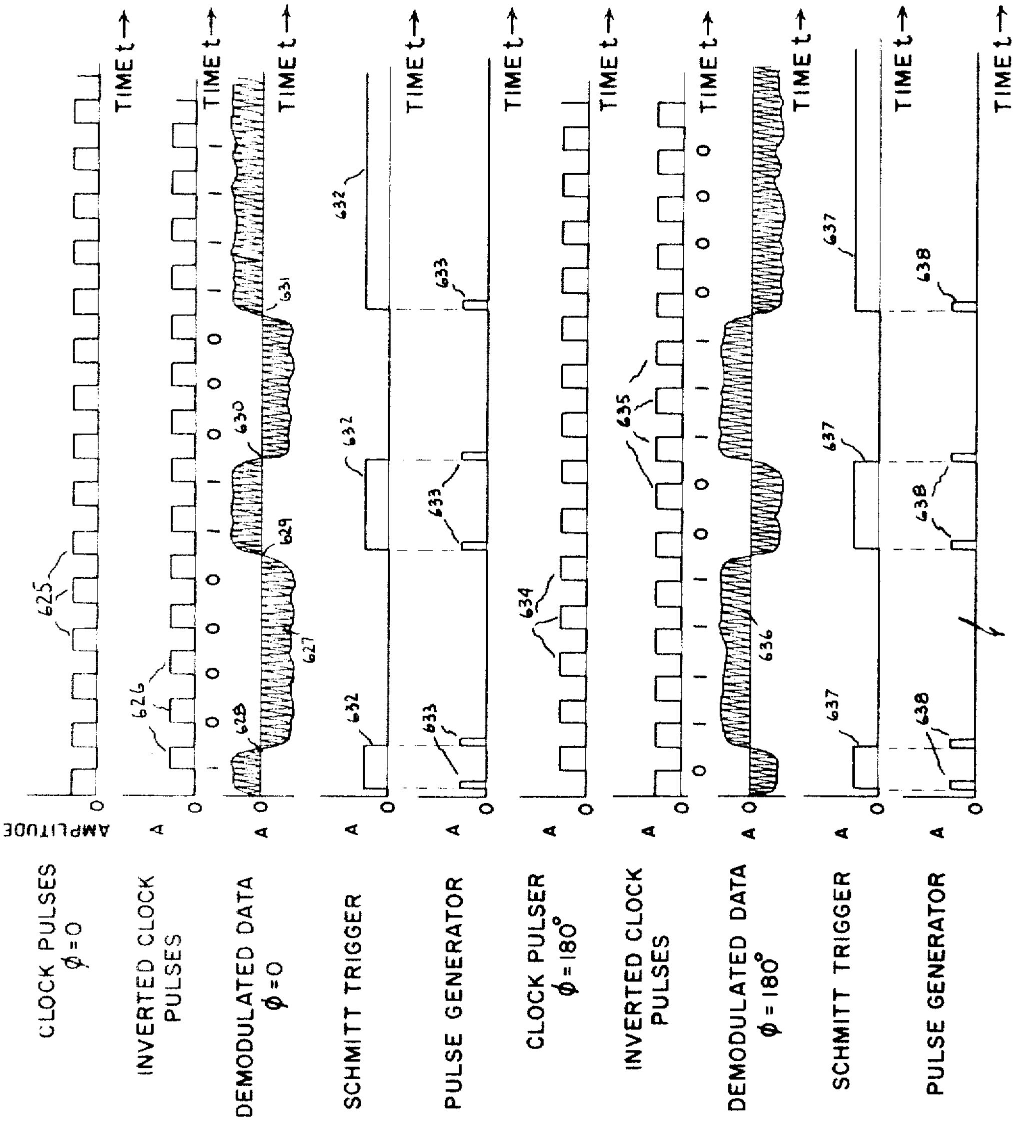
FIGS. 16–32 are Wave Form Diagrams showing the operation of the Phase Ambiguity Circuit of FIG. 15.

The exact operation of the Phase Ambiguity Network illustrated in FIG. 15, may be most easily understood by reference to the wave form diagrams illustrated respectively in FIGS. 16 through 32. FIG. 16 shows clock pulse wave form at the output of the "I" Channel Demodulator for the condition where the local oscillator signal is exactly in phase with the transmitted carrier, i.e., phase difference $\phi=0°$. These clock pulses 625 shift during each clock pulse half between ground and some positive value. FIG. 17 shows the inverted clock pulses 626 which are obtained from the Data Recovery Circuit and applied to Sampling Circuit 548 of the Phase Ambiguity Circuit. These pulses are 180° out of phase with clock pulses 625 and positive when the clock pulse is negative, and vice versa. FIG. 18 shows the recovered Signal 627 appearing at the output of the Demodulator for the condition that $\phi=0$. The wave form, as may be noted by observation, is deteriorated in shape by virtue of the transmission and has a positive value for Binary ONES and a negative value for Binary ZEROES. Thus, Wave Form 627 illustrated in FIG. 18, for example, represents a series of binary characters coded as a 100011000111. It will also be noted that the transitions between a Binary ONE and a Binary ZERO and conversely between ZERO and ONE, as shown by the ZERO crossing 628–631, occur during the positive halves of Clock Pulses 625, indicating that the proper phase relationship has been maintained. It will also be seen that for $\phi=0$, the transitions occur during the negative half of the inverted Clock Pulse 626.

The recovered signal 627 when applied to the Schmitt trigger 530 produces Output Pulses 632 a finite time ($t_1$) after the signal has crossed the ZERO axis in either direction. Triggering Pulse Generator 540 produces a Pulse 633 each time the data character crosses the ZERO axis. These pulses are inverted and applied to the Diode Bridge 550 of Sampling Circuit 548. It can be seen that in this particular case each of the Pulses 633, or rather their negative, occurs during the interval when the inverted Clock Pulse 626 are at ZERO volts. As a result, Storage Capacitors 557 and 559 do not charge up to a positive value but are maintained at ground potential by Clamping Diode 560.

If, on the other hand, the local oscillator is 180° out of phase with the carrier at the transmitter, i.e. the phase difference $\phi=180°$, the Clock Pulses 625 are inverted. The Clock Pulses 634 for $\phi=180°$ are illustrated in FIG. 21 and by comparison with FIG. 16 may be seen to be exactly 180° out of phase. Similarly, the inverted Clock Pulses 635 are 180° out of phase with the inverted Clock Pulses 626 of FIG. 17. The recovered signal 636 is also inverted with respect to Signal 627 of FIG. 18. It will be seen that by inverting the recovered signal the code is also inverted. Whereas in the proper position the wave form represented a 100011000111 code, the inverted wave form inverts the ONES and ZEROES and produces a 011100111000 code. This, of course, is an intolerable situation in a system for transmitting binary data since the computer or other utilization equipment will receive completely erroneous information as a result of the inversion produced by the 180 phase difference between the local oscillator and the transmitter carrier.

The Schmitt trigger upon receiving signal 636 again produces output pulses 637 of which are applied to the Trigger Pulse Generator to produce a pulse 638 for the leading and lagging edges of Pulses 637. These pulses 638 occur during the negative or zero half of Clock Pulse 634 and during the positive half of inverted Clock Pulses 635. Capacitors 557 and 559 now charge to a positive voltage. The voltage at the collector of Common Emitter 563 goes positive and readies One Shot 581 so that it is triggered by the next positive output pulse from AND GATE 584.

Figures 26, 27, 28, 29, 30, 31, 32:
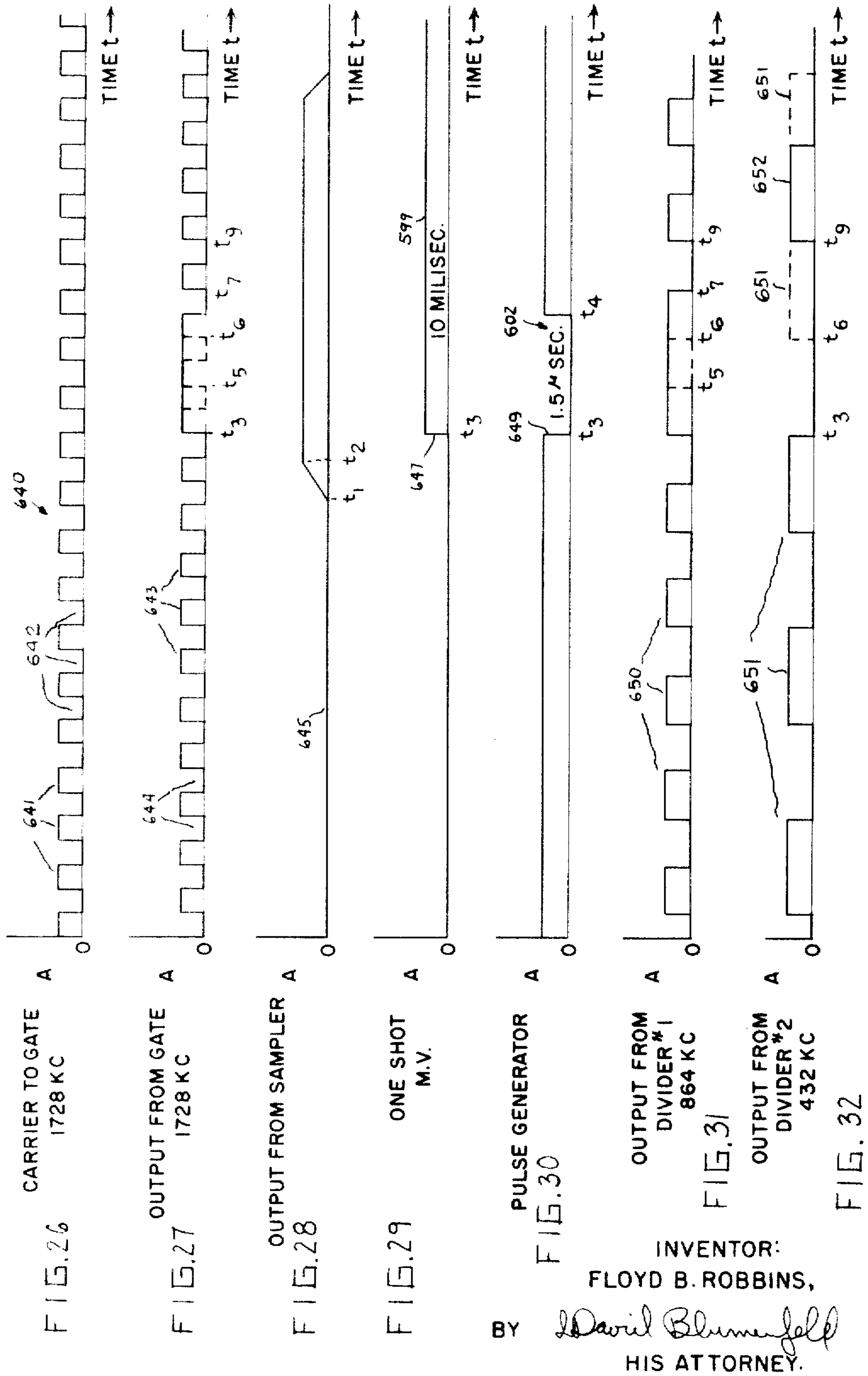

The manner in which Disabling Local Oscillator AND GATE 584 produces the desired 180° phase reversal may best be understood by considering wave forms illustrated in FIGS. 26 through 32. FIG. 26 illustrates the wave form of the local oscillator signal applied to GATE 584. The repetition rate of Local Oscillator Signal 640 is 1728 kilocycles so that the period of one pulse is approximately .58 microsecond. Under normal conditions, Transistor 615, forming part of AND GATE 584, is biased to cut off by the positive voltage applied to its base from Pulse Generator 600 and over Resistance 617. The positive halves 641 of the signal have no effect on Transistor 615 which is already cut off so that the voltage at Collector 617 is clamped to ground by Clamping Diode 618. When the Local Oscillator Signal goes to zero at 642, the base of Transistor 615 is driven to ground, the transistor conducts and the voltage at its collector rises to a positive value. FIG. 27 illustrates the voltage variations at the collector of Transistor 615 and hence at the Output Terminal 534. Thus, whenever the Input Carrier Signal 640 is at its positive value 641, and the transistor is cut off the collector voltage is at zero, as shown at 644. When the input signal goes to zero at 642, Transistor 615 conducts and the voltage at the collector goes positive producing a positive going Pulse 643. Thus, during normal operation, the output at the collector of Transistor 615 and at Output Terminal 613 is 180° out of phase with the input. As long as the Output Signal 645 appearing over Line 580 from Common Emitter Output Amplifier 563 is at zero, as illustrated in FIG. 28, that AND GATE is operative, and the local oscillator signals 640 are transmitted through the GATE in an inverted form, to be further divided to provide the desired 432 kilocycle carrier for the Demodulators. However, assuming that the phase relationship of the local carrier to the transmitter carrier is wrong, at sometime $t_1$ the voltage at the output of the Sampling Circuit starts going positive and the collector voltage of Common Emitter 563 rises towards and reaches the positive value at Time $t_2$. The next positive Pulse 643 from Transistor 615, at Time $t_3$, triggers One Shot 581 which produces positive Pulse 599 shown in FIG. 22.

The Leading Edge 647 of Pulse 599 is applied to the base of PNP Transistor 605 of Pulse Generator 600. This positive going edge drives the transistor to the nonconducting state generating the negative pulse 602. Therefore, at time $t_3$ the Voltage 649 at Collector 607 goes to ground. This negative leading Edge 649 of pulse 602 drives Transistor 615 of the AND GATE to conduction and maintains conduction for the duration of the pulse ($t_3$—$t_4$). There are, therefore, no output pulses from the collector of the Transistor 615. This may be seen in FIG. 27. At $t_3$ the GATE is disabled and the voltage at Collector 607 rises to a positive value and remains there until the Output 602 from the Pulse Generator goes positive again at $t_4$. During the interval $t_3$—$t_4$, no pulses are passed.

The manner in which this effects a 180° phase inversion of the signal applied to modulators may be seen in connection with FIGS. 31 and 32. It will be recalled that the output from the AND GATE 584 at 1728 kilocycles is divided in Flip Flop 495 of FIG. 14 to produce an 864 kilocycle output. The 864 kilocycle output is shown at 650 in FIG. 31. It will be noted that one 864 kilocycle pulse is generated for every two pulses of the local oscillator signal and that the transitions always occur on the positive going edge of the local Oscillator Signal 640. The 864 kilocycle pulses are further divided to produce 432 kilocycles pulses which are applied to the Demodulators. The 432 kilocycles pulses are illustrated at 651 in FIG. 32 and occur at half the rate of the 864 kilocycle Pulses 650, with the transitions taking place in response to a positive going edge of the 864 kilocycle pulses 650.

At time $t_3$ when AND GATE 534 is disabled, no further local oscillator signal pulses 644 are transmitted to the dividers. Thus, at time $t_5$ and $t_6$, when Pulses 643 would normally switch back and forth between zero and the pulse value, the collector voltage of Transistor 615 stays positive. Therefore, the next positive going edge of local oscillator pulse 643 is not available at $t_5$ to switch Flip Flop 495 and the Pulse 650 remains positive. At $t_6$ AND GATE 504 is still disabled and there is no pulse to trigger Divider 495 and, correspondingly, no pulse to trigger the 432 kilocycle dividers 466 and 467. Not until after Pulse 602 terminates at $t_4$ does the next local oscillator Pulse 643 at $t_7$ trigger the 864 kilocycle divider and not until $t_9$ does a positive 864 kilocycle pulse trigger the 432 kilocycle divider. It will be noted that during the intervel $t_3$—$t_2$ the 864 kilocycle divider has been prevented from operating. If the AND GATE had not been disabled, the 1728 kilocycles, the 864 kilocycle and the 432 kilocycle dividers would have continued to generate pulse such as it indicated by the dashed pulses in FIGS. 27, 31, and 32. However, by disabling AND GATE 584 the 432 kilocycle divider is not permitted to switch at $t_6$ and the switching is delayed for a half period until $t_9$ thus shifting the phase of the pulse train by 180°. Thus, it can be seen that the phase of the carrier applied to the demodulators has been shifted by 180° in order to achieve the proper retrieval of the data and other characters modulated onto the carrier at the transmitter.

*The data retrieving circuit*

Figure 33:
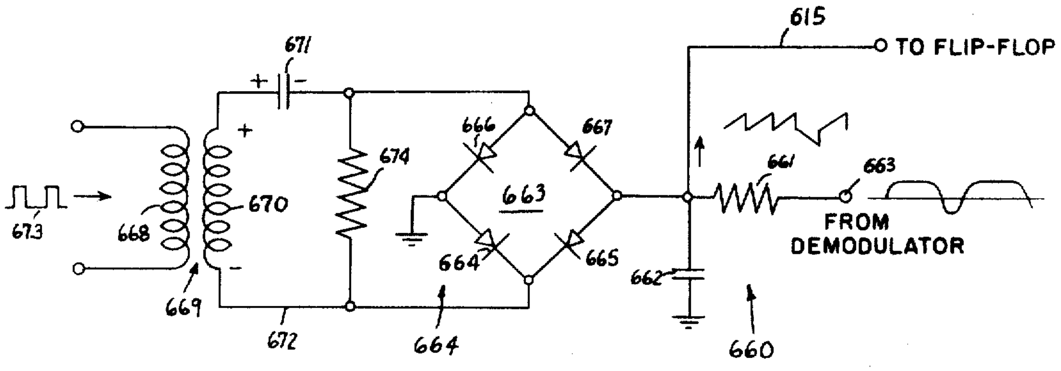
FIG. 33 is of the Data Recovery Circuit, also forming a part of the demodulator shown in FIG. 14.

The data, after being demodulated in the "I" and "Q" Channel Demodulators, is applied to a Data Retrieval Circuit which reconstitutes the wave form of the signal. That is, in the course of transmission, the Binary Characters modulated on the Carrier have deteriorated badly as to wave form, and they are no longer sharp, clean pulses. Therefore, a need exists to reshape these pulses. To this end, network is illustrated in FIG. 33 wherein the deteriorated data is first applied to an Integrating Circuit which produces an output voltage, the magnitude of which is proportional to the average value of the signal and the polarity of which is a function of the type of Binary Character, i.e., Binary ONE or ZERO. A Switch, associated with the Integrating Circuit, is triggered at the clock pulse rate to discharge the Integrating Circuit. FIG. 33 shows an Integrating Circuit 660 consisting of a Resistance 661 and a Capacitor 662. The signal from the Demodulator is applied to an Input Terminal 663 and charges Capacitor 662 through the resistance to produce a voltage across the capacitance which is proportional to the integrated value of the signal at the Input Terminal. The junction of Resistor 661 and Capacitor 662 is connected through a balanced amplifier, not shown, which senses whether Capacitor 662 is positive or negative and steers the input of a Flip Flop which is periodically triggered by the leading edge of the clock pulse.

Also connected to the junction of Resistor 661 and Capacitor 662 is a Switch Arrangement 664 which is operated at the clock pulse rate and discharges Capacitor 662 at the clock pulse rate. The Switch Arrangement consists of a Diode Bridge 663, consisting of Diodes 664–667 connected as the four arms of bridge. The clock pulses are applied to the Primary Winding 668 of a Transformer 669, the Secondary 670 of which is connected through a Capacitor 671 and a Lead 672 across one diagonal of the bridge. The junction of Diodes 664 and 666, which are adjacent arms of the bridge, are connected to a point of reference potential such as ground, whereas the remaining terminal of the bridge at the junction of Diodes 665 and 667 is connected to the Integrating Circuit. Upon appearance of Pulse 673, which is generated from the positive leading edge of the clock pulse, the polarity of the voltage across Secondary Winding 670 is illustrated by the plus (+) or minus (—) signs. The junction of Diodes 664 and 665 is negative, and the junction of Diodes 666 and 667 is positive. If the voltage on Capacitor 662 is positive, electron current flows from ground through Diode 666 down through Leak Resistance 664 connected in shunt with the bridge, through Diode 665 into Capacitor 662, thereby discharging the same. If, on the other hand, the voltage on Capacitor 662 is negative, electron current flows from the Capacitor through Diode 667 down through Resistance 674, and through Diode 664 to ground, thereby discharging the Capacitor. Thus, the voltage on Output Lead 675 to Flip Flop is a series of sawtooth voltages, with a period equal to the clock frequency; and the polarity just prior to discharge is utilized to steer the Flip Flop. Capacitor 671 connected in series with the upper terminal of the Secondary Winding 670 not only couples the positive pulse to the Diode Bridge but also back-biases the Diodes during the intervals between Pulses 673 so that the Diode Bridge does not inadvertently conduct and discharge the Capacitor before the appearance of the pulse. That is, upon the appearance of a clock pulse, the current flows through the diodes and charges the Capacitor to the polarity indicated by the plus (+) or minus (—) sign so that these diodes are reverse biased and cannot conduct when the pulse disappears.

Figure 34:
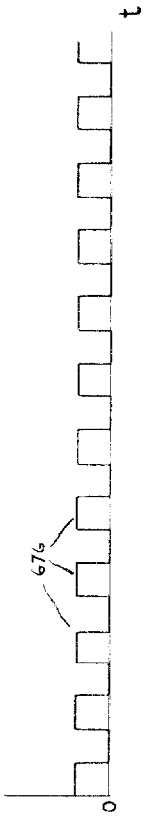
FIGS. 34–38 are Wave Form Diagrams usfeul is understanding the manner in which the Data Recovery Network functions.
Figure 35:
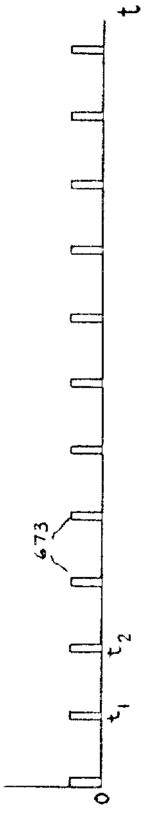
Figure 36:
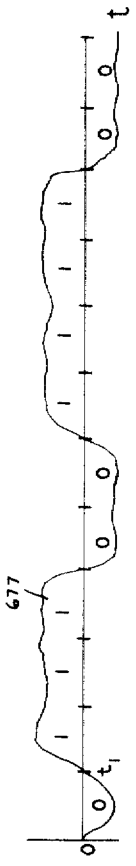

The operational sequence of the Data Recovery Circuit, illustrated in FIG. 33, may best be understood from the wave form illustrated in FIGS. 34–38. FIG. 34 illustrates the Clock Pulse 676 which represents the frequency at which the Integrating Circuit is discharged. These clock pulses may be differentiated to produce the triggering Pulses 673 applied to the primary winding of Transformer 669 of Switch 664. These triggering pulses are generated for each leading edge of the clock pulses which, as previously explained, is the point in time in which the data is read out of the Serial Encoder and which, therefore, represents any transition of the data from one Binary Character to the other. The signal from the Demodulator, which appears at Input Terminal 663, is illustrated by the Wave Form 677 of FIG. 36. As can be seen from observation, the wave form has deteriorated substantially during the course of transmission and demodulation, and is desired to shape this wave form to produce the desired sharp transitions between the ZERO and ONE states. During the interval between trigger pulses the Signal 677 is applied to the Integrating Circuit, and Capacitor 662 charges up to a voltage representative of the average input. Thus, for example, during the first negative excursion of the wave form, indicating a Binary ZERO, Capacitor 662 charges through Resistance 661 to a negative value illustrated at 678. At time $t_1$ Triggering Pulse 673 is applied to the Diode Bridge discharging the Capacitor. Since $t_1$ represents a zero crossing of the data, the input wave form goes positive during the next time interval and capacitor charges in the positive direction until at time $t_2$ another triggering pulse discharges the Capacitor and this same discharge pulse is used to trigger the Flip Flop, the output of which shifts, as illustrated by 680 of FIG. 38, since it is steered by the polarity of the integrator voltage prior to discharge. Since the input wave form is still positive Capacitor 662 again is charged to a value representative of the wave form during the interval from $t_1$ to $t_2$ and is again discharged at time $t_2$. The same sequence is repeated for the wave form, and the wave form is integrated and discharged during each clock pulse and the polarity of the integrated wave forms being utilized to control the state of the Flip Flop to produce the desired character zero crossings representative of changes between bits.

Figure 37:
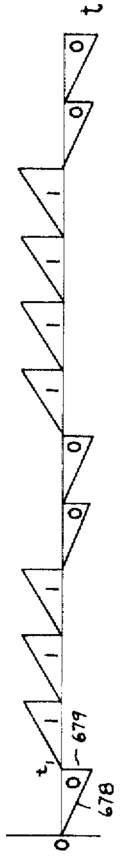
Figure 38:
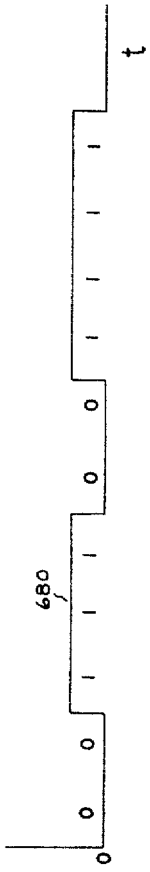

It will be noted from FIGS. 37 and 38 that there is one clock pulse delay in reconstituting the Data Character Wave Form from the integrator. However, this is of no consequence as long as the proper bit sequence is maintained so that the proper synchronization and framing at the Serial Decoder will retrieve the individual characters.

While a particular embodiment of this invention has been shown, it will, of course, be understood that it is not limited thereto since many modifications, both in the circuit arrangement and the devices employed, may be made. It is contemplated by the appended claims to cover any such modifications as fall within the true spirit and scope of this invention.

What I claim as new and desire to secure by Letters Patent of the United States:

1. In a system for preparing data in digital coded form for transmission between two remote locations, the combination comprising means to obtain data characters at one location in the form of a plurality of parallel digital bits, means to prepare the data for transmission in synchronous form to a remote location for utilization there including means to convert said parallel digital bits to a serial bit stream and means to interlace control characters in said serial bit stream when no data characters are available for transmission to produce thereby a continuous, synchronous, serial bit stream of data and control characters, means to process a received synchronous serial bit stream after transmission to reconstitute and selectively distribute the data and control characters for utilization including means to identify and separate data and control characters from the serial bit stream, means to convert the data character bits to parallel form and means to generate electrical signals from said control character bits for use in performing the control function.

2. In a system for preparing data in digital coded form for transmission between two remote locations the combination comprising, means adapted to obtain data characters at one location in the form of a plurality of parallel digital bits, means to prepare the data for transmission in synchronous form to another location for utilization there including means to add an identification bit to each of the characters, means to convert the parallel digital bits including the identification bit to a serial bit stream and means to interlace control characters in said serial bit stream when no data characters are available for transmission to produce thereby a continuous, synchronous serial bit stream of data and control characters, means to receive and process a synchronous bit stream to reconstitute and selectively distribute the data and control characters to separate utilization means including means to identify the data and control characters through the medium of the identification bits, means to separate the data and control characters, means for converting the identified data characters to parallel form, and means to generate electrical signals from said control character bits for use in performing the control functions.

3. In a system for preparing data in digital coded form for transmission between two remote locations, the combination comprising means for obtaining data characters at one location in the form of a plurality of parallel digital bits, means to prepare the data for transmission in synchronous form to another location including means to convert the data character bits to a serial bit stream, and means to interlace control character bits in the serial stream when no data characters are available for transmission to produce thereby a continuous, synchronous serial bit stream of interlaced data and control characters the rate of transmission of said synchronous serial bit stream containing both said data and control character bits being greater than the rate at which the data character bits are received, means for receiving and processing a synchronous bit stream of interlaced data and control characters to reconstitute and selectively distribute the data and control characters to prepare them for their respective utilization devices including means to identify and distinguish between the data and control characters, means to separate the data and control characters, means to convert identified data characters to parallel form, and means to generate electrical signals from said control characters for use in performing the control functions.

4. In a system for preparing data in digital coded form for transmission between two remote locations, the combination comprising means for obtaining data characters at one location in the form of a plurality of parallel digital bits, means to prepare the data characters for transmission in synchronous form to another location including means to convert the data characters to a serial bit stream, means to generate a signal in the absence of a data character, means responsive to said last named signal for generating a control character and interlacing the same in said serial bit stream to produce a continuous, synchronous, serial bit stream of interlaced data and control characters, the rate of transmission of said continuous, synchronous, serial bit stream containing both said data and said control character bits, being greater than the rate at which the data character bits are received, means for processing a synchronous bit stream of interlaced control and data characters to reconstitute and selectively distribute the data and control characters to prepare them for their respective utilization devices including means to identify and distinguish between data and control characters, means to separate the data and control characters, means to convert the identified data characters to parallel form, and means to generate electrical signals for use in performing the control functions.

5. In a system for preparing data in digital coded form for transmission between two remote locations, the combination comprising means for receiving data characters at one location in the form of a plurality of individual bits, means to prepare the data characters for transmission as a synchronous bit stream of interlaced data and control characters, means to generate a signal in the absence of a data character, means responsive to said last named signal for generating a control character representative of either the status of a device at the one location or of a command from a device at the one location to a device at the remote location, means to inhibit the generation of a control character representative of the status of a device whenever a character representative of a command can be generated whereby a transmission priority in the bit stream is established so that a data character is given priority over both status and command characters and a command character is given priority over a status character, means for receiving and processing a synchronous bit stream of interlaced data and control characters, including means to identify and distinguish between data and control characters, means to separate the data and control characters, means to convert the data characters to parallel form, means to further identify and separate the control characters into status and command characters, and means to generate electrical signals in response to said status and command characters.

6. In a system for preparing data in digital coded form for transmission between two remote locations, the combination comprising means for receiving data characters at one location in the form of a plurality of parallel bits, means to add an identifying bit to said parallel bits and for storing said bits in a temporary storage means, means to shift said bits from said storage means to a shift register means to convert the parallel bits to a serial bit stream, means for generating an electrical signal in the absence of a data character in said temporary storage means, means responsive to said electrical signal to generate a control character and for inserting the same in said temporary storage means for insertion in said bit stream so that a synchronous character bit stream of interlaced data and control characters is generated, means for processing a synchronous bit stream of interlaced control and data characters including means to identify and distinguish between the data and control characters, means to separate the data and control characters, means to convert the data characters to parallel form, and means to generate electrical signals from said control characters for use in performing the control functions.

7. In a system for preparing data in digital coded form for transmission between two remote locations, the combination comprising means to obtain data characters at one location in the form of a plurality of parallel bits, means to add an identifying bit to said characters, means to convert said parallel bits to a serial bit stream, means to interlace control characters in said bit stream when no data characters are available to produce thereby a continuous, synchronous serial bit stream of interlaced data and control characters, means to process and reconstitute a received, synchronous bit stream including means to sense the presence of control characters in response to the identifying bits and to produce an enabling signal, a plurality of control character identification means for identifying the individual control character codes and producing electrical output signals in response thereto, means to enable said control character identification means in response to said enabling pulse, means to convert data characters from serial to parallel form, gating means connected to said converting means to control passage of said data characters in parallel form to a utilization means, means to sense the presence of a data character from said identifying bit and to generate a control pulse whenever a data character is present, and means to apply said control pulse to said gating to transfer said data character from said converting means to the utlization means.

8. The system, according to claim 7, wherein said converting means includes a shift register.

9. The system, according to claim 8, wherein said means to sense the control and data characters are coupled to said shift register to sense thereby the identifying bits of said characters and to produce said enabling signal and control pulse in response to the presence of such an identifying bit.

10. In a system for preparing data in digital coded form for transmission between two remote locations, the combination comprising means to obtain data characters at one location in the form of a plurality of parallel bits, means to add an identifying bit to said characters, means to convert said parallel bits to a serial bit stream, means to interlace different control character codes in said bit stream when no data characters are available to produce thereby a continuous, synchronous serial bit stream of interlaced data and control characters, means to process and reconstitute a received, synchronous bit stream, including shift register means for storing said bits and converting them to parallel form, means responsive to the proper identifying bit to sense the presence of a data character and to generate a control pulse in response thereto, means responsive to said control pulse to shift said data character in parallel form to a utilization means, means responsive to the proper identifying bits to sense the presence of a control character and to generate an enabling pulse in response thereto, means to identify the different control character codes and to produce pulses in response thereto, means to generate electrical signals in response to said last named pulses representative of the different control character codes, and control means responsive to said last named pulses and said enabling pulse to control said means for generating electrical signals so that said electrical signal is produced only in the event that the individual ones of said different control characters are present a predetermined number of times in succession.

11. The system, according to claim 10, wherein said control means includes a counter for counting the number of pulses produced by the means for identifying the different control characters.

12. The system, according to claim 11, wherein said control means also includes means for resetting said counter in the event the individual ones of said different control characters are not received in succession for the predetermined number of times.

13. In a system for preparing data in digital coded form for transmission, the combination comprising means adapted to obtain data characters in the form of parallel digital bits, first storage means to store said parallel data character bits, means modifying said data character by adding an identifying bit upon transfer of said data character from said storage means, second storage means to store said modified data characters, means to simultaneously transfer the bits of said modified data character at a predetermined rate to a shift register for conversion to serial bit form, means coupled to said first and second storage means to generate a pulse in the absence of characters in said first and second storage means, Control Character Encoder means responsive to said last named pulse for generating a control character in digital encoded form for insertion in said second storage means for transfer to said shift register at said predetermined rate to produce a continuous, synchronous serial bit stream of interlaced data and control characters.

14. In a system for processing data in serial bit form, means to receive a serial bit stream of interlaced data and control characters, each of which contains an identification bit, a shift register for receiving the serial bit stream and simultaneously storing a number of bits equal to the number of bits in a character, a first character identification means coupled to said shift register for producing a gating pulse in response to the presence of a data character identifying bit in said register, gating means coupled to said register for transferring a data character in parallel form from said register to a utilization means in response to said gating pulse, a second character identification means coupled to said shift register for producing an enabling pulse in response to the presence of a control character identifying bit in said register, a plurality of control character identifying gates connected to said shift register, each of said gates being adapted to identify only a specific one of said control characters and producing an output pulse only on receipt of the bit code identifying a specific one of said control characters, a plurality of further gating means associated with the control character identifying gates and producing an electrical output signal in response to the simultaneous occurrence of an output pulse from its associated control character identifying gate and an enabling pulse from said second character identification means.

15. The data processing system, according to claim 14, wherein said plurality of further gating means include means to inhibit the production of an electrical output signal until if the specific ones of the control characters occur a predetermined number of times in succession.

16. The data processing system, according to claim 15, wherein said inhibiting means include counting means which generate an inhibiting signal for all counts other than the predetermined number and an enabling signal whenever the predetermined number occurs.

17. In a system for preparing data in digital coded form for transmission between two remote locations, the combination comprising means to obtain data characters at one location in the form of a plurality of individual digital bits, means to prepare the data for transmission in synchronous form to a remote location for utilization there including a further source of digital control bits, means to sense the absence of a data character and to generate a signal in the absence of a data character, means responsive to said signal to interlace the digital control bits from said source into a serial bit stream now formed of said character bits and said control bits when no data character bits are available for transmission to produce thereby a continuous, synchronous, serial bit stream of data and control bits, means to process a received synchronous serial bit stream after transmission to reconstitute and selectively distribute the data and control bits for utilization, including means to identify and separate data characters and control bits from the serial bit stream, for selectively utilizing said data characters and control bits at said remote location.

References Cited by the Examiner

UNITED STATES PATENTS

| | | | |
|---|---|---|---|
| 3,118,055 | 1/1964 | Bensky | 235—157 |
| 3,139,607 | 6/1964 | Grondin | 340—172.5 |
| 3,243,781 | 3/1966 | Ehrman et al. | 340—172.5 |

ROBERT C. BAILEY, *Primary Examiner.*

I. S. KAVRUKOV, *Assistant Examiner.*